US010902016B2

(12) United States Patent
Shamsutdinov

(10) Patent No.: US 10,902,016 B2
(45) Date of Patent: Jan. 26, 2021

(54) AUTONOMOUS INTERDEPENDENT REPOSITORIES

(71) Applicant: Artem Shamsutdinov, Denver, CO (US)

(72) Inventor: Artem Shamsutdinov, Denver, CO (US)

(*) Notice: Subject to any disclaimer, the term of this patent is extended or adjusted under 35 U.S.C. 154(b) by 201 days.

(21) Appl. No.: 15/894,416

(22) Filed: Feb. 12, 2018

(65) Prior Publication Data
US 2019/0251198 A1 Aug. 15, 2019

(51) Int. Cl.
G06F 17/30 (2006.01)
G06F 16/27 (2019.01)
H04L 29/08 (2006.01)
G06F 21/60 (2013.01)
G06F 16/28 (2019.01)
G06F 16/23 (2019.01)
G06F 21/62 (2013.01)

(52) U.S. Cl.
CPC .......... *G06F 16/27* (2019.01); *G06F 16/2365* (2019.01); *G06F 16/2379* (2019.01); *G06F 16/285* (2019.01); *G06F 21/602* (2013.01); *G06F 21/6227* (2013.01); *H04L 67/1095* (2013.01); *H04L 67/1097* (2013.01)

(58) Field of Classification Search
CPC .... G06F 16/27; G06F 16/2379; G06F 16/285; G06F 16/2365; G06F 21/602; G06F 21/6227; H04L 67/1095; H04L 67/1097
See application file for complete search history.

(56) References Cited

U.S. PATENT DOCUMENTS

| | | | |
|---|---|---|---|
| 9,031,957 B2* | 5/2015 | Agrawal | G06F 16/252 707/741 |
| 9,280,613 B2 | 3/2016 | Smith et al. | |
| 9,607,324 B1* | 3/2017 | Reed | G06F 16/24578 |
| 9,659,040 B1 | 5/2017 | Bellingan et al. | |
| 9,659,076 B2 | 5/2017 | Kumarasamy et al. | |
| 9,773,051 B2 | 9/2017 | Smith | |
| 2008/0154939 A1 | 6/2008 | Mutschler et al. | |
| 2009/0100046 A1* | 4/2009 | Huck | G06F 16/487 |
| 2012/0239699 A1* | 9/2012 | Anand | G06F 16/27 707/792 |
| 2013/0013561 A1 | 1/2013 | Chan et al. | |

(Continued)

FOREIGN PATENT DOCUMENTS

| | | |
|---|---|---|
| EP | 3200103 A1 | 1/2017 |
| EP | 3200102 A1 | 8/2017 |

(Continued)

*Primary Examiner* — Huawen A Peng
(74) *Attorney, Agent, or Firm* — Trenner Law Firm, LLC; Mark D. Trenner

(57) ABSTRACT

Systems and methods are disclosed for enabling any number of users to share data across any number of web site, mobile, and/or desktop applications (Apps), via an autonomous interdependent repositories (AIR) database. An example method includes grouping data in a plurality of Repositories of the AIR database. The plurality of Repositories may be shared with the user and other users. The method also includes maintaining a plurality of Repository records for the plurality of Repositories. Any number of Applications from any number of different publishers use the AIR database by providing schemas to the AIR databases.

20 Claims, 49 Drawing Sheets

(56) References Cited

U.S. PATENT DOCUMENTS

| | | |
|---|---|---|
| 2013/0191326 A1 | 7/2013 | Sharma |
| 2014/0025641 A1 | 1/2014 | Kumarasamy et al. |
| 2014/0214886 A1* | 7/2014 | Annapragada .... G06F 16/90335 707/769 |
| 2014/0310262 A1 | 10/2014 | Feinberg |
| 2016/0019224 A1 | 1/2016 | Ahn et al. |
| 2016/0292040 A1 | 10/2016 | Kumarasamy |
| 2017/0139995 A1 | 5/2017 | Mielenhausen |
| 2017/0220622 A1 | 8/2017 | Havican et al. |
| 2017/0220657 A1 | 8/2017 | Nivala et al. |

FOREIGN PATENT DOCUMENTS

| | | |
|---|---|---|
| WO | 2014036055 | 3/2014 |
| WO | 2014047736 | 4/2014 |
| WO | 2014150538 | 9/2014 |

* cited by examiner

Fig. 6

| TABLE_i | | | |
|---|---|---|---|
| REPOSITORY_ID | REPOSITORY_ACTOR_ID | ACTOR_RECORD_ID | DATA_i |
| 1 | 1 | 1 | a... |
| 1 | 1 | 2 | b... |
| 1 | 2 | 1 | c... |
| 1 | 2 | 2 | d... |
| 2 | 1 | 1 | e... |
| 2 | 1 | 2 | f... |
| 2 | 2 | 1 | g... |
| 2 | 2 | 2 | h... |
| ... | ... | ... | ... |

Fig. 7

TABLE_I

| REPOSITORY_ID | REPOSITORY_ACTOR_ID | ACTOR_RECORD_ID | DATA_I |
|---|---|---|---|
| 1 | 1 | 1 | a... |
| 1 | 1 | 2 | b... |
| 1 | 2 | 3 | c... |
| 1 | 2 | 4 | d... |
| 2 | 3 | 5 | e... |
| 2 | 3 | 6 | f... |
| 2 | 4 | 7 | g... |
| 2 | 4 | 8 | h... |
| ... | ... | ... | ... |

Fig. 8

TABLE_I

| REPOSITORY_ID | REPOSITORY_ACTOR_ID | ACTOR_RECORD_ID | DATA_I |
|---|---|---|---|
| 1 | 1 | 1 | a... |
| 1 | 1 | 2 | b... |
| 1 | 2 | 3 | c... |
| 1 | 2 | 4 | d... |
| 2 | 3 | 5 | e... |
| 2 | 3 | 6 | f... |
| 2 | 4 | 7 | g... |
| 2 | 4 | 8 | h... |
| ... | ... | ... | ... |

Fig. 13
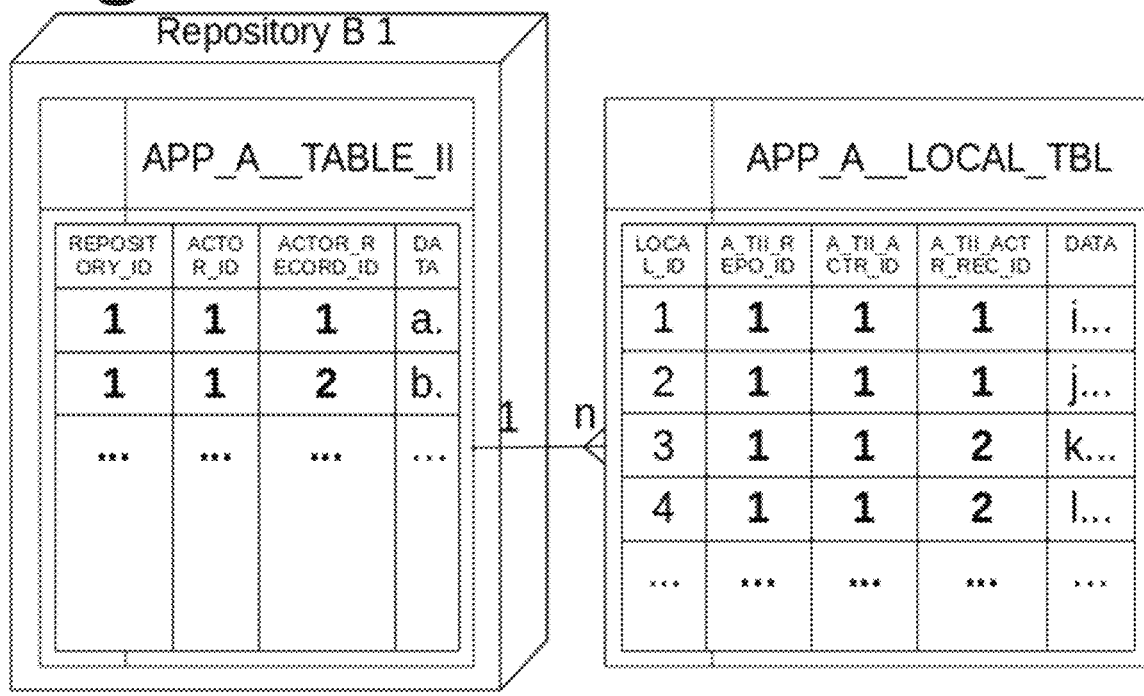
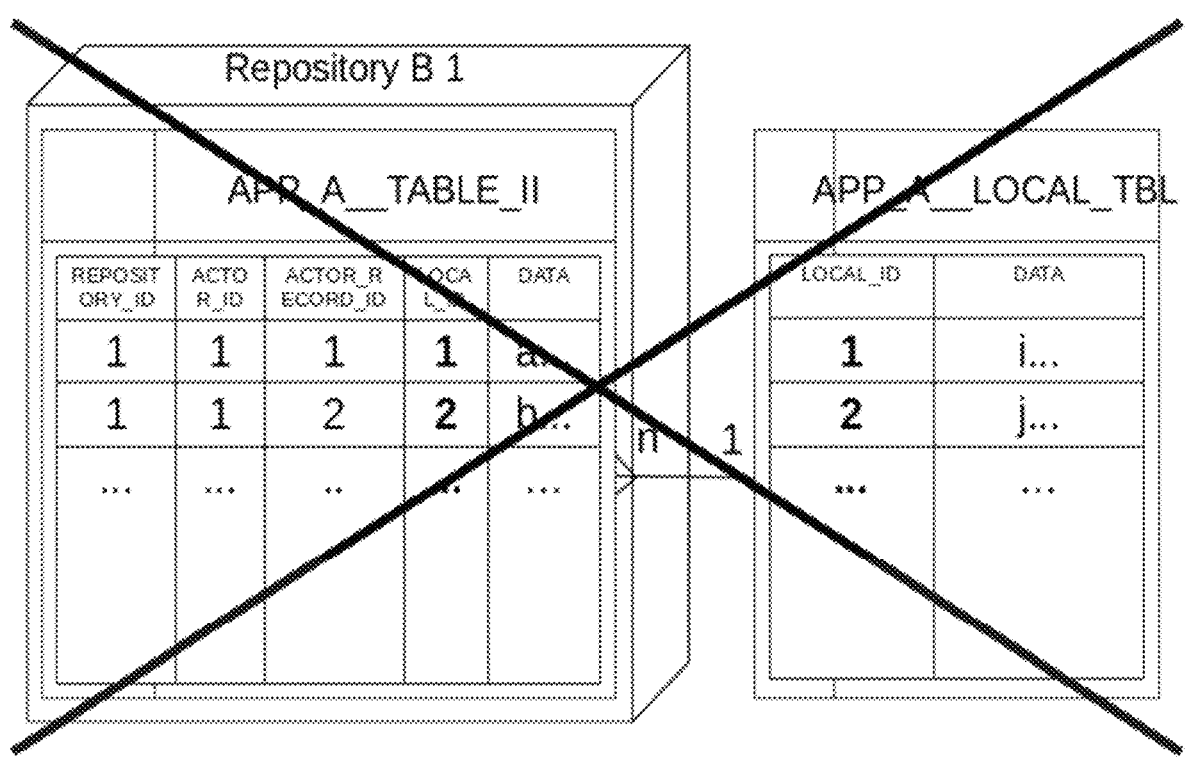

"Repositories" across Databases across Applications
(some shared by users)

AUTONOMOUS INTERDEPENDENT REPOSITORIES

BACKGROUND

A common problem for new computing applications (e.g., mobile "apps") is that the user has to enter data before the app becomes useful. Often the utility of the app is determined by how much data it has. While large app providers can centrally store user data for use in their apps, this only applies to apps by the same provider. In addition, there are security concerns, which can also increase the cost of maintaining user data. So-called "micro publishers" often cannot afford to maintain large, secure server-side infrastructure for managing user data.

BRIEF DESCRIPTION OF THE DRAWINGS

FIGS. 5-8 show example tables of an example AIR database.

FIGS. 12 and 13 show example relational databases.

DETAILED DESCRIPTION

Figure 1:
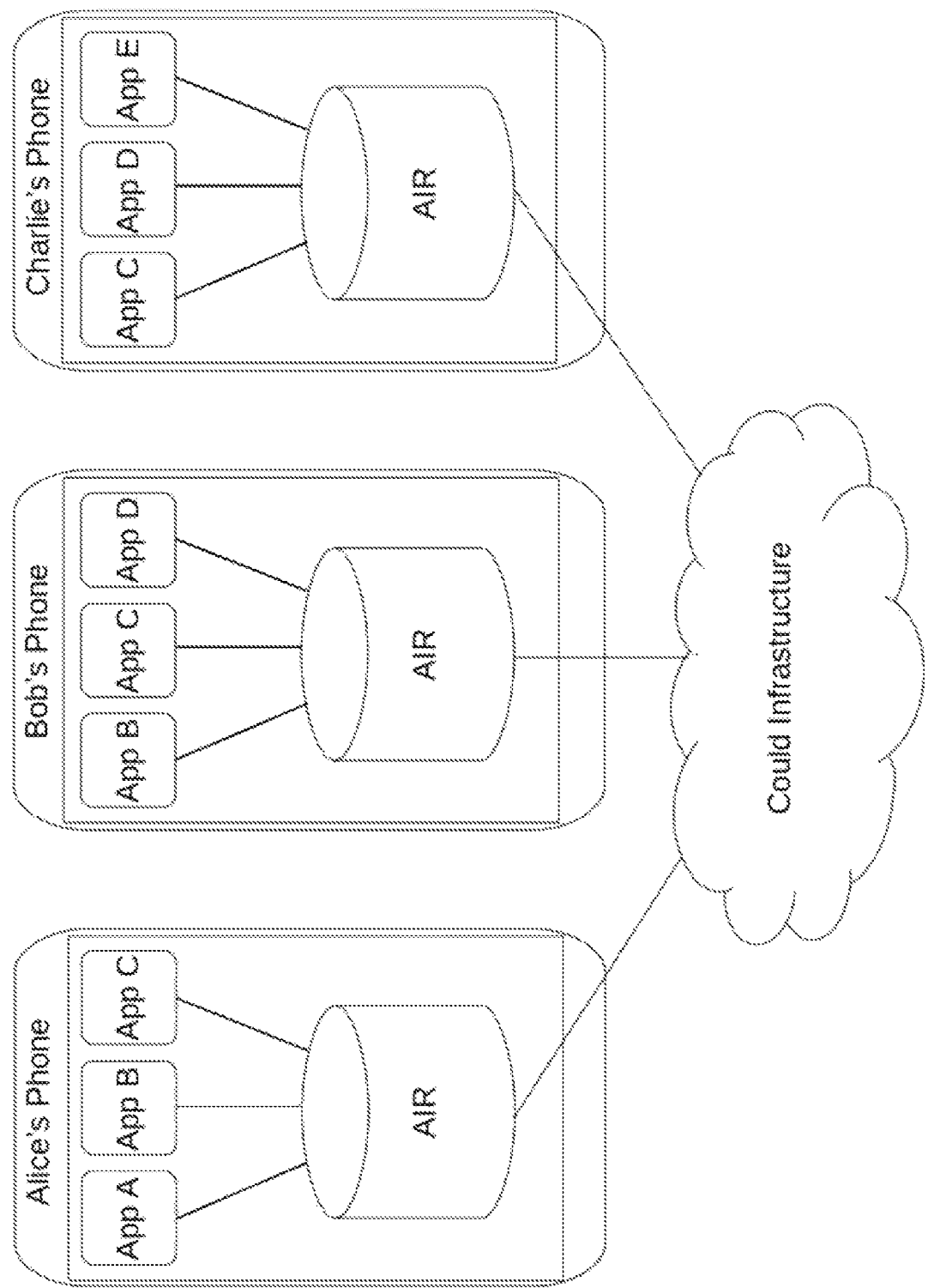
FIG. 1 is a high-level illustration of an example environment in which data may be utilized by the AIR systems and methods described herein.

Systems and methods are disclosed for implementing Autonomous Interdependent Repositories (AIR) as a federated data sharing system. In an example, AIR enables any number of users to share data across any number of web sites and mobile or desktop apps. Websites and apps can come from any number of publishers. It is an "off-line first" system that allows users to have all access to all of their data without a network connection. AIR is a "privacy first" system and gives users and applications access to only the data they are allowed to access. It is a "security first" system and ensures data confidentiality and authenticity. It is a redundant system where data is stored on multiple devices and can be archived to multiple locations. AIR is a multi-channel system where data can be shared using multiple technologies and channels which can be switched. AIR is an inconsistency tolerant system where data may exist in different devices in different shapes but is guaranteed to be "eventually consistent". AIR is a "time traveling" system where the state of its data can be restored to any point in time and space and history of all records is readily available.

In an example, AIR is focused on application developer productivity to encompass industrial strength data synchronization that scales to a global level while staying simple at its core.

Currently most mobile applications either do not share user's data at all (limiting them to a single device), or provide their own cloud hosted storage. Many large companies provide hosting environments, but most are geared to either multi-tenant setups (where each application provider is in charge of maintaining their own schema), or for large scale data analytics where clients re-aggregate their existing data for post processing. These hosting environments do not include the concept of AIR "repositories".

AIR is unique wherein the application developer to think of user data in terms of "repositories". A repository is a first level concept in AIR, and developing AIR-based applications is based on code that is specific to it. All shared data is grouped in repositories.

In an example, AIR shares database schemas (on table, column and or row basis) between multiple applications, provided by different publishers. AIR provides a unique way to accomplish that by giving control over what is shared between applications, and allowing for monitoring of the usage of the schema (by other applications). AIR enables providers to enjoy the benefits of synergy between applications while giving them abuse-preventing capabilities.

AIR is unique in that all of the above features are fully available off-line. AIR is an "off-line first" system, because it is a federated system of peer databases. And for the same reason AIR is a redundant system, where multiple databases can share the same data and can archive it multiple times.

AIR also allows for multiple synchronization mechanisms (e.g., central server, shared file system, peer-to-peer, etc.), and any repository can switch its synchronization mechanism, at any time. In an example, AIR stores history of every record and allows for data re-playability.

AIR addresses current technologies inability to "center data on the user" while at the same time providing security and data sharing between applications and users.

Before continuing, it is noted that as used herein, the terms "includes" and "including" mean, but is not limited to, "includes" or "including" and "includes at least" or "including at least." The term "based on" means "based on" and "based at least in part on."

FIG. 1 is a high-level illustration of an example environment in which data may be utilized by the AIR systems and methods described herein. AIR data may be provided by multiple web sites and mobile/desktop apps and can be implemented on any types of devices, from IOT embedded devices to large scale central databases. Any software can communicate with AIR, given proper access techniques. It is usually backed up in the cloud or network storage of individual users. No central processing server is needed but one can be implemented for performance reasons.

In an example, data is arranged in "repositories", which are the building blocks of the system. They are virtual collections of related records that are physically stored in a relational database.

In an example, each database only receives repositories that its user(s) is/are a part of. Hence each user has all of the data they need and none of the data they don't need. Composition of data in each AIR database is unique to its user(s) and to the selection of repositories that/those user(s) decide(s) to store in that database.

In an example, repositories are fine grained and time bound. Such "micro-repository" usually encompasses one (optionally shared) time bound unit of knowledge. Fine granularity helps to improve sharing/synchronization performance across AIR databases. It limits the users of a repository to only the ones that need to be its members. It provides ease of archiving of data to and from the cloud, organizing data better in the cloud, maintaining local-only data (auxiliary data that doesn't need to be backed up to the cloud) that is separate from repository data. It may provide better and more numerous per user compound/statistical repositories with derived data. It may provide a standard application programming API for grouping the data. It enables better automated search tooling, and better automated reporting of tasks.

In an example, repositories that are maintained over a long period of time may be more preferable. Likewise, in an example, large amounts of data may be best shared in a single repository. AIR does not enforce any constraints on the time bounds for repositories or the amount of data that can be stored in them. Such decisions are left up to the application developers and users of those applications.

Repositories can have any number of users participating in them. Within AIR, users access repositories via AIR databases (however other access mechanisms are not prohibited). Any number of users can share any type of data in a repository.

Repositories may be grouped via labels and hierarchies (and other techniques where appropriate), which can themselves be stored in other "metadata" repositories. A Metadata Repository is a repository that stores general information about other repositories. Note that each Repository also includes metadata about its own data, which is different from Metadata Repositories, which contain metadata about other repositories AIR may be implemented as a data sharing platform between any number of users, in any combination of groups across any number of web sites and mobile apps. Its primary target market is web-native hybrid mobile applications as well as Progressive Web Applications. In modern application ecosystem applications are often provided for multiple platforms, including desktops. AIR is intended to cover usage of applications across mobile and desktop platforms.

AIR may be implemented for any purpose wherein secure data is shared between multiple users. Also, it provides value whenever a user has to work off-line for any period of time, since it has all of the data of the user (at a given point in time) on the device they are using. AIR is beneficial when implemented from a single application but gains most value when implemented across multiple applications (that are related to each other in various ways).

AIR may be implemented in any environment where inspection of the order of operations (on per user/per group basis) is important. It may also be implemented in any environment where ability to travel back and forth in the state of the data is needed, across time or across user groups or both.

AIR may be implemented in any environment where data redundancy is desired.

AIR may be implemented in any environment where built in data authenticity is desired.

AIR may be implemented in any environment where a multitude of different data compositions is desired, and where a number of databases purposefully include different compositions. Value can also be extracted from database specific reporting (run only on data present in a given database).

AIR may be implemented in any environment where data inconsistency tolerance is desired.

AIR may be implemented in any environment where automated conflict detection and configurable (automatic and manually over-writable) conflict resolution is desired.

Specific application types using AIR may be any apps which implement task sharing or project tracking. Also, any types of apps that gather device data and use it for processing and aggregation. It is possible to be implemented by any application(s). For example, where people share their data across multiple web/mobile/desktop (any other type of) applications. Where people share their data across multiple devices (and applications). Where people share their data with each other (and across devices and applications). Where groups of wearable devices exchanging data with smart phones (or watches) or other more capable devices. Where groups of autonomous AI bots exchanging data to perform various tasks. Where Internet of Things (IoT) devices exchange data on local, regional or global level.

In an example, AIR puts user data in the hands of users and flips information problem on its head. Applications do not store user information—users do. An example setup is for a user to have information they need on the daily basis stored in an AIR database on their mobile device and have all of their data stored in their cloud account(s).

Of course, organizations are still free to setup their own clouds and share their repositories with their employees. In that example, an organization acts as the owning user (or a number of users in a hierarchy, for example) and their employees have access to appropriate data.

It is important to note that this technology does not conflict with big data concepts. The data that users share with a given application is accessible by that application and may be implemented in accordance with the agreements that user signs with the application provider. And a big organization can still load all of its repositories into an alternative storage platform for analytical processing. Also, AIR databases themselves can run on NewSQL database engines which can be scaled horizontally without any limits.

In an example, letting the user manage their information enables multiple websites and mobile applications to access the same data. For example, user may already have data in a particular field of inquiry (entered though one app) that can be reused by multiple applications. It is beneficial for an application that originally provided the schema for that data to open up its schema to other applications. This is true because other applications can enrich the functionality of the original application in ways that the publisher of the original application may never consider. Multiple applications may co-exist in symbiosis benefiting from each other's functionality and getting more interaction from the user because of the improvements to their combined feature set. And of course, it is beneficial to the user, since they now can gain additional value from the data they already have entered and a more comprehensive set of features. If the publisher of the original data schema is concerned about copy cats stealing their market share they can monitor what applications are using their schema objects and warn the offenders or blacklist them from accessing that schema (and hence prevent them from accessing the accumulated data that is stored in it).

In general, in any dataset, more utility is realized when more valid data is available for processing. In AIR the effect of accumulating data is compound across many apps. And that data may be available for processing for all of the member apps (subject to user approval).

As a different perspective on the above benefit, a common problem for a new application is that the user has to enter data into it before the app becomes useful. Often the utility of the app is determined by how much data it has. A new application using AIR can immediately gain access to a wealth of information already entered by its users and realize its full potential from the start.

User managed information also enables the user to be in charge of how much data they give out and to whom. The users can utilize any number of mechanisms (application reviews for example) to determine which applications are allowed to access which data. This doesn't prevent applications from being proactive about which data they are asking for.

While repositories are fully autonomous in most examples, the repositories may be interdependent. Records can be referenced by one repository from another if they are guaranteed to never be deleted (with even a stronger guarantee available of a record never being updated). By default, AIR is in "Create and Update" mode with Deletes being a rarity. And record (or part of schema including them) that may potentially be deleted is marked as such and cannot be implemented as a dependency by another repository. Alternatively, for any number of repositories (or schema tables or columns), AIR may be configured to make data deletable by default and have only select records as guaranteed to exist.

Interdependence between repositories enables richer dataset and statistical (and other) reporting capabilities across large datasets. It is facilitated by marking every record as belonging to a particular repository (and being entered by a particular user via a particular database) as well as a standard way of specifying repository dependencies. For example, a reporting application may search patterns in user's data and use deep learning techniques to provide suggestions to users on what actions to take. Repositories can be labeled or grouped hierarchically into any data cube combinations.

AIR is a federated system where centralization is optional. In an example, AIR can work as a peer-to-peer system without any centrally shared network resources. For performance reasons, a central data sharing server may be implemented. However, that server does not need to know anything about the data in individual repositories and can deal with just the synchronization problem. Any given user database may use any number of sharing/synchronization servers, for example one for personal repositories and one for work repositories. Also, a given database may mix and match peer-to-peer repositories with repositories flowing through a data sharing server or based on a shared file system.

AIR data is redundant, can be backed up to a different server or via different synchronization mechanism at any time.

User centric data also allows application providers to build in stronger privacy guarantees into their software. Application provider may only be interested in a subset of user data for their reporting and data mining. It usually isn't in the interest of the providers of applications to be liable for the bulk of user's private data. With AIR their applications get access to a defined set of data that limits their liability. And applications can further guarantee to the user that they themselves will only store an even smaller subset of data, leaving most of user's data the solely in AIR Databases and user's archives.

AIR is designed to keep data secure and authentic. Data encryption and authentication is performed in the client databases. This provides built in security check redundancy. Even with encryption and signing off, each database can verify that all of the transactions that are claimed to be coming from it do indeed originate from that database. Any number of databases sharing the same repository can also be running in a controlled environment, acting as traditional servers.

A benefit of splitting data into individual repositories is the ability to orderly archive information. Modern mobile devices may not be technically capable of including all of the information that a user may need, so AIR provides a way to archive repositories that have not been written to for a period of time and to retrieve them back to the device on demand (user may also choose to archive repositories or groups of repositories of their own choosing). Also, a user may choose to store specific data on their mobile devices and a bigger data set of data on a more capable device like their desktop or a cloud hosted database. A user may also have a different (or overlapping) data set they use on a device provided by their employee or organization of interest.

Publishers of AIR compatible applications no longer have to worry about centrally storing user data and keeping it secure. This may be of great benefit to micro publishers, who cannot afford to maintain large server-side infrastructure for managing user's data. In fact, their applications may live entirely on the client side and still benefit from datasets shared across users, groups or organizations.

Applications are of course still free to centrally store as much or as little of the data that user grants them access to (though they might find it beneficial to provide guarantees to users that they won't do so). Alternatively, they may want to only centrally store anonymous statistical data.

In AIR a fully featured relational database is present on every user's device. This means much of data processing can be done right on those devices, especially if that data is related to the user of that database. This may reduce the computational costs incurred by application publishers as well.

In AIR most of the data is archived in individual user's cloud accounts (or more traditional shared files systems) or space managed by individual client organizations. That data is reused by multiple applications. This can lead to system-wide reduction of overall storage capacity because applications no longer have to maintain data that is alike.

Full autonomy of repositories also greatly simplifies the database operations to update the data (when combined with the fact that every modification is done by record Id and the fact that record Ids cannot be changed). In essence, when new Transaction Log entries (a.k.a. Repository Transactions) for a given repository are received by the database, that repository can be synchronized without a rollback of recent operations and their re-application along with the new entries. Instead, operations are performed only on the records that are affected by the received Transaction Log entry.

In AIR most of computing and data access is done on the individual AIR databases. Central servers (e.g., to optimize sharing performance) only synchronize repository transaction logs, which is a very specific task that does not deal with the underlying data. This task implements relatively little centralized computing (and storage) resources.

Before continuing, it is noted that the examples shown and described herein are provided for purposes of illustration, and are not intended to be limiting. Other devices and/or device configurations may be utilized to carry out the operations described herein. The operations shown and described herein are provided to illustrate example implementations. It is noted that the operations are not limited to the ordering shown. Still other operations may also be implemented.

Figure 2:
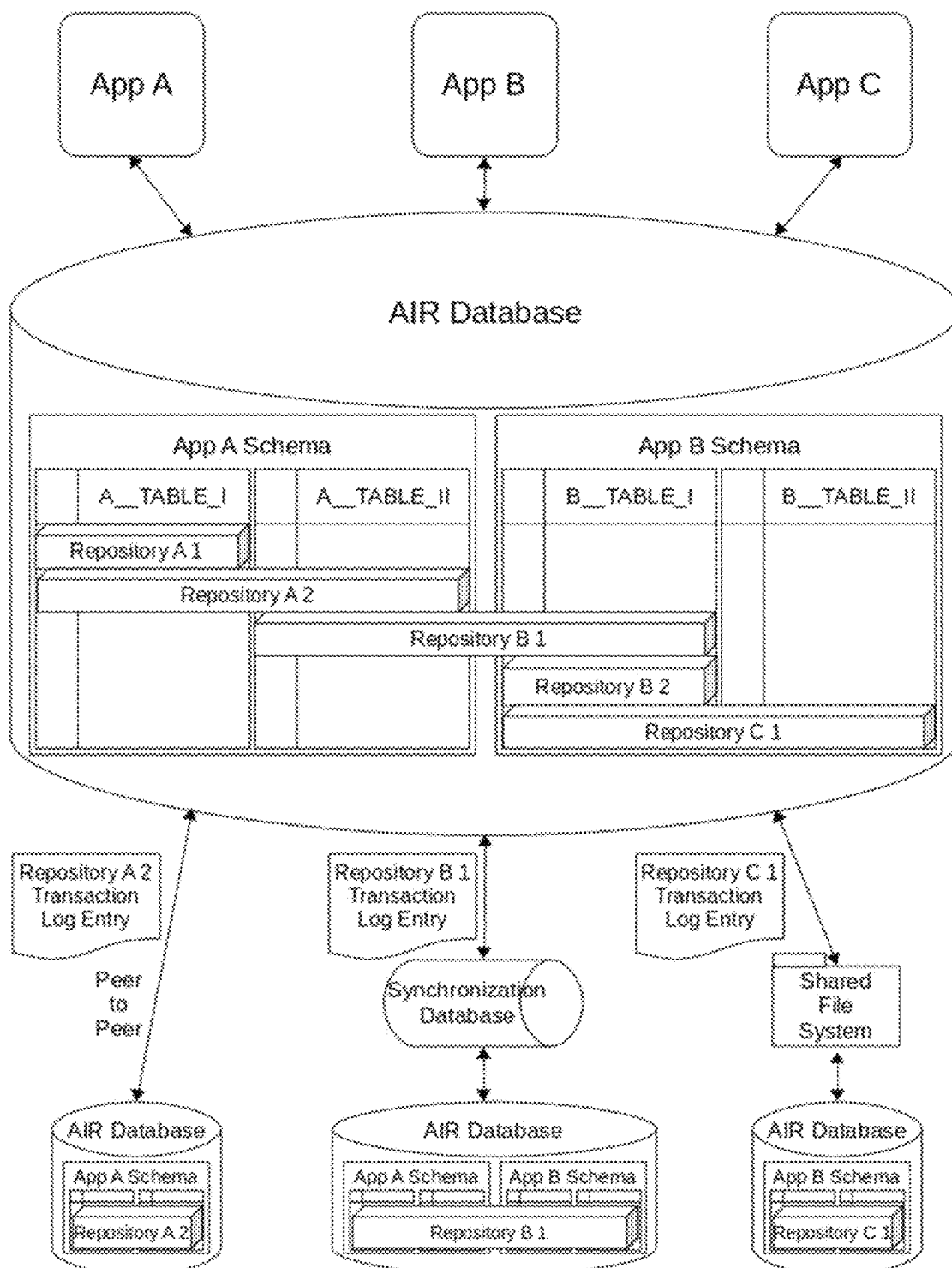
FIG. 2 shows an example AIR database.

FIG. 2 shows an example AIR database. The example AIR Database includes a database engine (such us a standard relational database) and additional logic for communicating with client applications, communicating with other AIR databases and maintaining internal state. AIR Databases may communicate with each other directly or via mechanisms such as a shared file system or a synchronization database server.

Data in AIR Databases is grouped into Repositories. A Repository is a collection of records (table rows) across any number of tables. All repository records are identified by Repository Id, Actor Id and Actor Record Id. Actor is a specific user on a specific AIR database. Combination of Repository Id, Actor and Actor Record Id are guaranteed to be unique within an AIR system. Once assigned, Ids cannot be updated, which guarantees fast "by Id" modification operations. Repository records reference records in other tables via (relational database) composite keys, which include the three keys described above. Repositories may reference other repositories. Circular dependencies between repositories are possible. Repositories may be fine grained, time bound and limited to a particular shareable unit of knowledge, though exceptions are possible.

Repositories may be grouped by hierarchies and labels. Definitions of hierarchies and labels are themselves stored in repositories and can be shared. Any grouping arrangement is possible. For example, hierarchies and labels can be defined in dedicated repositories that include references to the repositories grouped under them. Also, grouped repositories themselves can include references to the hierarchies and labels that they are grouped by. Hierarchies and labels may be published for all applications and users to use. Applications may publish their own hierarchies and labels and may request user to give access to (all or part of) user's hierarchies and labels.

AIR Databases can store any number of repositories. Each AIR database is a fully functional relational database including exactly the data that its user(s) have chosen to place into it. Additional repositories can be archived and may be retrieved from archives by an AIR database at any point. Any repository can be removed from an AIR Database at any time. AIR Database may disable referential integrity to allow Repositories it includes to reference Repositories it does not have.

Repositories are modified in transactions. Client applications generate database wide transactions which are then split up into per-Repository transactions. One or more modification statements may exist in a Repository transaction. All operations in Repository transactions are always performed by unique record identifiers. An operation specified by the Client may not include unique identifiers hence AIR Database converts all modification operations into individual "by Id" modification operations.

Repositories are shared between users. Users can be invited into a repository by the user owning the repository or any number of users granted the privilege to invite other users into a given repository. Users join a given repository and add modifications to it as Actors. Repository privileges are maintained in the metadata of those repositories. Metadata of repositories is shared using the same transaction mechanism as regular repository data.

All changes made to a given Repository are recorded in a Transaction Log with entries usually ordered by time of synchronization (which can be determined in various ways, depending on sharing mechanism and configuration). AIR databases communicate changes to a given Repository by exchanging entries of its Transaction Log. Repository Transaction Log entries are sent by AIR databases that generate them and are applied locally by the receiving AIR databases. A state of a given Repository may be different on different AIR Databases but is guaranteed to be "eventually consistent" across all databases. An archived Repository is the collection of all Transaction Log entries for that Repository, ordered by time of synchronization. To load a Repository from an archive an AIR Database re-executes all operations in the archived Transaction Log (in order of synchronization).

To ensure security, all Transaction Log entries may be encrypted using a repository specific symmetric encryption key. Repository symmetric encryption keys can be distributed via secure means with use of receiving Actor's public key to encrypt them. To ensure authenticity, all Transaction Log entries ca be signed with Actor's private key. Encrypted Transaction Log entries may also be signed by the calling application to ensure authenticity of the acting application.

Any number of applications from any number of different publishers may use an AIR database. Applications provide schemas to the AIR databases. Schemas can be distributed directly from an application or via a publishing platform. Applications may store records in their own schemas or in schemas of other applications. Applications may allow other applications to use any part of their schemas for any type of standard CRUD (Create, Read Update, Delete) operations. Applications can grant access privileges to other applications and revoke those privileges from other applications at any time. Applications may use wildcards in the "access and modification" rules to specify groups of applications, groups of database tables and columns or groups of users granted permissions (for any type of operation). Grants can be maintained in dedicated grant repositories and may be distributed by applications directly.

Schemas can be upgraded at any given point in time. AIR Databases may have full backward compatibility across schema versions for Read operations. An application using an older version of the schema can be able to read from a newer version of the schema. Backward read compatibility can be maintained via database views that mimic older versions of the schema. Application publishers may provide conversion code (securely executed) that upgrades data in AIR databases to new versions. They may also provide code that upgrades older versions of operations in incoming transaction logs (before the operations are applied to the databases). All operations (from applications and from transaction logs) are always validated for security and consistency.

Users grant access and modification privileges for their repositories to other users and applications. These grants can be done on individual repository basis or on a grouping of repositories. Wildcards can specify any group of users or applications with permissions (for any type of operation). Users can specify sharing settings in metadata of Repositories.

Figure 3:
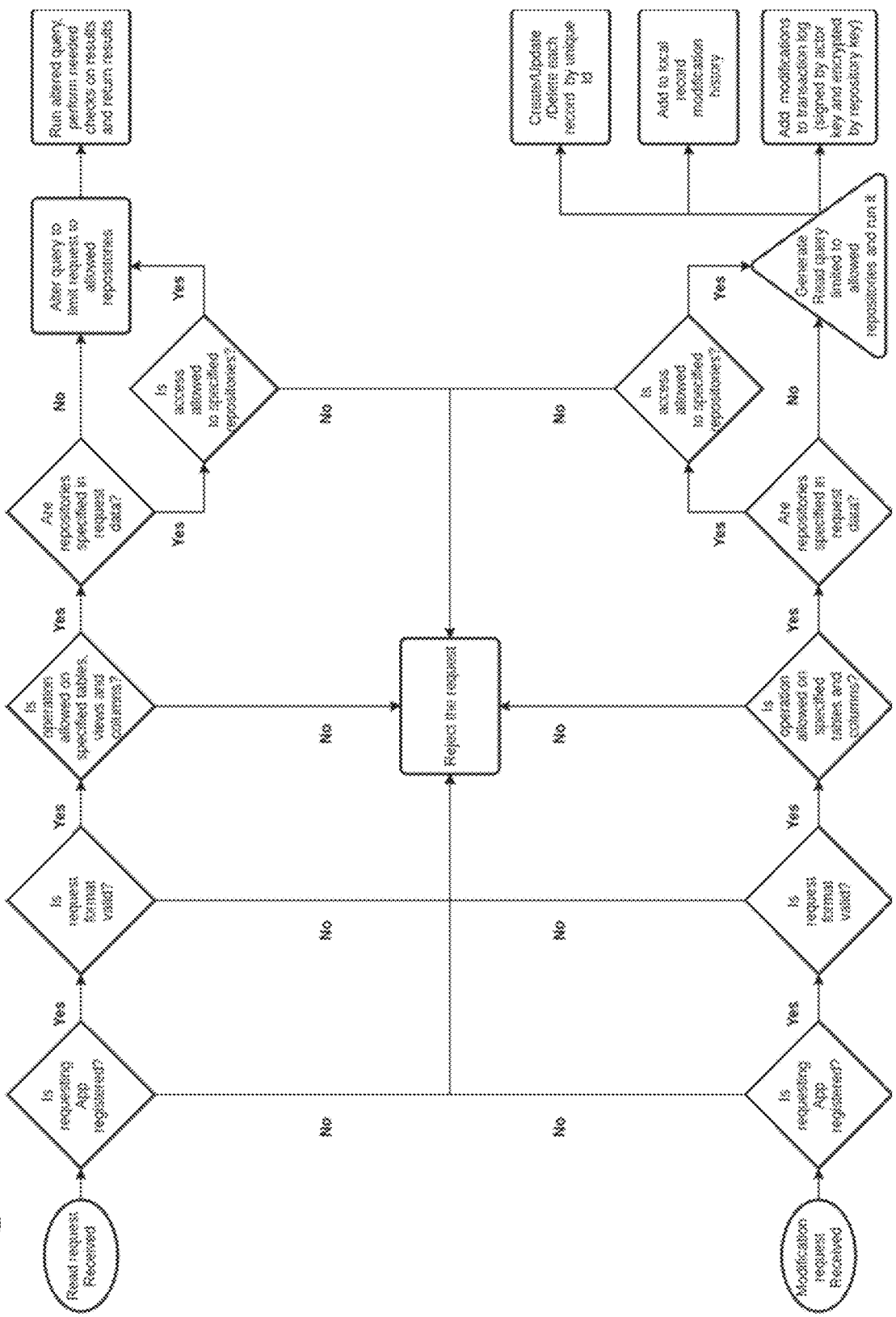
FIG. 3 is a process flow diagram showing example operations for Read requests and Modification requests of an example AIR database.

FIG. 3 is a process flow diagram showing example operations for Read requests and Modification requests of an example AIR database. Users use AIR databases via applications. All Read and Modification requests coming from Applications are checked. AIR first makes sure that the calling application is registered and allowed to access AIR for the specified operation. Then AIR verifies the validity of request. Then it checks if the calling application is allowed to use (for the specified operation) the tables (or views, for read requests) and columns specified in the request. For this operation AIR uses access rules provided by the publisher(s) of the schemas with the specified tables/views and columns. Then if any repositories are explicitly referenced in a request, AIR checks if the calling application and user are allowed to reference those repositories (for the specified operation).

In an example, for Read requests (once all of the above checks are performed), AIR alters the read query and joins it with repository reference tables via Ids of accessing application and Actor. This limits the query to only the repositories that the calling application is allowed to see for read operations. It also limits the query to only the repositories that the calling user is allowed to see for read operations. Then AIR runs the altered query. The results of the query can then be checked in an example, to further make sure that only data from the allowed repositories is returned. Finally, the results are returned to the calling application.

For Modification requests (once all of the checks common with Read operations are performed) AIR generates a read query, using the same limitation mechanisms as implemented for the Read requests. This query returns all of the records to be modified (Created, Updated or Deleted). For Create requests that explicitly specify all of the data and Ids this step is not performed (as it is not needed). Then AIR performs the corresponding modification in the database for each record (returned by the Read query or explicitly specified). One modification is run for each record (with grouping optimizations possible). Then AIR records all record modifications (with old values of the record, if any) in local record modification history. Local history is grouped by database transaction, repository transaction, operation, and modified entity (operation execution order is recorded as well). Finally, entries describing the modification are added to the Transaction Logs of the repositories modified by the operation. One Transaction Log entry is created per database transaction, per repository. Each Transaction Log entry may be signed by the Actor (and application, once encrypted) for authenticity and may be encrypted for privacy (by a symmetric key, which may be specific to a given repository). Actor's public/private key pair is specific to the acting AIR database and is stored in the AIR database (with private key not accessible by any other entities). Applications may generate a public/private key pair specific to the device on which it runs (related to a master application key via a standard cryptographic chain of trust), and may store it in any way that prevents other entities from learning the private key.

Figure 4:
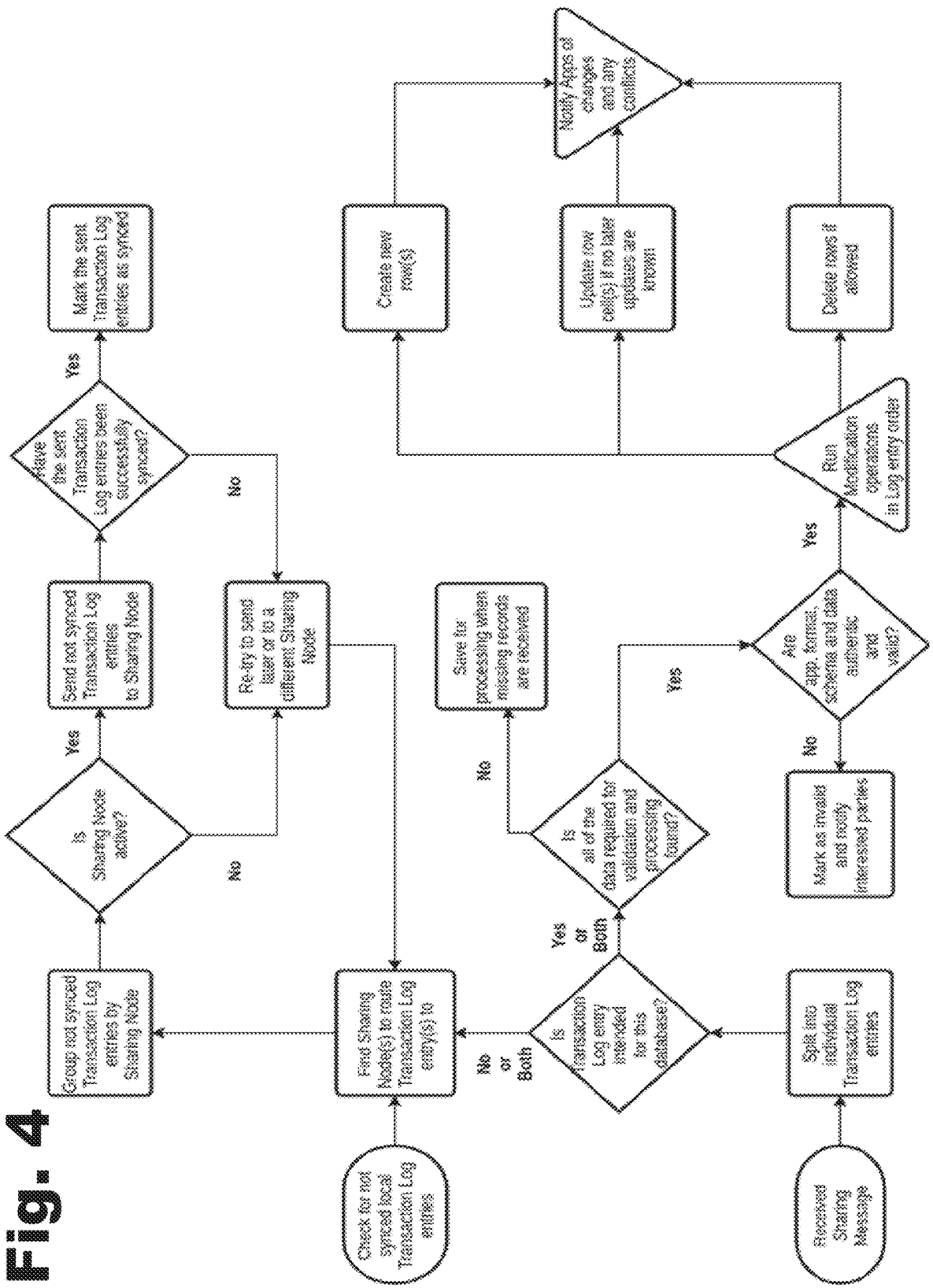
FIG. 4 is a process flow diagram showing example operations for synchronizing an example AIR database.

FIG. 4 is a process flow diagram showing example operations for synchronizing an example AIR database. Every AIR database can act as a standalone database for any period of time. When a given Repository in it is shared, AIR database acts as a Sharing Node. A Sharing Node shares data with other AIR databases (directly or indirectly). It is responsible for sending out messages including Transaction Log entries for the shared Repository to the correct Sharing Nodes (via the sharing mechanism(s) chosen for that Repository). It is also responsible for receiving messages including Transaction Log entries for the Repositories it shares. In peer-to-peer sharing configurations it may also be responsible for maintaining routing configuration and for routing the messages (including Transaction Log entries) to the appropriate Sharing Nodes.

Periodically (or as a response to an appropriate event) an AIR Database checks its locally generated Transaction Log entries for any that haven't been synchronized to other appropriate AIR Databases. If such entries are found then AIR looks up active Sharing Nodes to which these entries can be routed to. Then it groups the Transaction Logs to be synced to these Sharing Node(s) (a given Transaction Log may be sent to multiple Sharing Nodes) and sends them in sharing messages. Then, for each message, (either immediately upon confirming successful reception of the message, or after additional steps are performed to ensure propagation of changes to other Sharing Nodes or a sharing database server) the Transaction Log entries are determined to be synced (or not). If the Sharing Nodes cannot come to an agreement on marking the entries in question as being synced, then these entries may be resent (from any Sharing Nodes that have them). If an agreement on the synced status is achieved the Transaction Log entries in question are marked as synced.

When an AIR Database receives sharing messages it splits them into individual Transaction Log entries. Then for each entry AIR Database determines if this entry is intended for its local storage. If the message isn't intended for this database (or if it is intended for this database and is expected to be forwarded to other AIR Databases as well) then the message is shared with other AIR databases (as described in the paragraph above). If the message is intended for this database then it is decrypted (where applicable), its authenticity is checked (where applicable) and is validated using a process alike to the validation of local modification operations. If all of the data to process an incoming Transaction Log entry is found (data for validation, the data being updated or deleted, etc.), then all received entries for a given Repository are run in the order provided. For Update operations, specific record values (table row cells) are updated to the received values only if no subsequent updates to these values have been made. For Delete operations, records are deleted if they haven't been subsequently updated or if configuration is specified allowing deletes of subsequently updated records. Finally, Applications subscribed to receive notifications of appropriate data changes are notified of the corresponding changes and (and of any resulting conflicts and conflict resolutions).

Repositories in Detail.

The idea behind repositories is that of a single shareable "unit of knowledge". A repository can include a related set of facts about a particular topic. A repository can include everything to fully describe its unit of knowledge. If the repository's unit of knowledge depends on other units of knowledge then it can reference them from other repositories.

Repositories include of a number of records (or rows) spread across multiple tables (a standard relational database concept, conceptually akin to spreadsheets). Any number of records in any number of tables can constitute a repository. The tables with the records can relate to each other in any number of ways allowed by relational databases.

FIGS. 5-8 show example tables of an example AIR database. A basic example (on which other types of relations are built in a relational database) is where Table II is related to Table I by including the Id of Table I.

Figure 5:
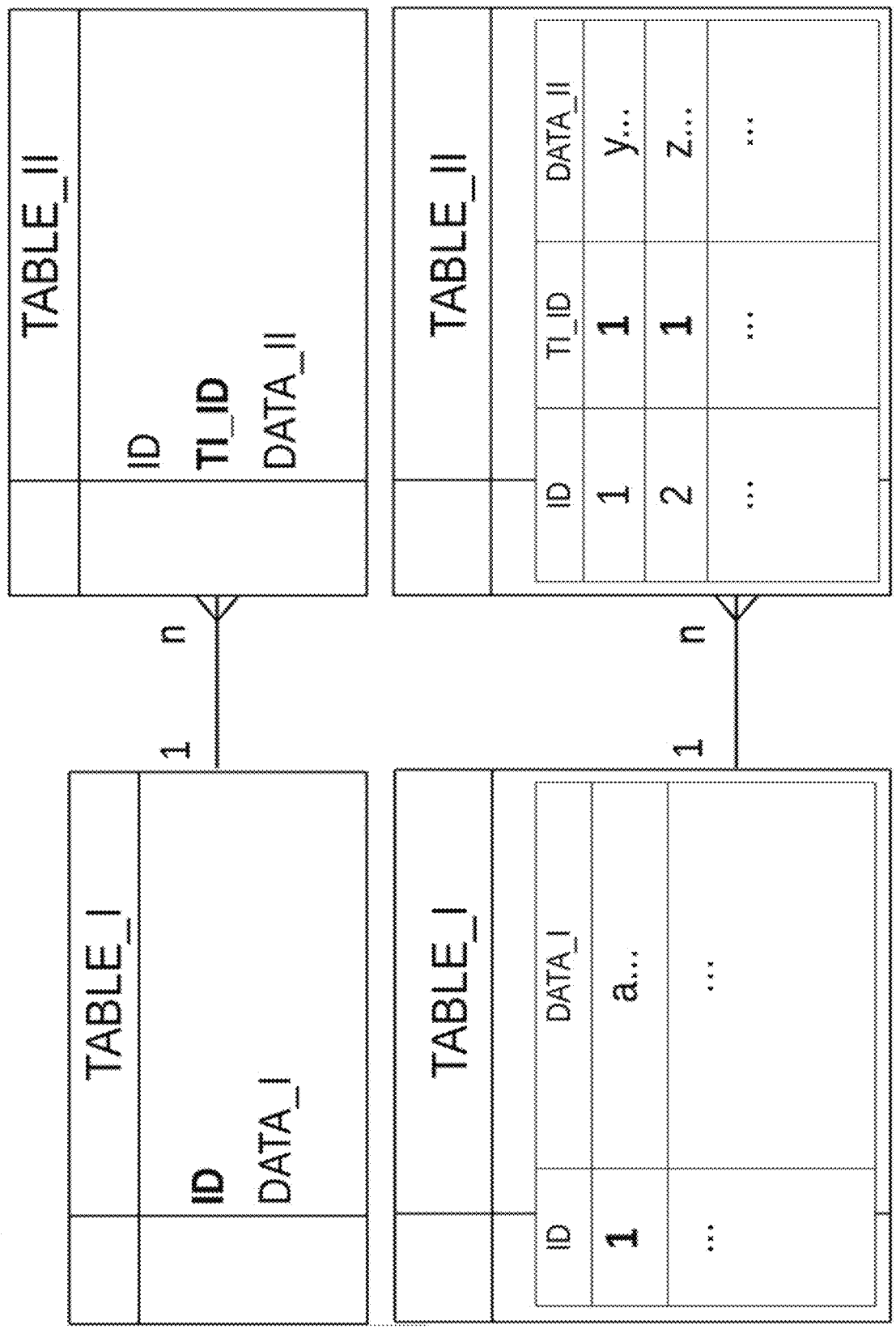

In the example shown in FIG. 5, a single record in Table I can be referenced in one or more records of Table II. In relational databases this type of relation is known as a "1 to n" or "One to Many" relation (it is the basis of additional relation types "One to One" and "Many to Many").

Repository Actors.

Each repository can be modified by "Repository Actors" or just Actors. This is entity that represents a given user on a given AIR database. If a given user modifies a repository from two different AIR databases then she acts as two separate "Repository Actors" for that repository. The concept of an Actor uniquely identifies entities during synchronization of repositories. A change that a particular user makes on one AIR database is eventually be synced to the other AIR database which that user uses. When that sync happens the receiving AIR Database is aware of the fact that the specified user made modifications from the sending AIR Database because it maps that user+database combination as a specific Actor.

Repository Records.

Records from multiple repositories are stored in the same tables. A repository record is uniquely identified by a combination of Repository Id, Repository Actor Id and Actor Record Id. An Actor Record Id is unique across all rows (of the specified Table) created by an Actor in a given Repository.

So, there may not be two rows in the same table that have the same Repository Id, Actor Id and Actor Record Id, as shown in FIG. 6.

While Actor Ids are unique to a given repository, in a given relational database (for performance and other reasons) it may make sense to give a unique Actor Id to each Actor across the entire database. For the same reasons it may make sense to give a unique Actor Record Id to every record in a given table, as shown in FIG. 7.

Note, that a given user using the same AIR database is considered to be a different Actor in different Repositories. Alternatively, for identification purposes, AIR databases may choose to treat all modifications across all Repositories coming from the same User+AIR Database combination as coming from the same Actor. In an example, there is a way to uniquely identify every record coming from every Actor. AIR may be implemented in a distributed environment, where there is no central authority that can uniquely identify AIR Databases. AIR users may or may not be centrally (or globally) identifiable.

Virtual Repositories.

Within a relational database repository is a virtual concept. Each repository is a group of records in any number of tables, as shown in FIG. 8.

Hence, AIR is a virtual data management system. It uses a relational database on each AIR installation to maintain any number of virtual data repositories. These repositories are then shared between different AIR Databases via logs of transactions specific to each repository. A transaction is another database concept that groups a number of modifications to a database in an atomic, consistent, isolated and durable (ACID) way. Every AIR transaction is isolated to a particular repository.

Figure 9:
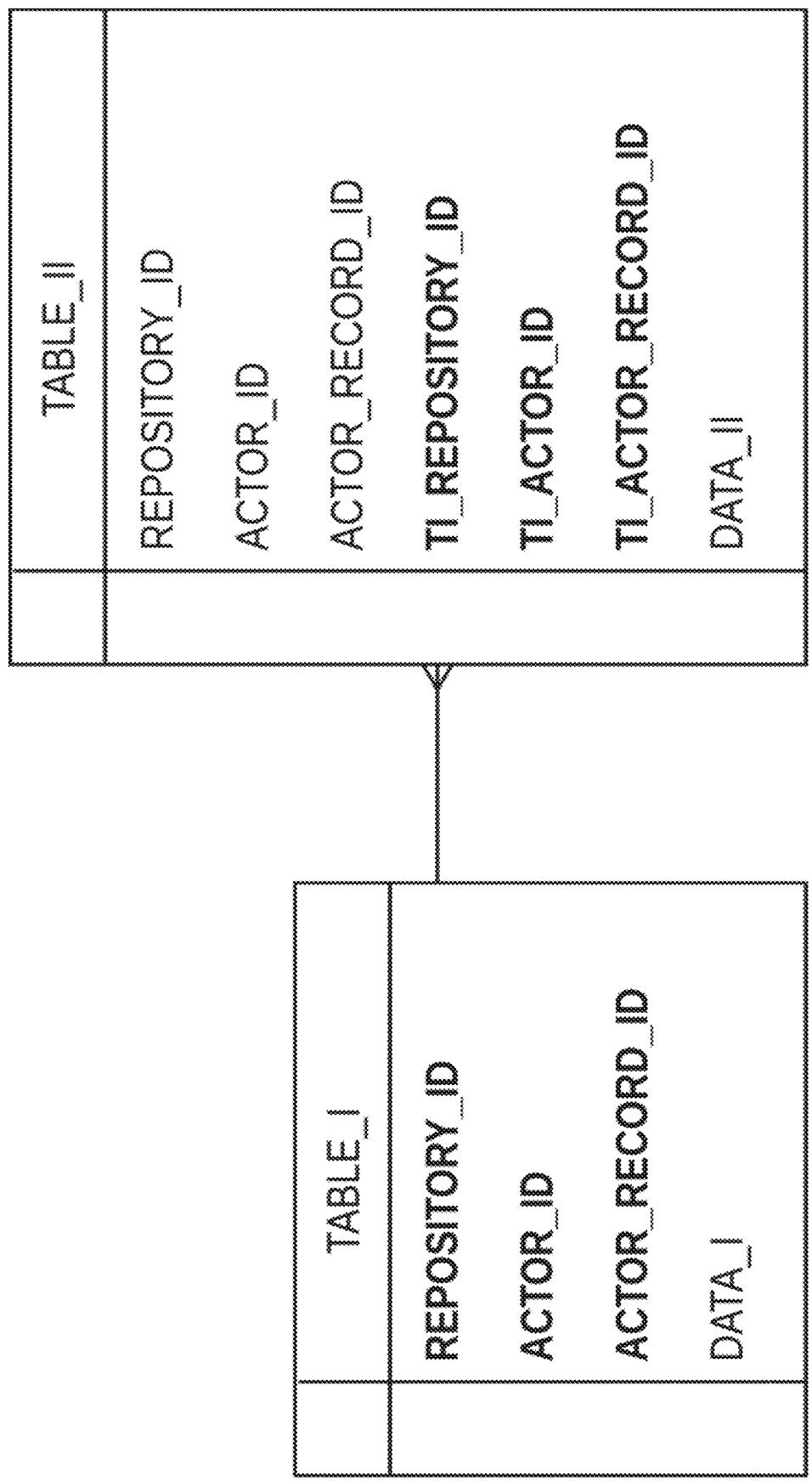
FIGS. 9-10 show example records in tables of AIR databases as they may relate to each other across tables.
Figure 10:
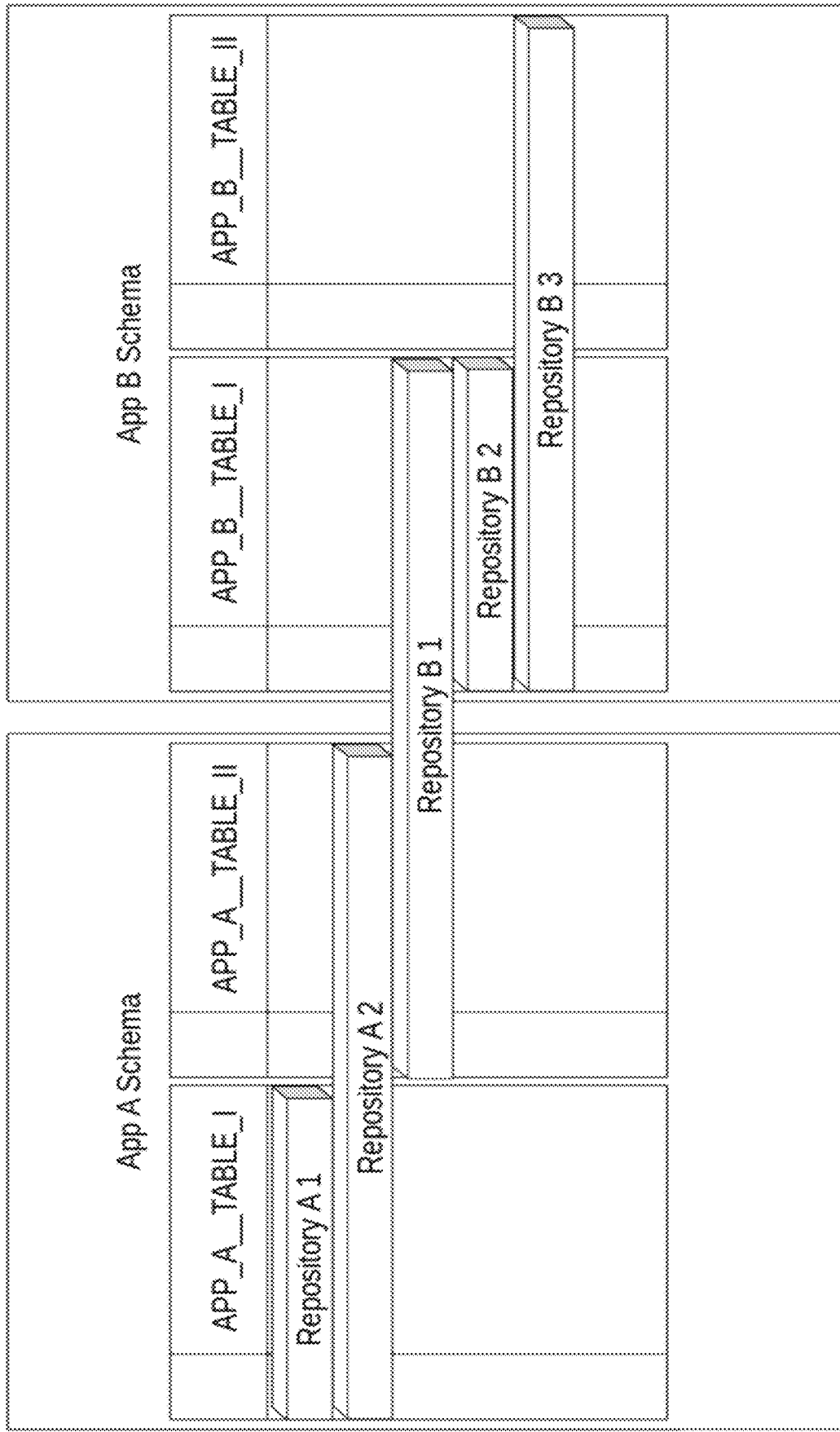

FIGS. 9-10 show example records in tables of AIR databases as they may relate to each other across tables. In the diagrams, shorter abbreviations of REPOSITORY_ID, ACTOR_ID and ACTOR_RECORD_ID may be implemented.

Repository Records Across Tables.

Just like records in tables of regular relational databases, records in tables of AIR databases can also relate to each other across tables. All AIR records are identified by a "composite key" (a relational database concept) including REPOSITORY_ID, REPOSITORY_ACTOR_ID (or just ACTOR_ID for brevity) and ACTOR_RECORD_ID.

Repositories Across Application Schemas.

A repository stores data in one or more tables. Multiple repositories are stored in a "database" (often implemented with a single user on a personal device, but multi-user repositories are supported). This database is available for any number of web sites and apps to install their "schemas" in it. Schemas are comprised of any number of "tables" that can be related to each other using standard relational database concepts. A repository may overlap schema boundaries.

Hence, a given repository may be accessed from multiple sites/apps. In addition to that sites and apps may grant access to tables to other applications.

Figure 11:
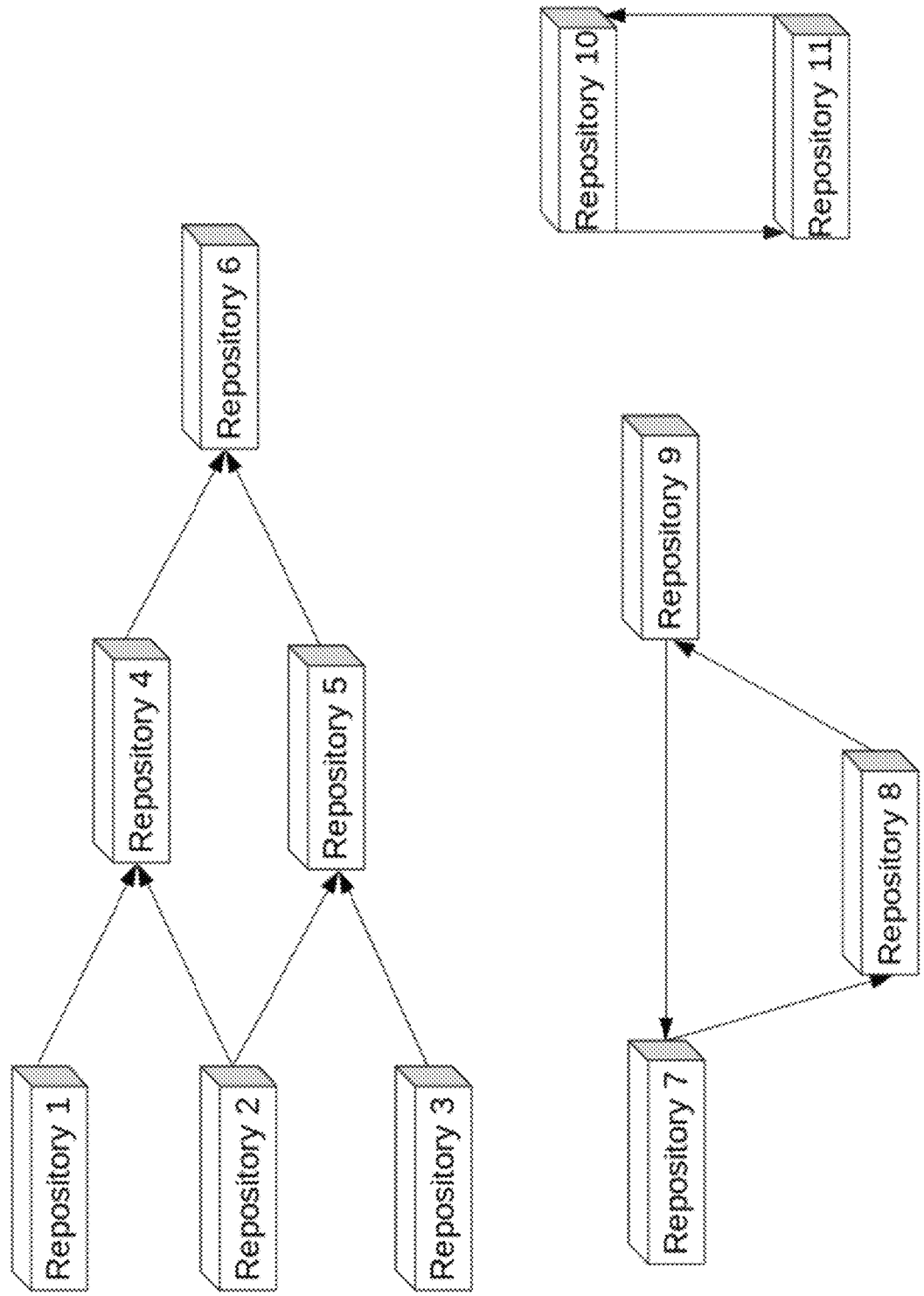
FIG. 11 illustrates repositories which reference each other.

FIG. 11 illustrates repositories which reference each other. Repositories may reference each other in any arrangements (though tight circular references are usually a sign if improper data management).

AIR is a system that distributed between any number of databases. Each database can operate off-line and constitutes a complete AIR installation. An AIR database can work as a standalone system if its user(s) choose(s) to for it to do so. However, a core feature of AIR is its ability to work across databases.

Every repository in AIR is identified by a unique Id. And every record in each repository is also identified by a unique Id. In a distributed environment, where records can be simultaneously created on multiple databases, globally unique identifiers are usually implemented. There are existing mechanisms for handling creation of globally unique ids. The standard mechanism is "universally unique identifier"

or UUID. UUID are unique across space and time. The UUID standard uses a unique MAC address of a node on the network as the basis of generated Ids. However, AIR can run in environments where the MAC address is not known. For example, if AIR runs in a web browser it won't have access to the MAC address of the underlying device. Also, it is possible for some devices running AIR not to have a MAC address at all.

To get around this limitation AIR comes up with its own unique-id-assigning scheme for both Repositories, Repository Actors, tables and all of the records within a Repository. The basic principal behind the scheme is that every user of AIR is going to have a unique global identifier (like an "e-mail"). In some environments, it may be sufficient for the user to have an Id unique to that environment. Then a number of levels of identifiers are implemented within the Id. All sub-identifiers on a given level are unique to the previous (higher) level.

For some environments, it is possible for the users of AIR not to have globally unique identifiers (and it is not possible to determine Ids unique within the environment). In an example, alternative schemes can be implemented to come up with an identifier that can be reasonably assumed to uniquely identify a user, either globally or within a specific AIR system.

Global Repository Id.

The first record (in the Transaction Log) of a given repository has the repository id in it. Each repository is globally uniquely identified by a combination of Global Repository Identifiers, as shown for example in Table 1.

TABLE 1

Global Repository Identifiers

| Identifier | Description |
|---|---|
| Id of User creating the Repository | A globally unique identifier of the creating user, like an email (e.g., "myemail@server.com") |
| Name of the | Likely unique for a user, like the name given to the database by the user that created it (e.g., "My New Phone") plus the |

TABLE 1-continued

Global Repository Identifiers

| Identifier | Description |
|---|---|
| Database from which the Repository is created. | timestamp of creation of the database (e.g., 1514613370850 - standard Unix time, in milliseconds since Jan 1, 1970 00:00.000). |
| Database Second Id | A second Id for the database (determined when the database is created), like a random number (e.g., 0.18851049027368938) |
| Repository Ordered Id | Unique for the database that created the repository, e.g., timestamp of a creation of the repository (e.g., 1514940913659 - standard Unix time, in milliseconds since Jan 1, 1970 00:00.000) |
| Repository Random Id | A randomly generated identifier, like a random number (e.g., 0.2679244053479044) |

With the above example, for a repository id collision to occur the same user has to create two repositories on the same millisecond. This has to be done from two different databases having the same Name and Second Id. On top of that the Repository Random Id (that uses hardware specific seeding for random number generation) generated on both of those databases also have to match. Hence a collision of repository identifiers is considered to be practically impossible.

When an AIR database joins a repository (by receiving the first Transaction Log entry that Repository, on behalf of an Actor) it checks the Repository Identifier against identifiers of all Repositories it includes. If that database detects a Repository Id collision (when it receives the first record that Repository), it writes a new "re-Id" record into the repository with a new Repository Random Id for that repository. Since the conflict will be limited to only one user and only two databases, re-id request for a repository has limited impact. To fix it, the databases which created the repositories with conflicting Ids can simply regenerate Repository Random Ids, keeping all the rest of the information the same. "Re-Id" process can repeat.

Internally AIR database maps the Repository Identifier to a numeric identifier unique within that database, as shown for example in Table 2.

TABLE 2

REPOSITORY_ID_MAPPINGS

| REPOSITORY_ID | CREATING_USER_ID | CREATING_DATABASE_NAME | DATABASE_SECOND_ID |
|---|---|---|---|
| 1 | myemail@server.com | My New Phone 1514613370850 | 0.18851049027368938 |
| 2 | myemail@server.com | My New Phone 1514613370850 | 0.18851049027368938 |
| 3 | youremail@server.com | Your New Phone 1514942350817 | 0.04892777912719204 |

| REPOSITORY_ID | REPOSITORY_ORDERED_ID | REPOSITORY_RANDOM_ID |
|---|---|---|
| 1 | 1514940913659 | 0.2679244053479044 |
| 2 | 1514942256633 | 0.8104144774931419 |
| 3 | 1514942373759 | 0.9519681726763152 |

This Repository Id mapping table provides a way to map an Id internally unique to an AIR database to a Global Repository Id.

Numeric identifiers save a lot of space vs the composite identifiers. This is important for the smaller devices running AIR, which will have limited storage capacities. It also reduces data duplication, hence "normalizing" the data (a relational database concept).

Additional tables may be implemented to store records that uniquely identify databases (unique to a user, or otherwise) and to store records that uniquely identify users. They provide a way to map database and user Ids internally unique to an AIR database to their Global versions.

Joining Actor Id.

AIR repositories are modified by "Repository Actors". A Repository Actor a is a user on a given database. When an Actor joins a Repository the first thing it does it writes a record into that repository that uniquely identifies it (within that repository). This Id may be a combination of Ids, as shown for example in Table 3.

TABLE 3

| Repository Actor Identifier | |
|---|---|
| Id of the User joining the Repository. | A globally (or an environment) unique identifier, like an email (e.g., "myemail@server.com"). This is the Id of the User that created the record. |
| Name of the Database from which the Repository is joined. | Likely unique for a user, like the name given to the database by the user that created it (e.g., "My New Phone") plus the timestamp of creation of the database (e.g., 1514613370850 - standard Unix time, in milliseconds since Jan 1, 1970 00:00.000). |
| Second Id of the joining Database | A second Id for the database (determined when the database is created), like a random number (e.g., 0.9489414842230646) |
| Actor Random Id | A randomly generated identifier, like a random number (e.g., 0.2679244053479044). Generated for every repository an actor joins. |

It is possible for the same user to join the repository multiple times as long as they join from different databases. An AIR Database is aware of its user(s) joining all repositories which it includes and does not allow multiple join operations by the same Actor for any given Repository. It is possible for multiple users to join a repository from the same database.

Theoretically a Repository Actor Id collision can occur when two Actors have the same Id (in practice this will likely never happen). This can happen if the same user joins a given Repository from two different databases that have the same Name and Second Id and generated the same Actor Random Id. Whenever a repository join operation is processed by an AIR database it checks the Id of the joining Actor against all of the ids of Actors who already joined the Repository in question. Hence such a collision is detected as soon as the join operation by the second Actor (with the colliding id) is processed by any AIR database including the Repository in question. When that happens, all records for this Repository belonging to both Actors with the colliding Ids are quarantined. The Actors then re-join and re-write their records with a new Actor Random Id. This process can repeat.

Internally AIR database maps the Repository Actor Identifier to a numeric identifier unique within that database, as shown for example in Table 4.

TABLE 4

REPOSITORY_ACTOR_ID_MAPPINGS Table

| ACTOR_ID | REPOSITORY_ID | JOINING_USER_ID | JOINING_DATABASE_NAME |
|---|---|---|---|
| 1 | 1 | myemail@server.com | My New Phone 1514613370850 |
| 2 | 1 | youremail@server.com | Your New Phone 1514942350817 |
| 3 | 2 | myemail@server.com | My New Phone 1514613370850 |

| ACTOR_ID | DATABASE_SECOND_ID | ACTOR_RANDOM_ID |
|---|---|---|
| 1 | 0.18851049027368938 | 0.2679244053479044 |
| 2 | 0.04892777912719204 | 0.8809613535677516 |
| 3 | 0.18851049027368938 | 0.5005956211493792 |

Alternatively, this numeric identifier can be unique to a repository, this saves storage space, but may implement additional processing or memory (like a running an additional query or keeping an in-memory data structure) when creating these ids, as shown for example in Table 5.

TABLE 5

REPOSITORY_ACTOR_ID_MAPPINGS Table

| ACTOR_ID | REPOSITORY_ID | JOINING_USER_ID | JOINING_DATABASE_NAME |
|---|---|---|---|
| 1 | 1 | myemail@server.com | My New Phone 1514613370850 |
| 2 | 1 | youremail@server.com | Your New Phone 1514942350817 |

TABLE 5-continued

| REPOSITORY_ACTOR_ID_MAPPINGS Table | | | |
|---|---|---|---|
| 1 | 2 | myemail@server.com | My New Phone 1514613370850 |

| ACTOR_ID | REPOSITORY_ID | DATABASE_SECOND_ID | ACTOR_RANDOM_ID |
|---|---|---|---|
| 1 | 1 | 0.18851049027368938 | 0.2679244053479044 |
| 2 | 1 | 0.04892777912719204 | 0.8809613535677516 |
| 1 | 2 | 0.18851049027368938 | 0.5005956211493792 |

Schema Id.

Within a repository all records are stored in tables. All tables are grouped into schemas (a standard relational database concept). All schemas come from schema publishers (usually the same as the application publishers). Each schema has a globally unique Id with a combination of Schema Identifiers, as shown for example in Table 6.

TABLE 6

| Identifiers | |
|---|---|
| Identifier | Description |
| Publisher Name | A globally unique identifier, like a domain name (e.g., "myApps.com"). This is the name of the publisher to which the schema including the record belongs. |
| Schema Name | Id of schema unique for a publisher, like schema name (e.g., "App A"). This is the name of the schema to which the table including the record belongs. Publisher may not have two schemas with the same name. |

A given publisher may not have multiple schemas with the same name. And a given schema may not have two tables with the same name. There is no central mechanism that enforces a given publisher not having the same schema being published twice with unrelated contents. If an AIR database retrieves a schema for a given publisher and determines that there is a naming conflict with an already installed schema, it will not install the retrieved schema. It is up to the publisher to ensure that they never publish two schemas with the same name.

AIR can determine a schema naming conflict by comparing the published address (e.g. URL) of the retrieved schema with its name and publisher. If for the same publisher multiple addresses have the same schema name then there is a conflict, as shown for example in Table 7.

TABLE 7

| Address and Publisher | | |
|---|---|---|
| Address | Publisher | Schema |
| https://registry.npmjs.com/AppA | myApps.com | App A |
| https://registry.npmjs.com/AppA2 | myApps.com | App A |

Each table has a globally unique Table Id which is a combination of table Identifiers, as shown for example in Table 8.

TABLE 8

| Table Id | |
|---|---|
| Identifier | Description |
| Publisher Name | A globally unique identifier, like a domain name (e.g., "myApps.com"). This is the name of the publisher to which the schema belongs. |
| Schema Name | Id of schema unique for a publisher, like schema name (e.g., "App A"). This is the name of the schema to which the table belongs. Publisher may not have two schemas with the same name. |
| Table Name | Unique within the schema, like table name (e.g., "TABLE_II"). This is the name of the table including the record. |

At the time of schema publishing AIR Development Tools enforce that no tables within a given schema have the same name.

When a given schema is loaded from a given publisher a table is created in the database in a way that can globally identify it. A simple way to do so might be to include all of the Table Identifier components into the name of the table and replace any characters that are not valid for the underlying database AIR is using. For example, that table name might be:
MYAPPS_COM_APP_A_TABLE_II For simplicity, this document refers to tables by Schema Name & Table Name only (within this document publishers do not share schema name).

Record Id.

Any record in a given repository is stored as row in a particular table. All such records are uniquely identified by a key. For AIR repository records it is a "composite key" which is mapped to a combination of record Identifiers, as shown for example in Table 9.

TABLE 9

| Record Id | |
|---|---|
| Identifier | Description |
| REPOSITORY_ID | A numeric identifier for the Repository, unique within an AIR database. |
| ACTOR_ID | A numeric identifier for the Repository Actor, unique within an AIR database. |
| ACTOR_RECORD_ID | Unique per an Actor, within the table in which the record lives (e.g., 1). The database that created the record can maintain a number that is incremented with every record created in a given table (known as a "sequence" - a relation database concept). This is that number for the record in question. It is unique within a repository because it is associated with the specific Actor and that created the record (and that database id is included in the record identifier). |

ACTOR_RECORD_ID is usually unique to a table in the AIR database that created the record. Relational databases often employ "sequences" for tables—a counter maintained by the database that provides a unique id for every record in a given table (for that database). Such a sequence can be employed by an AIR database to generate unique ids. The combination of ACTOR_ID and ACTOR_RECORD_ID provides record identifiers unique across any number of AIR databases (that create records for a particular repository). Other techniques are also acceptable, as long as the combination of REPOSITORY_ID, ACTOR_ID and ACTOR_RECORD_ID can uniquely identify a record in a given table.

An example of a records with Ids unique within a repository (for a particular table), as shown for example in Table 10.

TABLE 10

Records with Ids

| REPOSITORY_ID | ACTOR_ID | ACTOR_RECORD_ID | DATA |
|---|---|---|---|
| 1 | 1 | 1 | a . . . |
| 1 | 2 | 1 | b . . . |
| 1 | 1 | 2 | c . . . |
| 1 | 1 | 3 | d . . . |
| 2 | 1 | 4 | e . . . |
| 2 | 2 | 2 | f . . . |

Records are split up into tables. Hence the Publisher Id, Schema Id and Table Id are not stored in every record.

Repository Representations.

All repositories have two different representations, as shown for example in Table 11.

TABLE 11

Representations

| Representation | Type | Description |
|---|---|---|
| Archived | Serialized | A number of Transaction Log entries, in order of creation |
| Live | In a database | A number of related rows across a number of tables |

Archived Representation.

An archived repository version includes any number of individual "transaction" entries, ordered by creation time (which is either centrally determined or negotiated). A transaction entry is logged and hence is known as a Transaction Log entry. A transaction is always created by a particular database on behalf of a particular user. A transaction is a collection of a number of distinct transaction operations, as shown for example in Table 12.

TABLE 12

Representations

| Operation type | Description |
|---|---|
| JOIN | joining of this repository by a particular user via a given database |
| CREATE | creation of any number of records in a given table, with unique ids included |
| UPDATE | any number of update operations on individual "rows" in a given table, by Id |
| DELETE | any number of delete operations of individual rows in a given table, by Id |
| . . . | additional operations for repository maintenance |

All operations within a transaction are ordered in the order they can be applied. An example of an archived representation of transaction for Repository X (in JSON), as shown for example in Table 13.

TABLE 13

Example Archived Representations

| Operation or data | Example | Notes |
|---|---|---|
| HEADER | {<br>  repository: {<br>    userId: 'myemail@server.com',<br>    databaseName: 'My New Phone : 1514613370850',<br>    databaseSecondId: 0.18851049027368938,<br>    repositoryOrderedId: 15149409136.59,<br>    repositoryRandomId: 0.2679244053479044<br>  },<br>  actor: {<br>    userId: 'myemail@server.com',<br>    databaseName: 'My New Phone : 1514613370850',<br>    databaseSecondId: 0.18851049027368938,<br>    actorRandomId: 0.2679244053479044<br>  },<br>  ...additionalHeaderData<br>} | Every transaction has a header that describes what Repository is being modified and the Actor who is performing the transaction. Additional information may be provided in the header. |
| CREATE REPOSITORY | {<br>  sharingMethod: 'CENTRAL_SERVER',<br>  sharingServer: 'mySychronizer.com:2345',<br>  creatingPublisher: 'myApps.com',<br>  creatingSchema: 'App A',<br>  creatingSchemaVersion: '1.0.0',<br>  ...additionalCreateRepositoryData<br>} | Every repository has exactly one creation operation recorded. This operation has all the information to re-create the repository from start to end, using applicable schema versions as they were at the time. Additional information may be provided. |
| CREATE | [{<br>  tableInfo: {<br>    inPublisher: 'myApps.com',<br>    inSchema: 'App A',<br>    inSchemaVersion: '1.0.0',<br>    inTable: 'TABLE_IT',<br>  },<br>  columnInfo: [<br>    'ID', ...additionalColumDefinitions<br>  ],<br>  dataInfo: {<br>    data: [<br>      [1, ...dataColumnsOfRecord1],<br>      [2, ...dataColumnsOfRecord2],<br>      ...additionaiRecordsForTableII<br>    ],<br>    ...additionalDataDescriptionInfo<br>  }, | All of the information provided to correctly insert any number of records into any number of tables, as provided by given schema versions (specific to the time of creation). |

TABLE 13-continued

Example Archived Representations

| Operation or data | Example | Notes |
|---|---|---|
| | ...additionalCreateOperationDescriptionInfo },<br>...additionalCreateOperationsInOrder<br>] | |
| ... | ... | Any number of additional operations |

Actual Archived representation of a repository may be more compact, but still include all of the information.

Live Representation.

A live repository version is a collection of records across a number of tables (potentially across schemas). The live representation can use any number of optimization techniques to improve performance and to reduce storage.

For example, "APP_A_TABLE_II" can be referenced in "APP_B_TABLE_I" via relational database foreign key.

Figure 12:
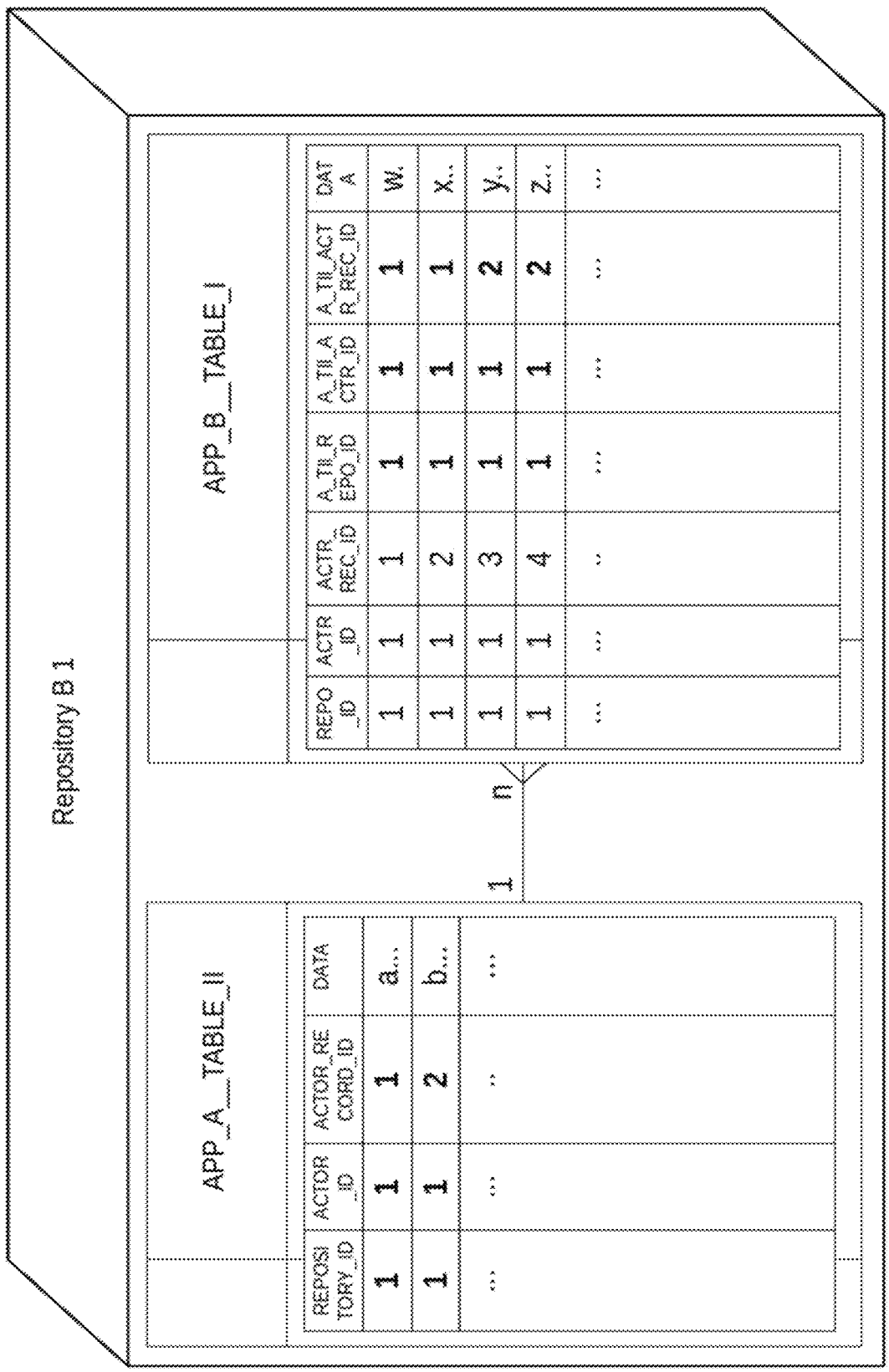

FIGS. 12 and 13 show example relational databases. In FIG. 12, a "One to Many" relation is shown where one record in "APP_A_TABLE_II" can be referenced in may records of "APP_B_TABLE_I", which stores record references to the "APP_A_TABLE_II" in its own records.

References in Local Tables.

AIR databases may include tables that are local to these databases and do not store repository records. AIR shares repositories only and cannot share the records in these local tables. So, it is not possible to have references to local tables in repositories. References to repositories from local tables are allowed, as shown in FIG. 13.

AIR enforces this at schema publishing time when the AIR Development Tools check the schema definitions for local tables and references to them.

Figure 14:
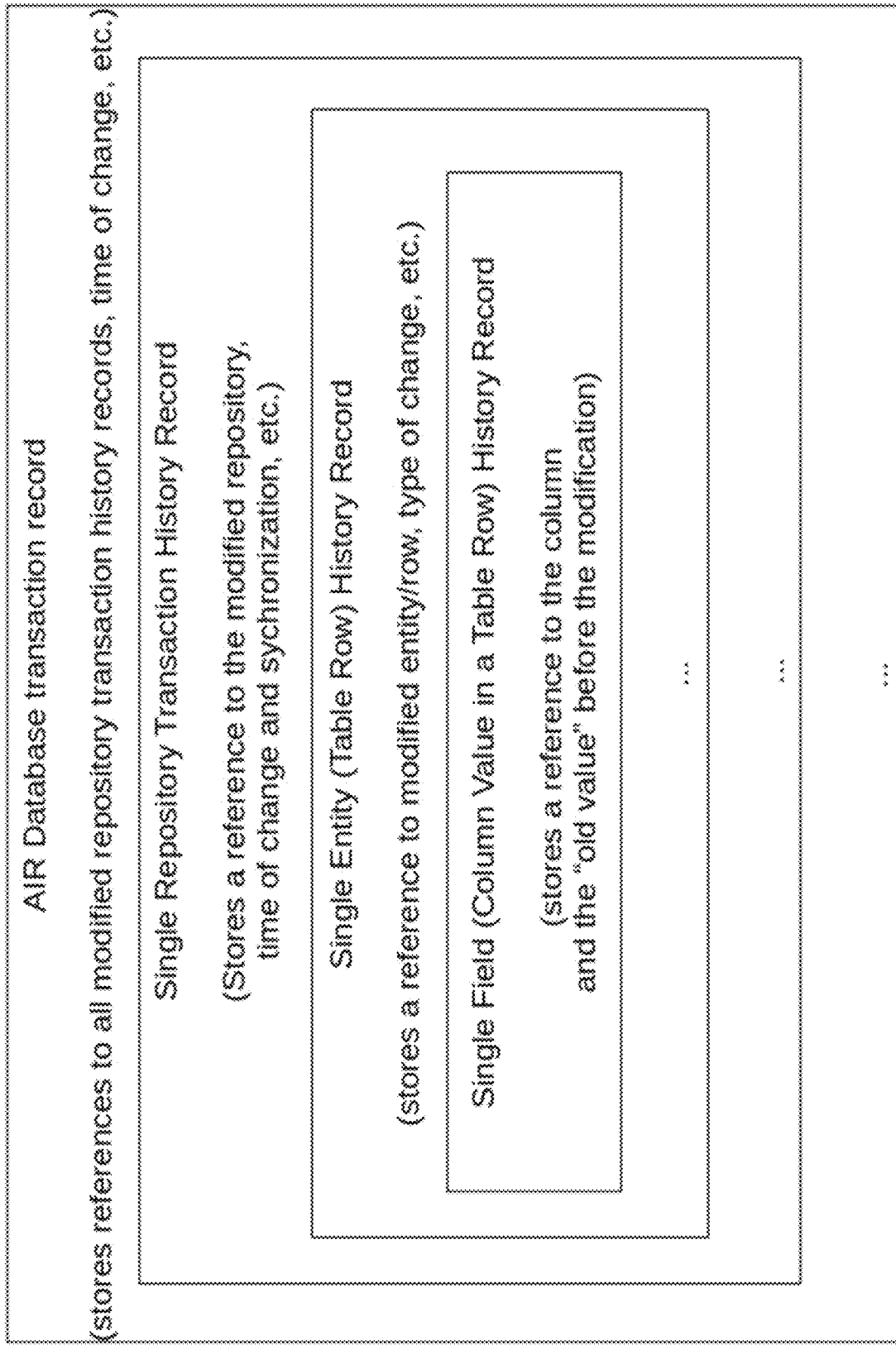
FIG. 14 shows an example of historical representation of AIR records.

FIG. 14 shows an example of historical representation of AIR records. AIR tracks every Creation, Update and Deletion of every record to enable re-sharing of data. Also, it is a convenience to the user to be able to lookup the history of a given record. And as a side effect keeping track of history enables the ability to snapshot any number of repositories in a different database (potentially on the same device). Snapshots can be made to a particular point in time and at a particular point in place (as a view from a given database at a given point in time or any combination of databases). For example, AIR allows to find out what the state a repository was in a particular database at a particular time.

History may be grouped per transaction, per operation, per record, per column (for a given repository). All repository transactions in a given AIR database transaction are further grouped in a database-level transaction history record (which allows for modification to be rolled back in the exact way it was applied to that database). As a performance optimization history can be tracked as an inverse of archived representation. A Transaction Log entry includes the changes with the new values. A history record includes the old (updated or deleted values), since the current values are already in the live database record. A history record of creation of a repository record has no column values associated with it.

Repository Transaction Order.

Databases exchange repositories between each other in an orderly fashion. Data integrity is guaranteed by repositories being archived as ordered Transaction Logs. Transaction Logs are timestamped and ordered by these timestamps. Order can either be dictated by a central authority (like a synchronization server or a file system) or negotiated in a peer-to-peer system (using any number of algorithms that attempt to ensure fairness of claimed timestamps). Table 14 shows an example Order of Transaction logs of Repository X.

TABLE 14

Timestamps

| Timestamp | Transaction log entry |
|---|---|
| Dec 1, 2017 10:15:20.000 | Array of operations, in order they can be applied to a database |
| Dec 2, 2017 12:00:00.000 | ... |
| Jan 5, 2018 15:20:15.500 | ... |
| Jan 5, 2018 15:20:15.550 | ... |

Figure 15:
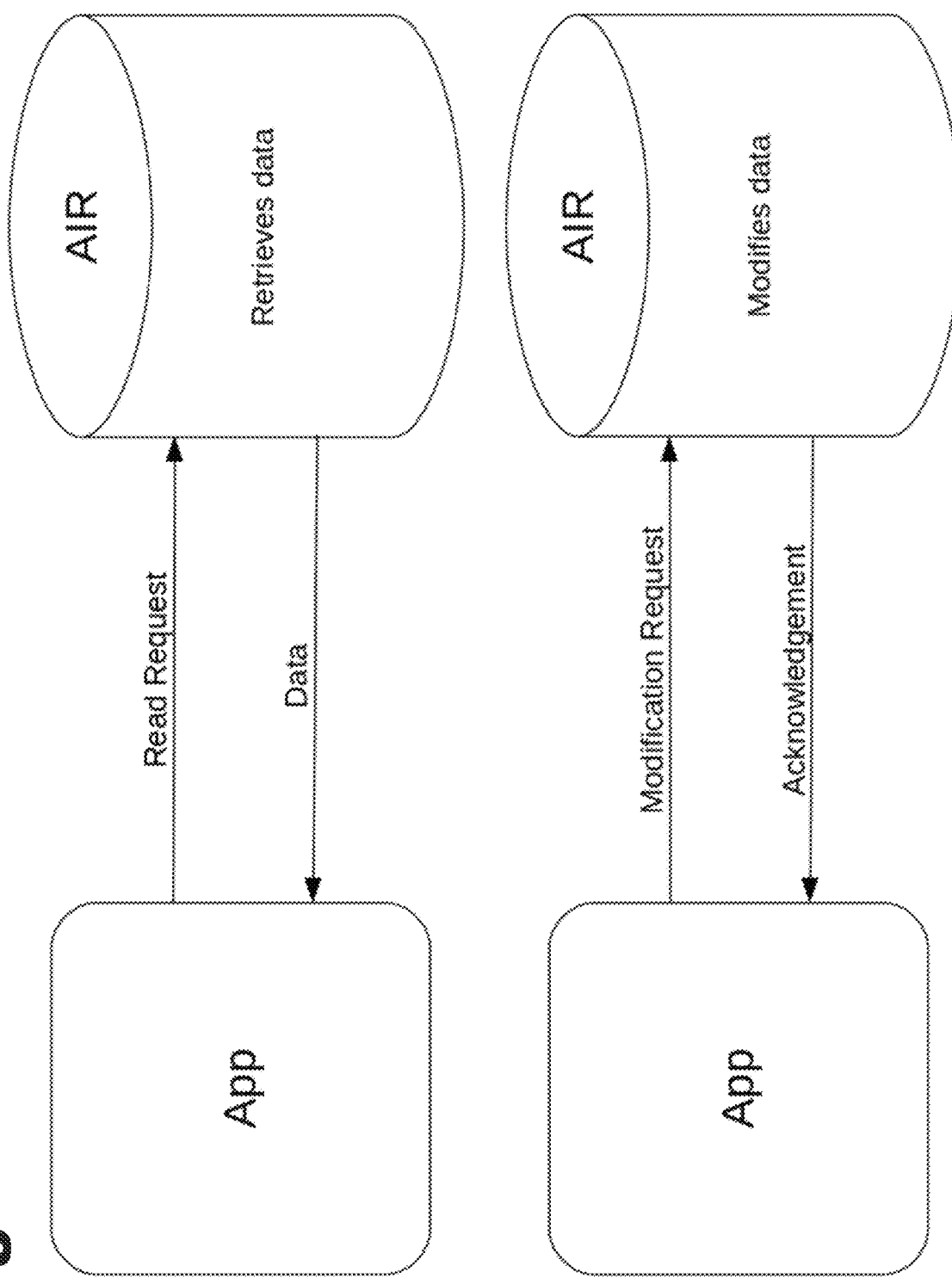
FIG. 15 illustrates communicating with an AIR Database.

FIG. 15 illustrates an Application communicating with an AIR Database. There is a large set of operations that applications can perform with an AIR database. These vary from creating a new user and adding a user to a repository, to requesting schema upgrades. But the core operations deal with the underlying user data. To perform these core operations AIR-capable Applications communicate with an AIR Database via data Read and data Modification requests.

The calling app creates Read requests to AIR (Read/Select) and Modification requests (Create, Update, Delete). These requests can be expressed in SQL or any equivalent representation. Non-SQL related representations are also acceptable but are not expected to be needed.

Process Isolation.

For security reasons (and to enable cross-application communication) apps usually run in different processes than AIR databases. Also, it is possible for an AIR database to serve applications that are not located on the same hardware. AIR reference implementation runs in modern Internet browsers and uses Window.postMessage( ) as the mechanism to communicate between processes running from different origins/domains.

Communication Credentials.

Every communication between the calling app and an AIR database include in it verifiable credentials for application and user. These credentials may also be implied by the communication channel implemented. For example, for in-browser environments the Window.postMessage( ) method implemented for the specified communication will include in it the domain of the calling application. User credentials can be provided in any number of verifiable ways (like tokens or explicit login credentials, which either are local to the AIR database or are global).

For example, in the web environment on a personal mobile device (with only one user per database), single sign-on mechanisms can be implemented. These mechanisms are usually based on OAuth 2.0 or OpenID Connect technologies and require the user to sign in only once. From that point on AIR database process has the user information recorded and does not need to prompt the user for additional logins. This of course only works for single user AIR databases.

Serialized Communication.

For security reasons (and to support the "lowest denominator" communication channel mechanism) all requests and responses between applications and the AIR database come in form of serializable documents (that can be transmitted across processes or computers). Multiple serialization formats are possible for AIR with support for interlinked object graphs (described below). The reference AIR implementation uses JSON (JavaScript Object Notation).

AIR reference implementation uses a SQL dialect that is integrated with the underlying programming language (TypeScript, which provides operation and result compile time checks) and does not implement relatively expensive SQL parsing. On the application side a client library provided by AIR converts the data requests to an AIR database into a serialized representation that is appropriate for the implementation platform. The dialect is expressed in a number of executable procedures:

```
let atii: QTableII;
let bti: QTableI;
let repositoryIds = [1, 2];
let id, data = Y;
const results = await db.find.tree({
   select: {
      repository: {
         id
      },
      actor: {
         id
      },
      id,
      data,
      appBTableI: {
         repository: {
            id
         },
         actor: {
            id
         },
         id,
         data
      }
   },
   from: [
      atii = AppA.TableII,
      bti = atii.innerJoin( )
   ],
   where: or(
      bti.data.like('v%' ),
      and
         atii.repository.id.in(repositoryIds),
         bti.repository.id.in(repositoryIds)
      )
   )
});
```

The combination of these procedures is then serialized into a JSON object tree. Raw SQL can also be implemented (at the expense of having to parse the request statements). Raw SQL is expressed in a serializable form to begin with.

General Request Validation.

Upon receiving serialized data request AIR can convert it to a format suitable for processing (conversion is not needed in the reference implementation). AIR then checks that the requesting application can call it. Then it checks the serialized message representation for validity.

Figure 16:
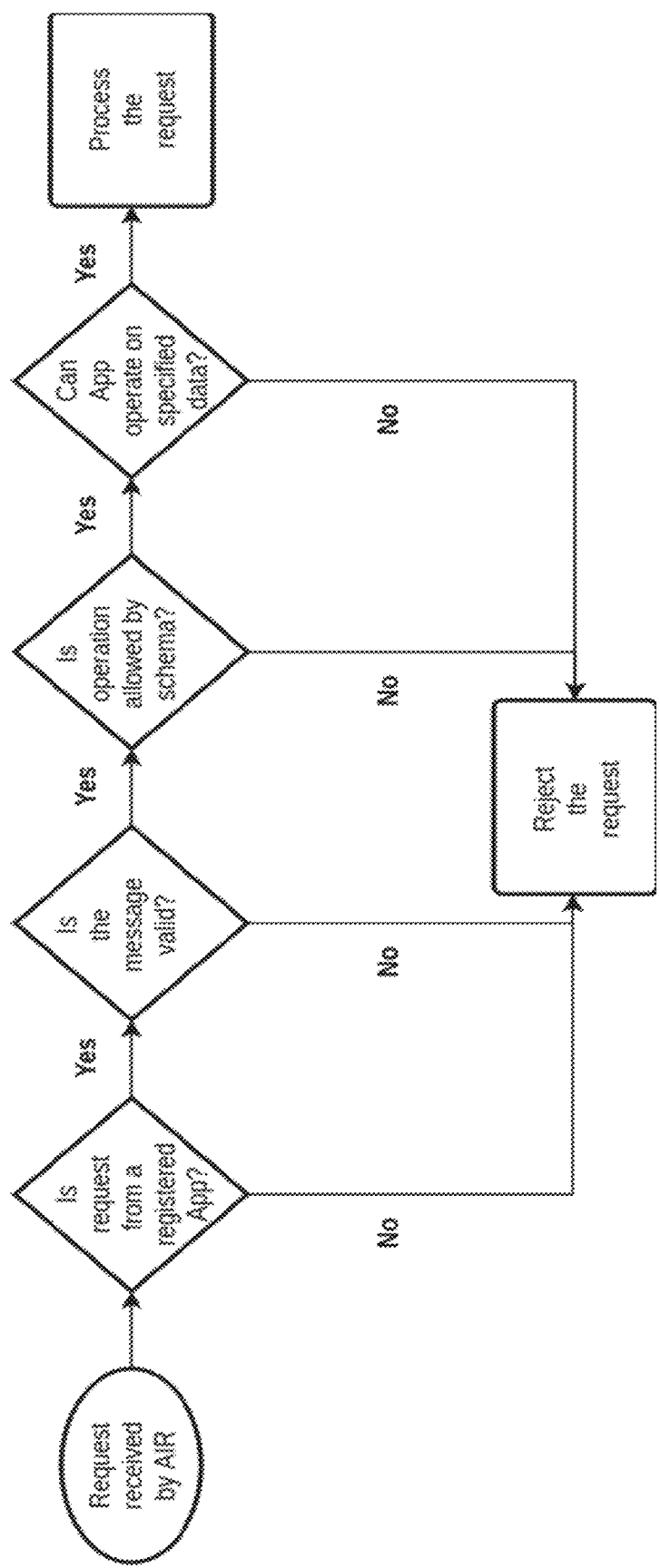
FIG. 16 illustrates example schema permission checks.

FIG. 16 illustrates example schema permission checks. Schema permission checks include verifying if the data requests that the application made are allowed by the queried schema(s). A subsequent check verifies if the application is allowed to perform requests/operations on the data specified in its request.

The schema permission check and the data permission check (3 and 4 in FIG. 16) are related but work on a different level. Schema level check verifies that tables and columns are allowed to be accessed by a given application (for the type of operation specified).

Explicit Repository References Check.

It is possible to have a request explicitly specify repository ids (or other data). In an example, the request is checked to verify that the owner of the repositories has allowed the requesting application to perform the request on the repositories specified. And, in multi-userAIR databases there is also a check to verify that the user performing the operation also has appropriate permissions to the specified repositories.

Figure 17:
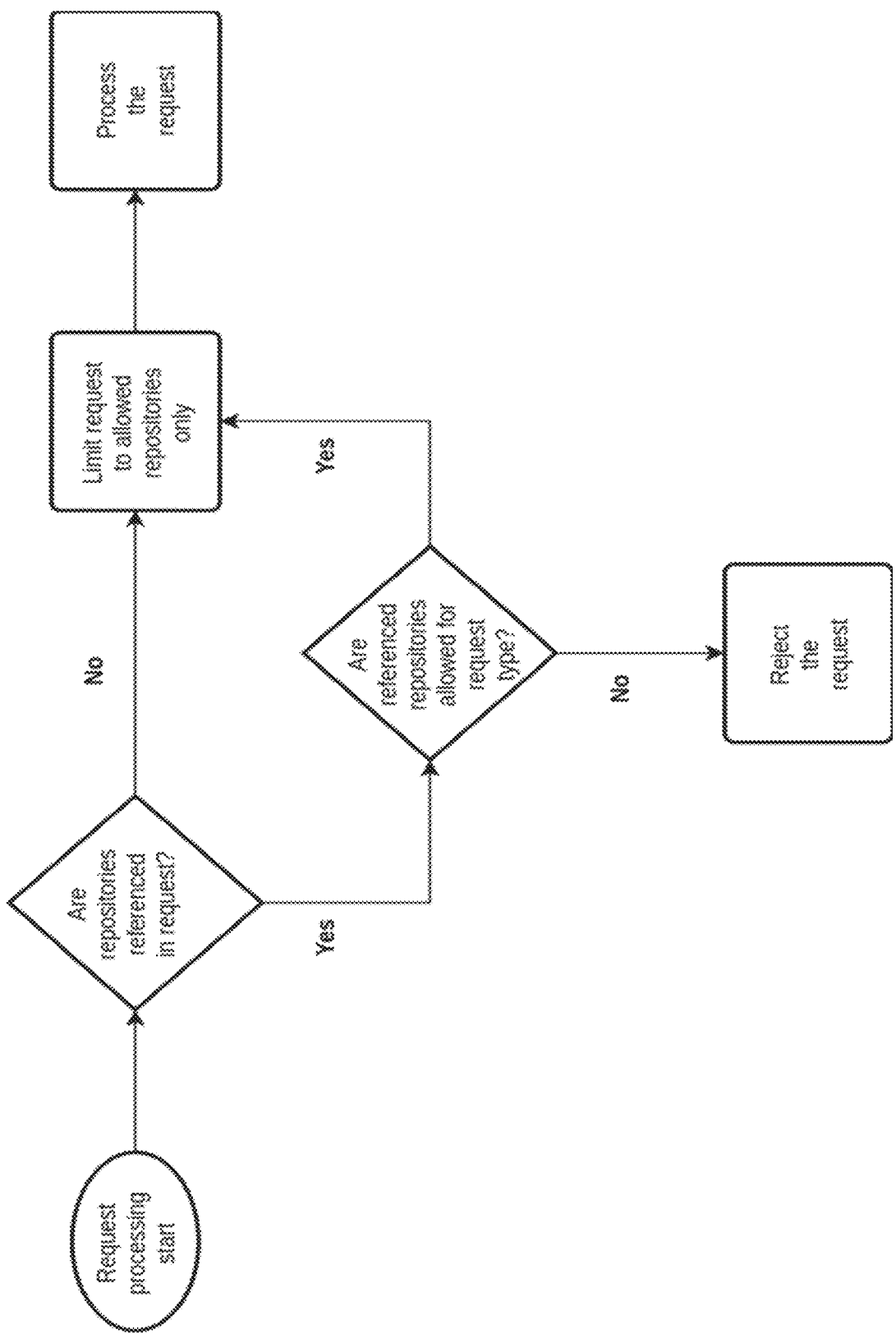
FIG. 17 illustrates example repository checks.

FIG. 17 illustrates example repository checks. Apps can send requests that either do not explicitly reference repositories or may affect/query any number of repositories. To limit the number of the repositories affected/queried by the request AIR limits the request to only allowed repositories by modifying the operation specified in the request. In addition to application level permission check, in a multi-userAIR databases AIR also limits the allowed repositories to only match the access permissions of the calling user.

Finally, once the request's operation has been properly limited, the request is processed and its operation is executed. The check that verifies repositories explicitly referenced in the request may be combined with the general repository access check, where appropriate.

Read Operations.

Read data requests have a form of data queries. These queries are defined in some derivation (or just a dialect of no SQL derivative is provided) of the SQL language. Here is the SQL statement that equates to the TypeScript version specified above:

```
Select
   atii. REPOSITORY_ID,
   atii.ACTOR_ID,
   atii.ACTOR_RECORD_ID,
   atii.DATA,
   bti.REPO_ID,
   bti.ACTR_ID,
   bti.ACTR_REC_ID,
   bti.DATA
from
   APP_A__TABLE_II atii
   inner join APP_B__TABLE_I bti
      on atii.REPOSITORY_ID = bti.A_TII_REPO_ID
      and atii.ACTOR_ID = bti.A_TII_ACTR_ID
      and atti.ACTOR_RECORD_ID = bti.A_TII_ACTR_REC_ID
where
   bti.DATA like 'v%'
   or (
      atii.REPOSITORY_ID in (1, 2)
      and bti.REPOSITORY_ID in (1, 2)
   );
```

Application Registration Check.

AIR will first check that the calling app is registered and can make any requests:

```
Select
   APPLICATION_DOMAIN
from
   REGISTERED_APPLICATIONS
where
   APPLICATION_DOMAIN = 'callingApp.com:8080' ;
```

The results of this query can then be cached to speed up following queries.

If the calling app is not a registered application it won't be allowed access. Note, for in-browser (or hybrid mobile apps) environment the calling application domain ('callingApp.com:8080') is to be checked. In other environments REGISTERED_APPLICATIONS can include alternative application identifying information (such as a combination of application publisher and application name).

REGISTERED_APPLICATIONS table is an internal AIR bookkeeping table and does not belong to any repositories. This table always includes the exact domain for each registered application and does not allow for wildcards (since every application can register with the AIR database). Table 15 shows an example of REGISTERED_APPLICATIONS.

TABLE 15

Example of REGISTERED_APPLICATIONS

| APPLICATION_DOMAIN | Registration Timestamp |
|---|---|
| callingApp.com:8080 | Jan 7, 2018 16:06:20.525 |

This table may include additional data about the registered app and its registration.

Message Validity Check.

After the application registration check AIR checks message validity. This can encompass any number of checks, depending on the format of the incoming message. Note, this does not have to check the validity of the generated SQL, since invalid SQL statements will be automatically rejected by the underlying database engine.

Schema Operation Check.

Then AIR will check if the type of the request is allowed on all of the tables and columns specified in all clauses of the operation (SQL statement). By default, all columns of all tables are whitelisted for all operations of all schemas for all ('*') domains (or applications). Absence of an access rule definition is considered to be a whitelist entry. The application publisher can then either blacklist specific columns for specific operations for all domains, or blacklist specific columns for specific operations for specific domains or whitelist specific columns for specific operations for specific domains.

```
Select
    PUBLISHER_ID,
    SCHEMA_NAME,
    TABLE_NAME,
    COLUMN_NAME,
    OPERATION,
    USED_IN_CLAUSE,
    USED_IN_FRAGMENT,
    APPLICATION_DOMAIN,
    IS_ALLOWED
from
    ALLOWED_SCHEMA_OPERATIONS
where
    (
        APPLICATION_DOMAIN = '*'
        or APPLICATION_DOMAIN = 'callingApp.com:*'
        or APPLICATION_DOMAIN = 'callingApp.com:8080'
    ) and (
        (
            PUBLISHER_ID = 'myApps.com'
            and SCHEMA_NAME in (
                'App A',
                '*')
            and TABLE_NAME in (
                'TABLE_II'
                '*')
            and COLUMN_NAME in (
                'REPOSITORY_ID',
                'ACTOR_ID',
                'ACTOR_RECORD_ID',
                'DATA',
                '*')
            and OPERATION in (
                'READ',
                'ANY')
            and USED_IN_CLAUSE in (
                'SELECT',
                'ANY')
            and USED_IN_FRAGMENT in (
                'COLUMN',
                'ANY')
            and USED_IN_OPERATOR in (
                'ANY')
        ) or (
            PUBLISHER_ID = 'myApps.com'
            and SCHEMA_NAME in (
                'App A',
                '*')
            and TABLE_NAME in (
                'TABLE_II'
                '*')
            and COLUMN_NAME in (
                'REPOSITORY_ID',
                'ACTOR_ID',
                'ACTOR_RECORD_ID',
                '*')
            and OPERATION in (
                'READ',
                'ANY')
            and USED_IN_CLAUSE in (
                'FROM',
                'ANY')
            and USED_IN_FRAGMENT in (
                'JOIN ON',
                'ANY')
            and USED_IN_OPERATOR in (
                '=',
                'ANY')
        ) or (
            PUBLISHER_ID = 'myApps.com'
            and SCHEMA_NAME in (
                'App A',
                '*')
            and TABLE_NAME in (
                'TABLE_II'
                '*')
            and COLUMN_NAME in (
                'REPOSITORY_ID',
                '*')
            and OPERATION in (
                'READ',
                'ANY')
            and USED_IN_CLAUSE in (
                'WHERE',
                'ANY')
            and USED_IN_FRAGMENT in (
                'OR',
                'ANY')
            and USED_IN_OPERATOR in (
                '=',
                'ANY')
        ) or (
            PUBLISHER_ID = 'yourApps.com'
            and SCHEMA_NAME in (
                'App B',
                '*')
            and TABLE_NAME in
                'TABLE_I',
                '*')
            and COLUMN_NAME in (
                'REPO_ID',
                'ACTR_ID',
                'ACTR_REC_ID',
                'DATA',
                '*')
            and OPERATION in (
```

-continued

```
    'READ',
    'ANY')
and USED_IN_CLAUSE in (
    'SELECT',
    'ANY')
and USED_IN_FRAGMENT in (
    'COLUMN',
    'ANY')
and USED_IN_OPERATOR in (
    'ANY')
) or (
    PUBLISHER_ID = 'yourApps.com'
    and SCHEMA_NAME in (
        'App B',
        '*')
    and TABLE_NAME in (
        'TABLE_I',
        '*')
    and COLUMN_NAME in (
        'A_TII_REPO_ID',
        'A_TTI_ACTR_ID'
        'A_TII_ACTR_REC_ID',
        '*')
    and OPERATION in (
        'REA
        'ANY')
    and USED_IN_CLAUSE in (
        'FROM',
        'ANY')
    and USED_IN_FRAGMENT in (
        'JOIN ON',
        'ANY')
    and USED_IN_OPERATOR in (
        '=',
        'ANY')
) or (
    PUBLISHER_ID = 'yourApps.com'
    and SCHEMA_NAME in (
        'App B',
        '*')
    and TABLE_NAME in (
        'TABLE_I',
        '*')
    and COLUMN_NAME in (
        'DATA',
        '*')
    and OPERATION in (
        'READ',
        'ANY')
    and USED_IN_CLAUSE in (
        'WHERE',
        'ANY')
    and USED_IN_FRAGMENT in (
        'AND',
        'ANY')
    and USED_IN_OPERATOR in (
        'LIKE',
        'ANY')
) or (
    PUBLISHER_ID = 'yourApps.com'
    and SCHEMA_NAME in (
        'App B',
        '*')
    and TABLE_NAME in (
        'TABLE_I'
        '*')
    and COLUMN_NAME in (
        'REPOSITORY_ID',
        '*')
    and OPERATION = 'READ'
    and USED_IN_CLAUSE in (
        'WHERE',
        'ANY')
    and USED_IN_FRAGMENT in (
        'OR',
        'ANY')
    and USED_IN_OPERATOR in (
        'IN',
        'ANY')
)
);
```

Other wildcard values are also possible in the APPLICATION_DOMAIN column. For example, if the domain of the calling app was 'www.callingApp.com:8080' then any of the following values match:

\*

\*.callingApp.com:\*

\*.callingApp.com:8080 www.callingApp.com:\* www.callingApp.com:8080

If no rows are returned by the above query, then the operation is considered to be whitelisted and passes this check. If the schema belongs to the domain registered to the publisher of the application then the above check can be skipped. It is assumed that the publisher's applications will be using the schema appropriately.

If the operation returns data then that data is checked for the allowed status. Table 16 shows an example of ALLOWED_SCHEMA_OPERATIONS.

TABLE 16

Example of ALLOWED_SCHEMA_OPERATIONS

| PUBLISHER_ID | SCHEMA_NAME | TABLE_NAME | COLUMN_NAME | OPERATION | USED_IN_CLAUSE |
|---|---|---|---|---|---|
| myApps.com | App A | * | * | ANY | ANY |
| myApps.com | App A | TABLE_II | DATA | READ | SELECT |
| yourApps.com | * | TABLE_I | * | ANY | WHERE |
| yourApps.com | App B | TABLE_I | DATA | ANY | WHERE |

| PUBLISHER_ID | USED_IN_FRAGMENT | USED_IN_OPERATOR | APPLICATION_DOMAIN | IS_ALLOWED |
|---|---|---|---|---|
| myApps.com | ANY | ANY | *.callingApp.com:* | true |
| myApps.com | COLUMN | ANY | callingApp.com:8080 | false |
| yourApps.com | * | LIKE | * | true |
| yourApps.com | OR | LIKE | * | false |

For example, with the above configuration myApps.com allows all operations on all columns of all tables to all subdomains for callingApp.com (on all ports) (for schema App A). But it disallows selecting the DATA column from TABLE_II (of schema App A) for domain callingApp.com on port 8080.

Also, yourApps.com allows all operations to be implemented with the LIKE operator in any fragment of the WHERE clause with any column of TABLE_I (in any of their schemas). But it disallows any operation to use the DATA column of TABLE_I (in schema 'App B') with the LIKE operator when placed in an OR fragment of the WHERE clause.

The results of the Schema Operation Check queries are checked from the most inclusive definition to the most exclusive. If the most inclusive returned definition allows an operation but a more exclusive definition disallows it then the operation is disallowed. For example, given two returned rows by the Schema Operation Check (for the query above), as shown for example in Table 17.

TABLE 17

Example Returned Rows

| | | | | | | | | | | |
|---|---|---|---|---|---|---|---|---|---|---|
| yourApps.com | * | TABLE_I | * | ANY | WHERE | * | LIKE | * | true |
| yourApps.com | App B | TABLE_I | DATA | ANY | WHERE | OR | LIKE | * | false |

The operation may be disallowed because the more exclusive definition disallows the operation.

Hence a very fine-grained access control mechanism is provided to the application publishes to control access to their schemas. These controls can be implemented to enforce specific usage patterns of their schemas or to prevent publishers from abusing their access rights (or to impose any additional restrictions for any reason).

Application publishes can provide very fine grained or blanket rules on any level of their schemas and for most combinations of possible clauses in any given SQL statement. Additional values that allow for even more fine-grained level of control are possible. For example, USED_IN_FRAGMENT may allow for additional combinations and regular expression resembling wildcards such as '*→OR', '*→AND→OR', 'OR→*→OR', 'OR→*', '[OR]*', '*→[OR]*', '*→[OR|AND]' (where, for example '→' delimits nesting of fragments and '*' signifies any type of fragment). For the wildcards, if multiple definitions are returned then they may also be checked from most inclusive to most exclusive.

Request Data Check.

If the query in the incoming request explicitly references repositories then AIR checks it to make sure that the calling application has access to those repositories.

```
Select
    REPOSITORY_ID
from
    REPOSITORY_APPLICATIONS
where
    APPLICATION_DOMAIN = 'callingApp.com:8080'
    and (
        ACCESS_LEVEL = 'READ'
        and REPOSITORY_ID in (1, 2)
    )
```

If at least one of the repositories specified in the request is not returned by the above query then the request is rejected and the application is notified of the error.

The REPOSITORY_APPLICATIONS table is an internal AIR bookkeeping table, with data specific to each AIR database. This table is not part of any repositories and maps what repository can be accessed by what application (and may include additional information as well), as shown for example in Table 18.

TABLE 18

REPOSITORY_APPLICATIONS

| REPOSITORY_ID | APPLICATION_DOMAIN | ACCESS_LEVEL |
|---|---|---|
| 1 | callingApp.com:8080 | READ |
| 2 | callingApp.com:8080 | READ |
| 2 | callingApp.com:8080 | CREATE |

This table will never include wildcards in the APPLICATION_DOMAIN table. This is because repository access is always tracked on per application basis. However, AIR may maintain wild card rules in a separate table that can then be applied to applications that match the wildcard. Such a wild card table (e.g., REPOSITORY_APPLICATION_WILDCARDS) can be structurally identical to the REPOSITORY_APPLICATIONS table.

Application Repository Access Wildcard Specification.

AIR may maintain an additional wild card tables that also specify wildcards for repositories that are allowed. Table 19 is an example of such a table.

TABLE 19

USER_DATABASE_REPOSITORY_APPLICATION_WILDCARDS

| USER_ID | DATABASE_NAME | DATABASE_SECOND_ID |
|---|---|---|
| metaInfo@myApps.com | * | * |
| searchEngine@airsearch.com | "MySearchDb 1515369273073" | 0.01083599061549867 |
| yourFriend@yourMail.com | * | * |
| yourFrield@yourMail.com | * | * |

TABLE 19-continued

| USER_DATABASE_REPOSITORY_APPLICATION_WILDCARDS | | |
|---|---|---|
| USER_ID | APPLICATION_DOMAIN | ACCESS_LEVEL |
| metaInfo@myApps.com | * | READ |
| searchEngine@airsearch.com | * | READ |
| yourFriend@yourMail.com | callingApp.com:* | READ |
| yourFrield@yourMail.com | callingApp.com:8080 | CREATE |

For example, app publisher "myApps.com" may allow all apps to read all repositories created by their "metaInfo" user. Or a search engine of AIR repositories may allow all apps to read all repositories created by their "searchEngine" user on a particular AIR database. Or your friend may allow all of the repositories they create to be read by all apps from the callingApp.com domain and allow the "callingApp.com:8080" to also create records in all of their repositories.

domains/applications. The delegation rules can be specified in the transaction logs of the repositories they concern and can be shared across AIR databases. The wild cards for these delegation rules can be stored in the REPOSITORY_ACCESS_DELEGATION_RULES table and are implemented as input that determines the values in the REPOSITORY_APPLICATIONS table (for repositories that don't belong to the user using the application), as shown for example in Table 21.

TABLE 21

| REPOSITORY_ACCESS_DELEGATION_RULES | | | |
|---|---|---|---|
| REPOSITORY_ID | APPLICATION_DOMAIN | DELETEGATED_TO_USER | ACCESS_LEVEL |
| 3 | * | * | READ |
| 3 | * | myemail@server.com | CREATE |

This example wild card table specifies repository access rules and cuts across all repositories for a given "created by" user+AIR database combination. Hence it may be populated via records in a (one per-user) "sharing rules" meta repository, that is setup to share these access rules with any number of other AIR databases. Another solution might keep track of access wild cards on per repository level (with a repository access rules table, including REPOSITORY_ORDERED_ID and REPOSITORY_RANDOM_ID). With such a solution the access permissions can be shared directly in the target repository.

Repository Permission Levels.

In an example, AIR supports at least four repository permission levels for Applications, as shown for example in Table 20.

TABLE 20

| Repository Permission Levels | |
|---|---|
| Value (can be different than specified) | Description |
| CREATE | Application can execute Create (Insert) operations on the listed repository |
| READ | Application can execute Read (Select) operations on the listed repository |
| UPDATE | Application can execute Update operations on the listed repository |
| DELETE | Application can execute Delete operations on the listed repository |

Repository Permission Delegation.

Applications do not control data access on repository level. It is user who can allow or disallow access to any of their repositories (either explicitly or implicitly).

Also, users can delegate to other users the rights for allowing or disallowing access to their repositories. These rights can expressed as access rules for all or specific Request Data Check for Users.

In multi-user AIR databases access permissions granted to the calling users are also checked:

```
Select
    REPOSITORY_ID
from
    REPOSITORY_ACTORS
where
    ACTOR_ID = 1
    and (
        ACCESS_LEVEL = 'READ'
        and REPOSITORY_ID in (1, 2)
    )
```

The REPOSITORY_ACTORS table is setup in a way similar to the REPOSITORY_APPLICATIONS table. REPOSITORY_ACTORS is also an internal AIR bookkeeping table, with data specific to each AIR database. This table does not store Repositories and maps what Repository can be accessed by what Actor (and may include additional information as well), as shown for example in Table 22.

TABLE 22

| REPOSITORY_ACTORS | | |
|---|---|---|
| REPOSITORY_ID | ACTOR_ID | ACCESS_LEVEL |
| 1 | 1 | READ |
| 2 | 1 | READ |
| 2 | 1 | CREATE |

As all AIR database users, the users of the local AIR database are mapped to ACTOR records. This fact is implemented by the REPOSITORY_ACTORS table. The permissions in this table are generated when the owning users of repositories grant permissions to other users (of the corresponding repositories). The owning users automatically get the CREATE, READ, UPDATE and DELETE permissions (and any other permissions that may be specified).

Limiting Request on Application Permissions.

After the schema and explicitly referenced repository access permissions have been verified, AIR modifies the operation to ensure that the operation returns only the data from the repositories that user(s) have granted access to the calling application.

```
Select
    atii.REPOSITORY_ID,
    atii.ACTOR_ID,
    atii.ACTOR_RECORD_ID,
    atii.DATA,
    bti.REPO_ID,
    bti.ACTR_ID,
    bti.ACTR_REC_ID,
    bti.DATA
from
    APP_A_TABLE_II atii
    inner join APP_B_TABLE_I bti
        on atii.REPOSITORY_ID = bti.A_TII_REPO_ID
        and atii.ACTOR_ID = bti.A_TII_ACTR_ID
        and atii.ACTOR_RECORD_ID = bti.A_TII_ACTR_REC_ID
    inner join REPOSITORY_APPLICATIONS rap1
        on atii.REPOSITORY_ID = rap1.REPOSITORY_ID
    inner join REPOSITORY_APPLICATIONS rap2
        on bti.REPOSITORY_ID = rap2.REPOSITORY_ID
where
(
    bti.DATA like 'v%'
    or (
        atii.REPOSITORY_ID in (1, 2)
        and bti.REPOSITORY_ID in (1, 2)
    )
) and (
    rap1.APPLICATION_DOMAIN = 'callingApp.com:8080'
    and rap1.ACCESS_LEVEL = 'READ'
) and (
    rap2.APPLICATION_DOMAIN = 'callingApp.com:8080'
    and rap2.ACCESS_LEVEL = 'READ'
);
```

Read operations (like all operations) can differ greatly in their SQL. However, if a query references any table that stores repositories then that table can be joined with the REPOSITORY_APPLICATIONS table to check repository access.

Application schemas can include local tables that do not store repositories (and hence are not shared between AIR databases). If only local tables are specified in a Read operation then the repository check is not needed.

Limiting Request on User Permissions.

In multi-user AIR databases repository access is also limited to only the repositories that the calling user is allowed to access. This modification is added in the same step as the application level limitation.

```
Select
    atii.REPOSITORY_ID,
    atii.ACTOR_ID,
    atii.ACTOR_RECORD_ID,
    atii.DATA,
    bti.REPO_ID,
    bti.ACTR_ID,
    bti.ACTR_REC_ID,
    bti. DATA
from
    APP_A_TABLE_II atii
    inner join APP_B_TABLE_I bti
        on atii.REPOSITORY_ID = bti.A_TII_REPO_ID
        and atii.ACTOR_ID = bti.A_TII_ACTR_ID
        and atti.ACTOR_RECORD_ID = bti.A_TII_ACTR_REC_ID
    inner join REPOSITORY_APPLICATIONS rap1
        on atii.REPOSITORY_ID = rap1.REPOSITORY_ID
    inner join REPOSITORY_ACTORS rac1
        on atii.REPOSITORY_ID = rac1.REPOSITORY_ID
    inner join REPOSITORY_APPLICATIONS rap2
        on bti.REPOSITORY_ID = rap2.REPOSITORY_ID
    inner join REPOSITORY_ACTORS rac2
        on atii.REPOSITORY_ID = rac2.REPOSITORY_ID
where
(
    bti.DATA like 'v%'
    or (
        atii.REPOSITORY_ID in (1, 2)
        and bti.REPOSITORY_ID in (1, 2)
    )
) and (
    rap1.APPLICATION_DOMAIN = 'callingApp.com:8080'
    and rap1.ACCESS_LEVEL = 'READ'
) and (
    rac1.ACTOR_ID = 1
    and rac1.ACCESS_LEVEL = 'READ'
) and (
    rap2.APPLICATION_DOMAIN = 'callingApp.com:8080'
    and rap2.ACCESS_LEVEL = 'READ'
) and (
    rac2.ACTOR_ID = 1
    and rac2.ACCESS_LEVEL = 'READ'
);
```

Figure 18:
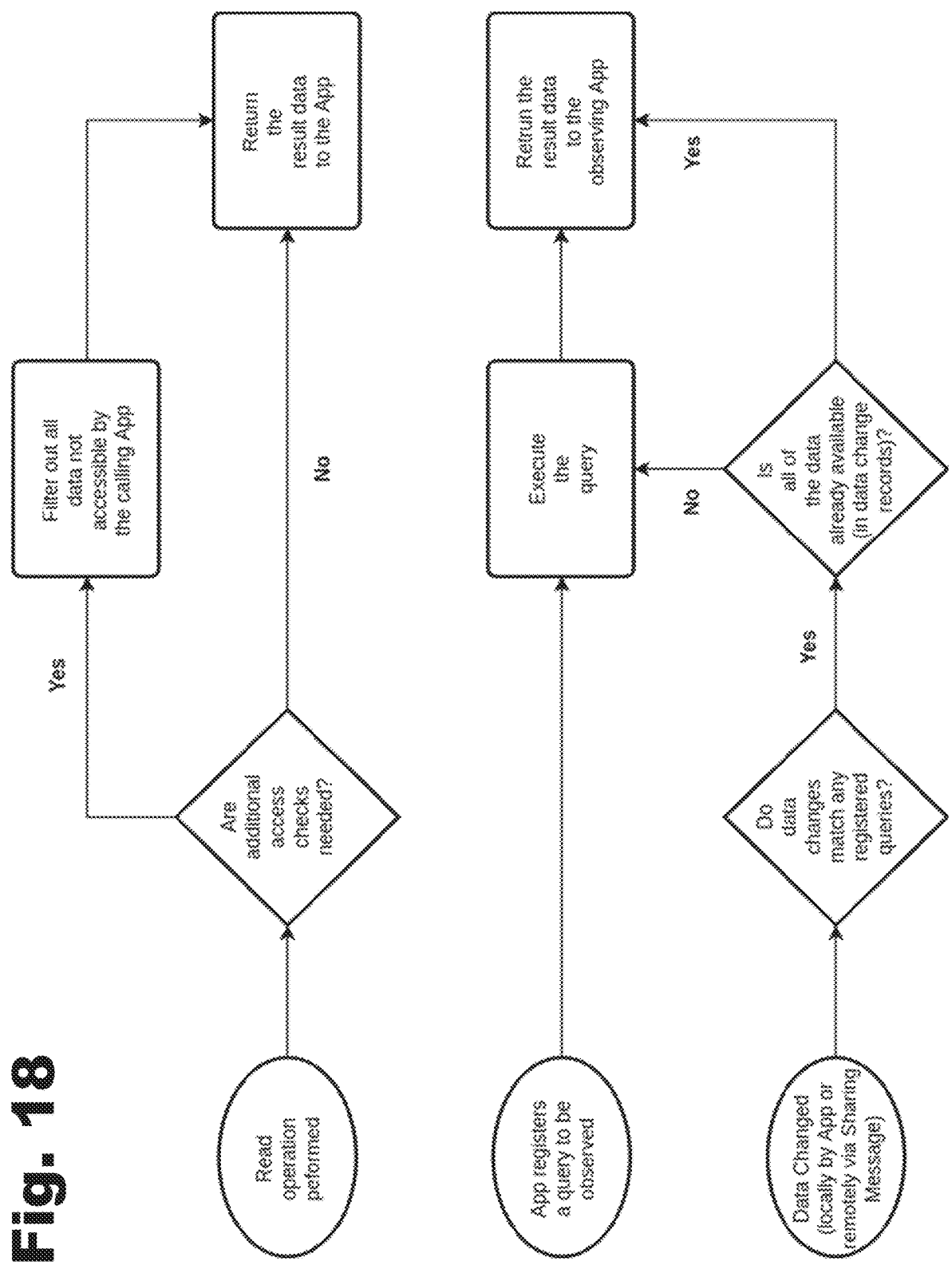
FIG. 18 is a flow diagram illustrating additional access checks.

FIG. 18 is a flow diagram illustrating additional access checks. In example operations, before Read Operation data is returned back to the application, the data may again be checked. Only the data that the user specified to be readable by the application is returned to the application.

Finally, after all of the access rules have been taken into account the data is returned back to the calling application.

Continuous Observation of Read Operations.

Applications may setup read operations using the Observer software design pattern (or alike, functionally equivalent patterns). A Read Operation may be setup as being observed by an App and is registered as "Subject" to which this app subscribes. Every time there are changes to the records that match the query specified by the Read Operation, that read operation is executed again the data is returned to the subscribing application (via the registered Subject). Specifically, AIR saves the structure and parameters of the query. Then whenever any changes are made to the data in the AIR database, AIR checks if they are made to the same tables and columns (and potentially same repositories or record ids) as what is specified in the query. If there is a match between the changes to the data and what the saved query is searching for then, AIR re-executes the saved query (unless the data is already available) and notifies the observing app of the query results.

An AIR implementation can provide a number of convenient ways an application can retrieve the data in.

Raw Table Output.

When performing SQL read commands standard relational databases return data in a table format, with zero or more rows of data including one or more columns, as shown for example in Table 23.

TABLE 23

| | | | Raw Table Output | | | | |
|---|---|---|---|---|---|---|---|
| REPOSITORY_ID | ACTOR_ID | ACTOR_RECORD_ID | DATA | REPO_ID | ACT_ID | ACTR_REC_ID | DATA |
| 1 | 1 | 1 | a... | 1 | 1 | 1 | w... |
| 1 | 1 | 1 | a... | 1 | 1 | 2 | x... |
| 1 | 1 | 2 | b... | 1 | 1 | 3 | y... |
| 1 | 1 | 2 | b... | 1 | 1 | 4 | z... |

Internally AIR always retrieves the data using the table format (which is the only way retrieve data out of the underlying database engine). Then it uses the retrieved data to build more advanced formats.

Structured Object Tree.

Often it is convenient to for the calling application to retrieve data as a tree of objects. In such object trees there is a root object or an array of root objects (data structures other than object arrays are also supported). Each root object may in itself include any number of other objects or data structures. This object nesting can continue to any depth (as specified by the query). These objects may be directly related to the underlying tables in which the data is stored, or may be a combination columns from various tables.

```
[{
    repositoryId: 1,
    actorId: 1,
    actorRecordId: 1,
    data: 'a...',
    appBTableIIRecords: [{
      repositoryId: 1,
      actorId: 1,
      actorRecordId: 1,
      data: 'w...'
    },
    {
      repositoryId: 1,
      actorId: 1,
      actorRecordId: 2,
      data: 'x...'
    }]
},
{
    repositoryId: 1,
    actorId: 1,
    actorRecordId: 2,
    data: 'b...',
    appBTableIIRecords: [{
      repositoryId: 1,
      actorId: 1,
      actorRecordId: 3,
      data: 'y...'
    }, {
      repositoryId: 1,
      actorId: 1,
      actorRecordId: 4,
      data: 'z...'
    }]
}]
```

This is an example format that is returned by the for the TypeScript query specified earlier.

Interlinked Object Graph.

Sometimes it is convenient for the calling application to retrieve data as an interlinked graph of objects. The object graph is structurally like the object tree, except that any given object may be referenced in multiple places. Hence, in the above object tree the same object may be represented as different copies in different places in the tree, whereas in an interlinked object graph the same instance of the object can be referenced in all places.

For example, the One-To-Many relation specified in the Read operation can be reversed. In an example, and the operation is constructed with APP_B_TABLE_I on the root level with each record referencing the related records in the APP_B_TABLE_II via the inverse Many-To-One relation:

```
let atii: QTableII;
let bti: QTableI;
let id, data = Y;
const results = await db.find.graph({
    select: {
      resitory: {
        id
      },
      actor: {
        id
      },
      id,
      data,
      appATableII: {
        resitory: {
          id
        },
        actor: {
          id
        },
        id,
        data
      }
    },
    from: [
      bti = AppB.TableII,
      atii = bti.innerJoin( ),
    ],
    where: or(
      bti.data.like('v%'),
      and (
        atii.repository.id.in(repositoryIds),
        bti.repository.id.in(repositoryIds)
      )
    )
});
```

The results of that query then include references to the same rows in APP_A_TABLE_II in multiple places. This can be expressed as:

```
const repository1Actor1ActoreRecord1_APP_A_TABLE_II = {
    repositoryId: 1,
    actorId: 1,
    actorRecordId: 1,
    data: 'a . . . '
}
const repository1Actor1ActoreRecord2_APP_A_TABLE_II = {
    repositoryId: 1,
    actorId: 1,
    actorRecordId: 2,
    data: 'b . . . '
}
const results = [ {
    repositoryId: 1,
    actorId: 1,
    actorRecordId: 1,
```

```
        data: 'w . . . ' ,
        appATableII:
        repository1Actor1ActoreRecord1_APP_A_TABLE_II
   }, {
        repositoryId: 1,
        actorId: 1,
        actorRecordId: 2,
        data: 'x . . . ' ,
        appATableII:
        repository1Actor1ActoreRecord1_APP_A_TABLE_II
   }, {
        repositoryId: 1,
        actorId: 1,
        actorRecordId: 3,
        data: 'y . . . ' ,
        appATableII:
        repository1Actor1ActoreRecord2_APP_A_TABLE_II
   }, {
        repositoryId: 1,
        actorId: 1,
        actorRecordId: 4,
        data: 'z . . . ' ,
        appATableII:
        repository1Actor1ActoreRecord2_APP_A_TABLE_II
   } ];
```

Modification Operations.

Modification operations are grouped into three distinct operation types Create (also known as Insert), Update and Delete. AIR modification operations are usually defined in some derivation of a SQL language.

All modification operations are subject the same rules as the Read operations, and are checked in a similar fashion. All of the pre-execution rules are executed in the same order and in the same way, based on the tables and columns implemented in the inspected modification operation and on any explicit data references in the operation definition (primarily repository ids).

Figure 19:
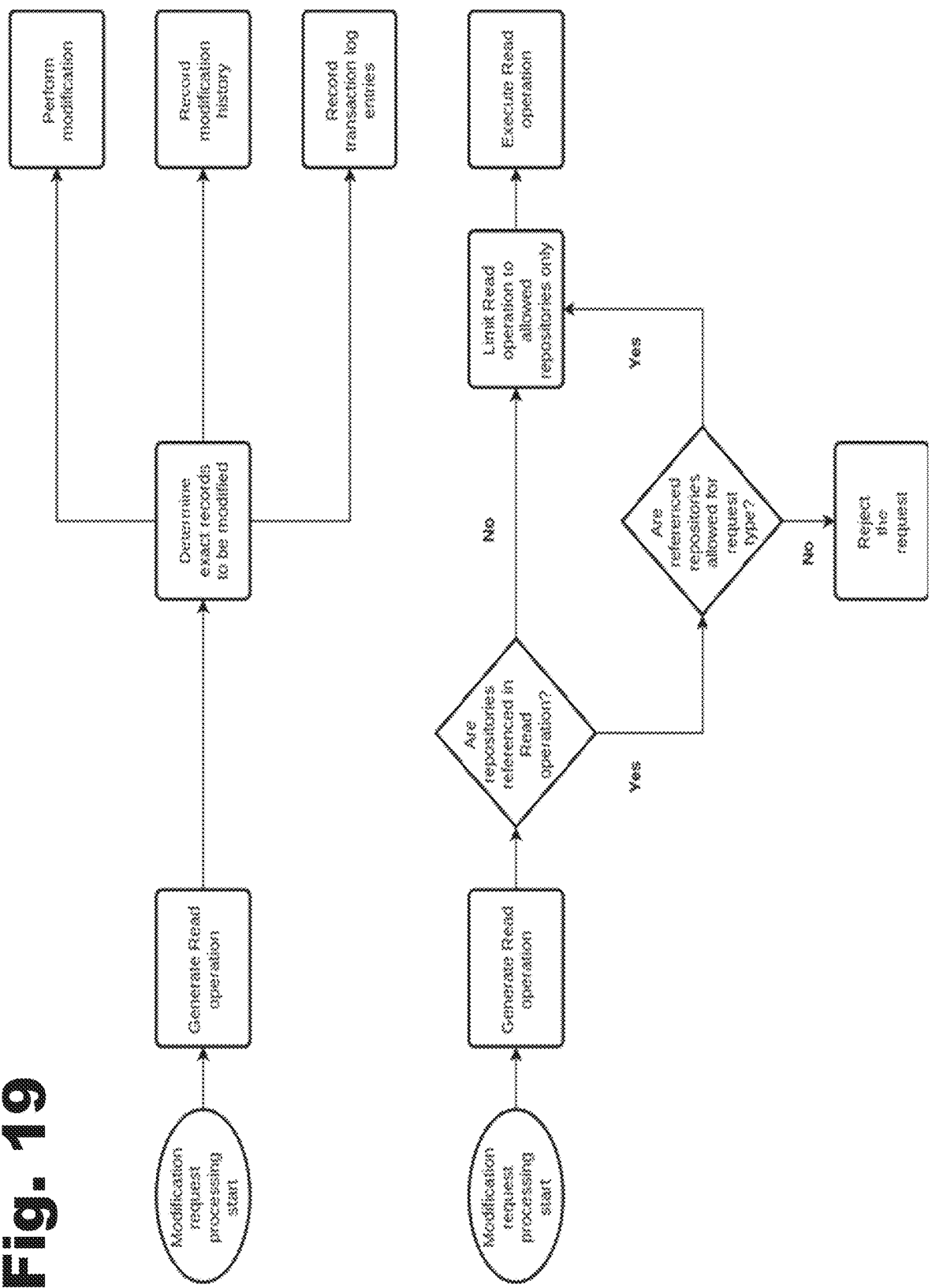
FIG. 19 is a flow diagram illustrating example modification request processing.

FIG. 19 is a flow diagram illustrating example modification request processing. Except where each modified record is explicitly specified in the Modification request, AIR does not run the request as provided by the app. To determine the exact records that will be modified by the request AIR creates a Read operation (based on the Modification request) for those records. This validates repository access, records the old/modified values into AIR's repository history tracking tables and generates the Transaction Log entry for the modification.

In this Read Operation AIR retrieves the Repository Id, Actor Id and Actor Record Id of each modified record. The modified data is also retrieved. The Read Operation is implemented to check repository access for all modification operations (including the Create operation).

Hence, the process of checking the data specified in the request and the process of limiting the request to the allowed repositories is identical to that of the Read operation.

AIR may perform additional data integrity related checks on all Modification Operations if the underlying database engine does not support those checks natively. For example, for all Update operations, AIR will make sure that the operation does not attempt to modify Id fields (which is not allowed for any tables that include repository records).

Also, just as with Read Operations, Modification Operations that do not include any references to tables which store Repository records (and only reference "local" tables) do not need the repository check to be performed. Also, repository checks are not needed for the Modification Operations which modify records in tables that do not store repository records (and may or may not have any references to tables which store Repository records), since records in such "local" tables do not need transaction history records and are not recorded in Transaction Logs (since the generated changes will never be shared).

Create/Insert Operations.

Create (also known as Insert) operations create any number of rows in a given table. A basic creation operation may look like:

```
Insert into
    APP_A_TABLE_ II (REPOSITORY_ID, DATA)
values
    (1, 'a . . .') ,
    (2, 'i . . .') ;
```

Note that ACTOR_ID and ACTOR_RECORD_ID are not provided in the Create Operation. AIR fully manages creation of those ids for the new records. If they are provided in the Create Operation the operation is rejected.

Airfirst runs a repository id checking query (just like for the Read operation):

```
Select
    REPOSITORY_ID
from
    REPOSITORY_APPLICATIONS
where
    APPLICATION_DOMAIN = 'callingApp.com:8080'
    and ACCESS_LEVEL = 'CREATE'
    and REPOSITORY_ID in (1, 2)
```

In multi-user AIR database, just as with Read requests all Modification requests also limit the generated Read operation:

```
Select
    REPOSITORY_ID
from
    REPOSITORY_ACTORS
where
    ACTOR_ID = 1
    and ACCESS_LEVEL = 'CREATE'
    and REPOSITORY_ID in (1, 2)
```

If no additional relevant data checks are needed then AIR can proceed with creation of the records themselves, the history records and the corresponding Transaction Log entries (one entry per repository). No additional repository-limiting read operations are needed for the operation specified above.

Some Create Operations may not directly provide all of the data needed for the operation. Instead these operations might provide a number of embedded operations to generate the data to be inserted. For example, the following operation uses a select statement:

```
Insert into
    APP_A_TABLE_I (REPOSITORY_ID, DATA)
select
    REPOSITORY_ID,
    DATA
from
    APP_A_TABLE_II
where
    DATA like 'c%' ;
```

For the operation above, AIR will create the following Read operation:

```
select
    REPOSITORY_ID,
    DATA
from
    APP_A_TABLE_II atii
    inner join REPOSITORY_APPLICATIONS rac1
        on atii.REPOSITORY_ID = rac1.REPOSITORY_ID
where
    atii.DATA like 'c%'
    and (
        rac1.APPLICATION_DOMAIN = 'callingApp.com:8080'
        and rac1.ACCESS_LEVEL = 'CREATE'
    );
```

Appropriate Actor limits are added to the above query in multi-user AIR databases.

The resulting query limits the created rows to just the repositories that the application is allowed to access by returning only the allowed data. The results of this query are then implemented in the Create Operation, the creation of the associated transaction history data and the creation of associated Transaction Log entries.

Update Operations.

Update Operations modify any number of rows in a given table. Like all operations Update Operations may specify the exact Ids for an AIR operation (as well as the exact new data). Here is an example of an Update operation that specifies all of the ids and the exact new data.

```
Update
    APP_B_TABLE_I
set
    DATA = 'z . . .'
where
    (
        REPOSITORY_ID = 1
        and ACTOR_ID = 1
        and ACTOR_RECORD_ID = 1
    ) or (
        REPOSITORY_ID = 2
        and ACTOR_ID = 1
        and ACTOR_RECORD_ID = 3
    );
```

In the above example, a Read Operation determines if the specified records exist in the AIR database, if these records can be modified by the application, and retrieves the original values of the updated columns. The check for the specified Repository Ids can be merged with this Read Operation:

```
Select
    bti.REPOSITORY_ID,
    bti.ACTOR_ID,
    bti.ACTOR_RECORD_ID,
    bti.DATA
from
    APP_B_TABLE_I bti
    inner join REPOSITORY_APPLICATIONS rap1
        on bti.REPOSITORY_ID = rap1.REPOSITORY_ID
where
    (
        (
            bti.REPOSITORY_ID = 1
            and bti.ACTOR_ID = 1
            and bti.ACTOR_RECORD_ID = 1
        ) or (
            bti.REPOSITORY_ID = 2
            and bti.ACTOR_ID = 1
            and bti.ACTOR_RECORD_ID = 3
        )
    )
    and (
        rap1.APPLICATION_DOMAIN = 'callingApp.com:8080'
        and rap1.ACCESS_LEVEL = 'UPDATE'
    );
```

If the above query does not return both of the rows specified to be updated by the operation then the operation is rejected due lack of sufficient repository permissions by the data application.

A given AIR implementation may choose to perform a separate check for the referenced Repository Ids to keep the implementation simpler (at the cost of an extra query).

For Update Operations that do not exactly specify Ids of the records the to be updated a Read Operation is generated in the same fashion but there are no Repository Ids to be checked. Here is an example of an update operation that does not reference any Ids:

```
Update
    APP_B_TABLE_I
set
    DATA = 'z . . .'
where
    DATA = (
        Select
            atii.DATA
        from
            APP_A_TABLE_II atii
        where
            atii.DATA like 'b%'
    );
```

For the above operation the following Read operation is generated:

```
Select
    bti.REPOSITORY_ID,
    bti.ACTOR_ID,
    bti.ACTOR_RECORD_ID,
    bti.DATA
from
    APP_B_TABLE_I bti
    inner join REPOSITORY_APPLICATIONS rap1
        on bti.REPOSITORY ID = rap1.REPOSITORY_ID
where
    bti.DATA = (
        Select
            atii.DATA
        from
            APP_A_TABLE_II atii
            inner join REPOSITORY_APPLICATIONS rap2
                on atii.REPOSITORY_ID = rap2.REPOSITORY_ID
        where
            atii.DATA like 'b%'
            and (
                rap2.APPLICATION_DOMAIN = 'callingApp.com:8080'
                and rap2.ACCESS_LEVEL = 'UPDATE'
            )
    )
    and (
        rap1.APPLICATION_DOMAIN = 'callingApp.com:8080'
        and rap1.CCESS_LEVEL = 'UPDATE'
    );
```

Delete Operations.

Delete operations delete any number of rows in a given table.

```
Delete from
    APP_B_TABLE_I
    where
        DATA like 'z%';
```

As with Create and Update operations any explicit repository Id references will be checked and a Read Operation will be executed to limit the records to the allowed set and to get explicit Ids for every deleted record. One notable change is that the Read operation generated for the Delete Operation will always specify all of the columns of the deleted rows. This is because of the inverse nature of the transaction history records stored in the AIR database. The history records only store the changed values. In the example of the Delete Operation the changed fields are all of the column values of the deleted row. All Delete operations on tables that store repository records are done by unique Id only (just like is the example for Create and Update operations).

Ensuring Atomicity of Modification Operations.

As described above, all modification operations implement a number of database Read Operations to be executed first. To ensure that Modification Operations are processed in the correct order in multi-user AIR databases the Read Operations generated to check repository access can be run as "SELECT FOR UPDATE" statements (or functional equivalent). These statements lock the selected rows against concurrent updates by other operations. For single user databases all Modification Operations can be run sequentially and no record locking is needed. AIR normally controls all of the operations that are performed against its underlying database engine(s).

Figure 20:
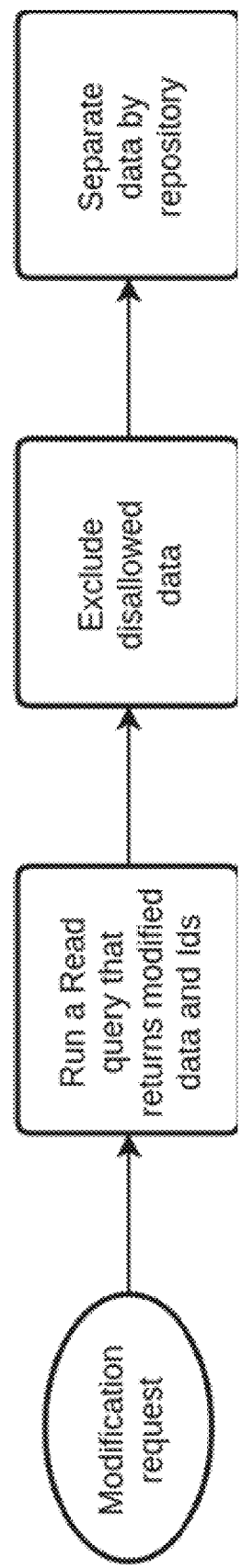
FIG. 20 is a flow diagram illustrating example modification request processing.

FIG. 20 is a flow diagram illustrating example modification request processing. After the data is checked to verify access permissions, results of generated Read Operation (and any other data gathered by AIR) are implemented for modification processing. At that point the unique ids of all the modified records are available (as they are provided by either the modification operation itself or the checking Read Operation).

Normally the first step in modification operation processing the performing the actual modification. As a result of preparation for this operation additional data may be gathered. For example, for Create operations unique ACTOR_RECORD_IDs can be obtained just prior to the record creation (or as a result of record creation).

Repository Transaction History.

For further processing the records to be modified are separated by repository id.

Then for each repository a set of field/column history records is created, grouped by history for a given record (table row). If a group of Modification Operations is run in a transaction, then all history entries for records of a repository in that transaction are grouped by operation (under a new repository transaction history record). Otherwise a repository history transaction record is created for the only Modification Operation in the transaction. Importantly, an AIR Database transaction history is created as well, which groups all Repository history transaction records. Hence all replaced and deleted values are recorded in history records.

Here is what the tables that store the transaction history records look like. Note (additional columns may be added, all columns do not allow null values, with the exception of SYNC_TIMESTAMP), as shown for example in Table 24.

TABLE 24

DATABASE_TRANSACTION_HISTORY

| Column Name | Data Type | Additional Info |
|---|---|---|
| ID | NUMBER | Primary Key |
| TRANSACTION_TYPE | NUMBER(1) | Can either represent a Locally generated transaction (0) or one generated by a Remote Sharing call (1) |

DATABASE_TRANSACTION_HISTORY table stores records or the transactions from the point of view of the AIR database. A transaction is either initiated from a call by an App that is "local" to the AIR database, or by a set of data that comes from a grouping of Sharing Operations (that have arrived from other AIR databases). A Database Transaction may contain any number of per Repository Transaction History records, as shown for example in Table 25.

TABLE 25

REPOSITORY_TRANSACTION_HISTORY

| Column Name | Data Type | Additional Info |
|---|---|---|
| ID | NUMBER | Primary Key |
| DATABASE_TRANSACTION_HISTORY_ID | NUMBER | Maintains a Many-to-One relation to a record in DATABASE_TRANSACTION_HISTORY table |
| REPOSITORY_ID | NUMBER | |
| ACTOR_ID | NUMBER | Id of the Actor that created the related Repository Transaction |
| SYNC_TIMESTAMP | TIMESTAMP | Timestamp of the acknowledgement of this Repository Transaction History as being synced; NULLABLE |
| SAVE_TIMESTAMP | TIMESTAMP | Timestamp of completion of the modification operations under this Repository Transaction. Local to the AIR Database that created this Repository Transaction from a local App request |
| SYNC_STATUS | NUMBER(1) | Can either represent a Repository transaction in a "Synchronization Pending" state (0) or one that has already been "Synchronized" (1) |
| NUMBER_OF_MODIFICATIONS | NUMBER | Number of Modification Operations under this Repository Transaction |

REPOSITORY_TRANSACTION_HISTORY table stores one row for each Repository Transaction. Any given transaction initiated by an App may include any number of Repository Transactions (as well as changes to local tables that do not store Repository records). A Repository Transaction may contain any number of Modification Operation History records, as shown for example in Table 26.

TABLE 26

MODIFICATION_OPERATION_HISTORY

| Column Name | Data Type | Additional Info |
| --- | --- | --- |
| ID | NUMBER | Primary Key |
| REPOSITORY_TRANSACTION_HISTORY_ID | NUMBER | Maintains a Many-to-One relation to a record in REPOSITORY_TRANSACTION_HISTORY table |
| ORDER_NUMBER | NUMBER | Order of the Modification Operation within the Repository Transaction |
| CHANGE_TYPE | NUMBER(1) | Represents either Create (0) Operation or Update (1) Operation or Delete (2) Operation |
| SCHEMA_ID | NUMBER | Ids of the Publisher and Schema, encoded in a single number (for local AIR Database reference). |
| TABLE_ID | NUMBER | Id of the Table, unique within the SCHEMA_ID. |

MODIFICATION_OPERATION_HISTORY table stores one row for each Modification Operation, that may encompass any number of individual entity changes. It includes the order of all Modification operations in a Repository Transaction. And it specifies which Table (and Schema) the operation is performed on. A Modification Operation may contain any number of Record Modification History records, as shown for example in Table 27.

TABLE 27

RECORD_MODIFICATION_HISTORY

| Column Name | Data Type | Additional Info |
| --- | --- | --- |
| ID | NUMBER | Primary Key |
| MODIFICATION_OPERATION_HISTORY_ID | NUMBER | Maintains a Many-to-One relation to a record in MODIFICATION_OPERATION_HISTORY table |
| ACTOR_RECORD_ID | NUMBER | Id of the record created by the Repository Actor (usually unique to the Table including the record). |

RECORD_MODIFICATION_HISTORY table stores the ACTOR_RECORD_ID that uniquely identifies the entity in the modified table. A Record Modification may contain any number of Column Old Value History records (no more than one per column in the modified table, per modified record), as shown for example in Table 28.

TABLE 28

COLUMN_OLD_VALUE_HISTORY

| Column Name | Data Type | Additional Info |
| --- | --- | --- |
| RECORD_MODIFICATION_HISTORY_ID | NUMBER | Maintains a Many-to-One relation to a record in RECORD_MODIFICATION_HISTORY table |
| COLUMN_ID | NUMBER | Ids of the column for which the old value is stored. Unique to the table specified in RECORD_MODIFICATION_HISTORY table |

TABLE 28-continued

COLUMN_OLD_VALUE_HISTORY

| Column Name | Data Type | Additional Info |
| --- | --- | --- |
| OLD_VALUE | ANY (or equivalent, stored as VARCHAR if necessary) | The old value that was replaced by the modification operation. |

Figure 21:
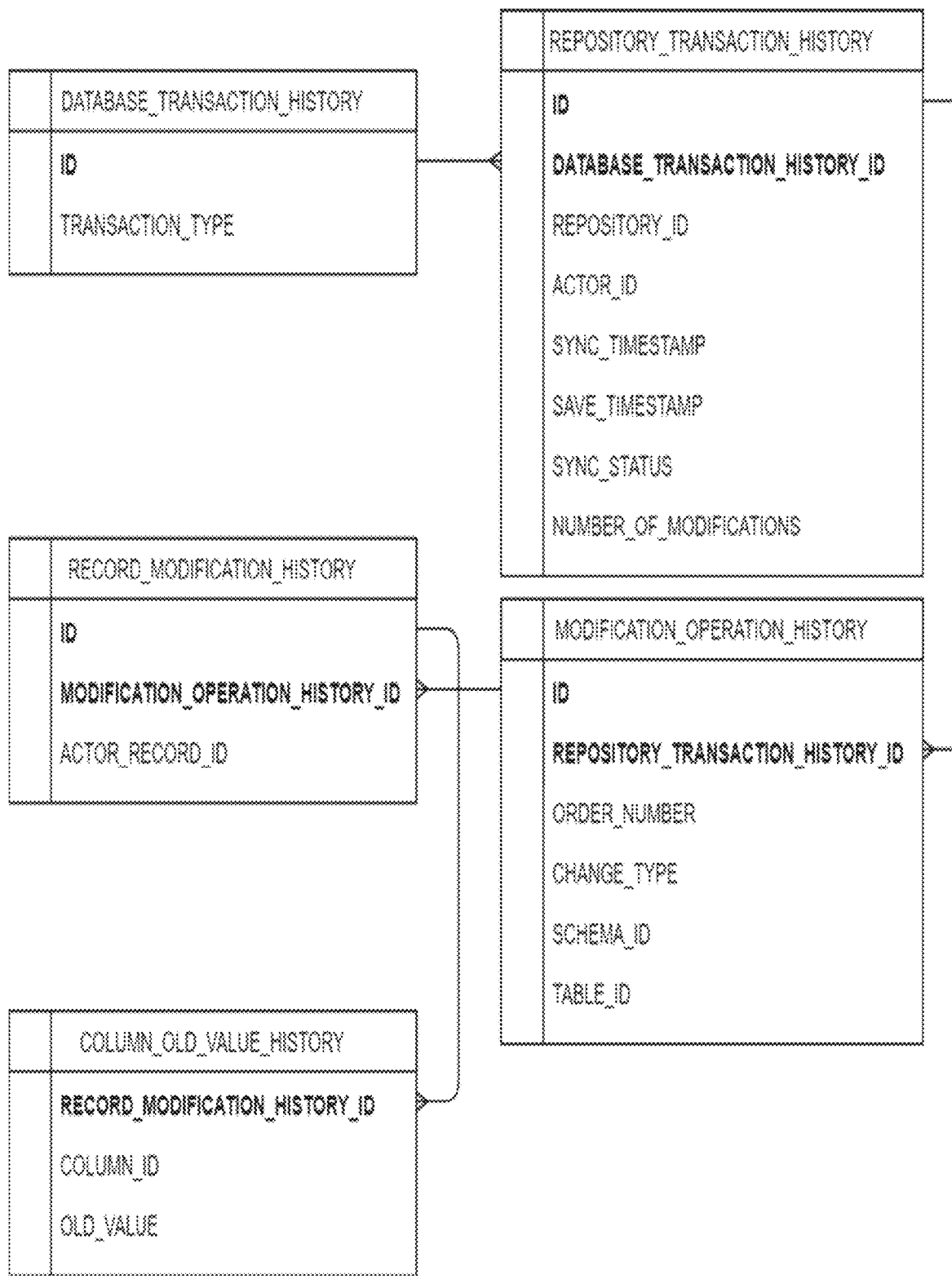
FIG. 21 shows an example relational representation of history tables.

FIG. 21 shows an example relational representation of history tables. COLUMN_OLD_VALUE_HISTORY table stores the old values that are replaced by the Modification Operation for the related record in the RECORD_MODIFICATION_HISTORY table. There are no entries in COLUMN_OLD_VALUE_HISTORY table for Create Operations, since there are no old values for Create Operations. For Delete operations all column values are stored.

Depending on the environment a given AIR database is running on, additional storage space saving techniques may be implemented in the transaction history tables. For example, given that the number of AIR Database transactions will likely be far less than the number of records that have direct or indirect Many-To-One relations to the DATABASE_TRANSACTION_HISTORY table, the DATABASE_TRANSACTION_HISTORY_ID may be implemented in related tables as part of a composite key along with Ids that are unique to the related record.

Modification Operations in a Transaction.

All Modification Operations are always wrapped in an AIR Database transaction (and a Repository Database transaction). Transaction can either be explicitly started by the calling app or be implicitly created around a single Modification operation it hasn't been explicitly started.

Figure 22:
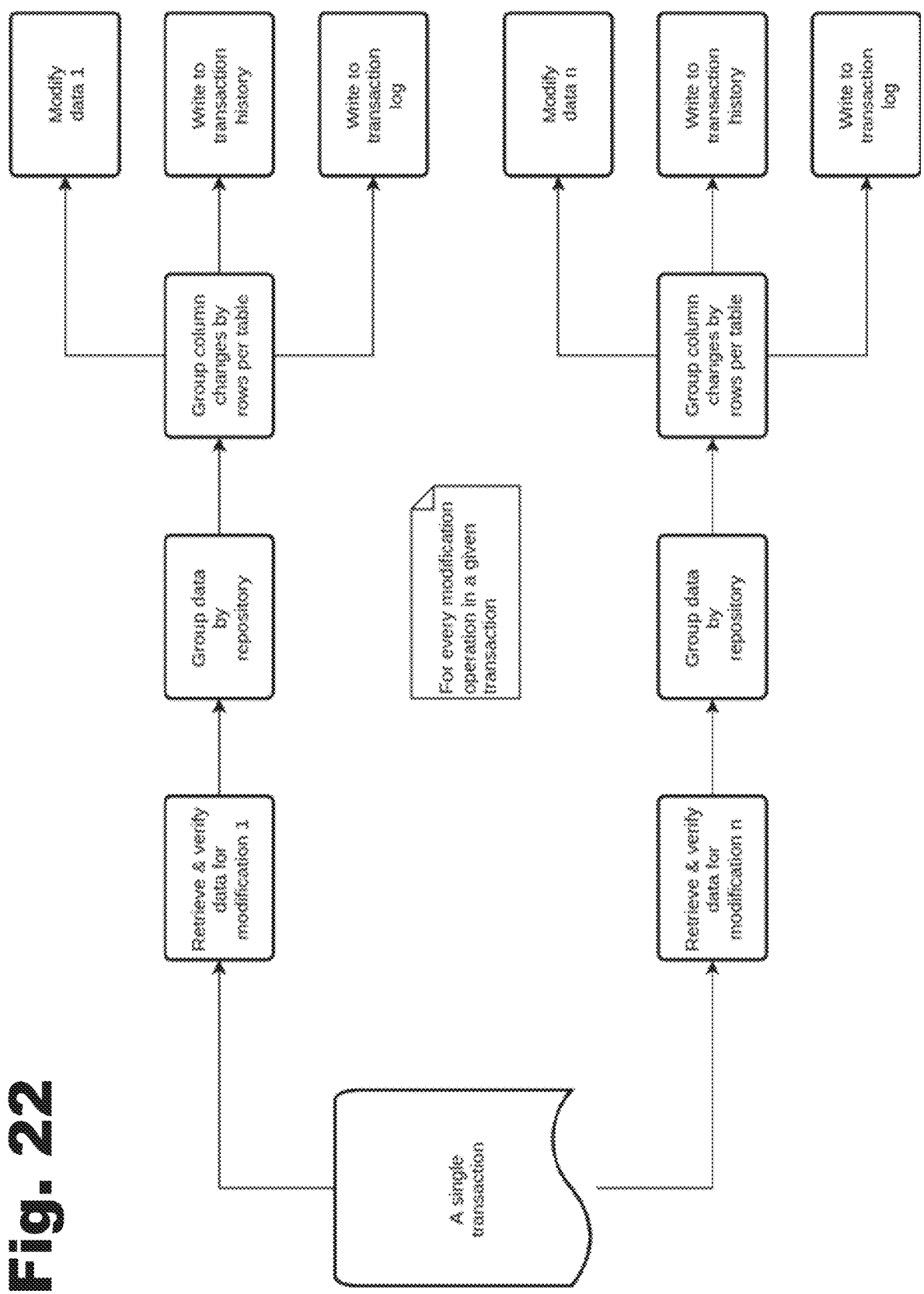
FIG. 22 is a flow diagram illustrating example transaction modifications.

FIG. 22 is a flow diagram illustrating example transaction modifications. Within an AIR database, transaction modifications happen in the order they are received by the database. Same goes for the creation of Transaction History records. The order of the records in the Transaction Log cache is also determined by database reception order.

Transaction History Sorting.

Within a given DATABASE_TRANSACTION_HISTORY, or within a given repository, or just within a given AIR database, REPOSITORY_TRANSACTION_HISTORY records are sorted using SYNC_TIMESTAMP. If SYNC_TIMESTAMP is the same for two records (or is NULL) then their SAVE_TIMESTAMP is implemented for sorting. If SAVE_TIMESTAMP is the same for two records then the records are sorted by the composites behind the ACTOR_ID (User Id, Database Name, Database Second Id, Actor Random Id, in that order). Changes are then applied in the specified order, from the earliest record to the latest.

Sync Timestamp.

Determination of Sync Timestamps is very important in AIR. Most importantly, Sync Timestamp of a particular Repository Transaction History (and the related Transaction Log) are identical on all of AIR databases that store the repository in question. Sync Timestamps are determined based on the sharing mechanism implemented for a particular repository.

If a repository is shared using a central sharing server then Sync Timestamp is assigned based on the timestamp of arrival of the Transaction Log record on the central sharing server.

If a file system is implemented for sharing then Sync Timestamp is the date of creation of the Transaction Log file.

If a Peer-to-Peer system is implemented for sharing a given repository a number of strategies can be implemented to determine the Sync Timestamp. For example, a given Transaction Log entry can be considered synced if all of the AIR databases with the Repository have received the record. In that example, Sync Timestamp will be determined after the Transaction Log entry has been propagated, using any number of algorithms (for example the latest reception ACK timestamp). A similar strategy can be implemented to consider a given Transaction Log as synced when a majority of AIR databases with the Repository have received the record. In an environment where reliable communication between AIR databases cannot be guaranteed the time of first transmission of the Transaction Log record can be implemented as the Sync Timestamp.

Transaction Logs.

AIR stores changes to repositories in repository Transaction Logs. To share these changes, AIR periodically communicates with other AIR databases which include the same repositories as it does. AIR may communicate directly with all or some of these databases, via a peer-to-peer mechanism or it may communicate via an intermediary, such as a file system or a central sharing server.

For all Modification Operations AIR creates a Transaction Log cache entry. In environments where sharing is done frequently and is reliable this entry can be kept in memory until the next sharing communication with interested AIR Databases (either directly or via a file system or a central server). In such environments writing to the transaction log cache is optional since it transaction logs can be created from history records. However, for performance reasons it makes sense to keep this cache.

Figure 23:
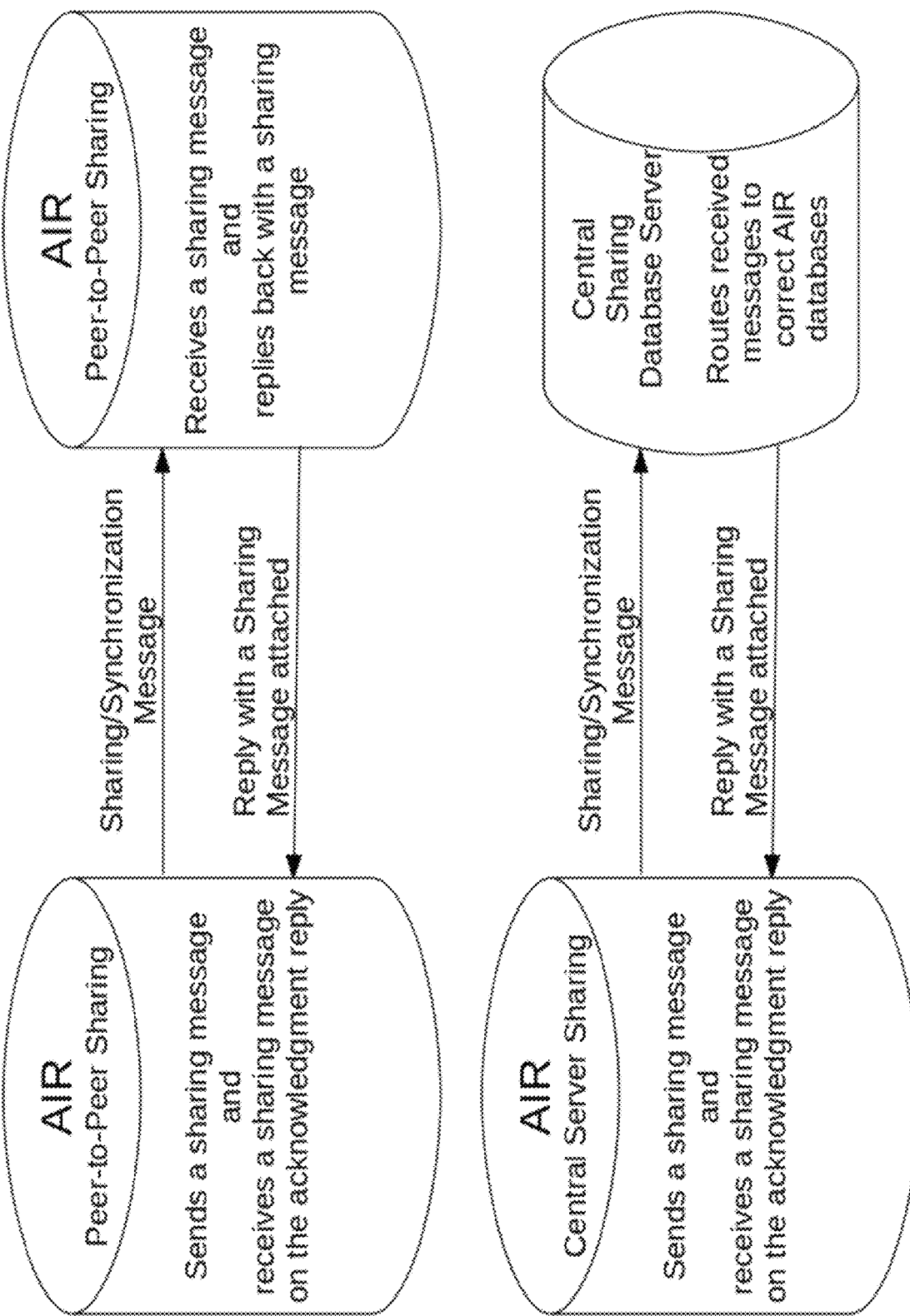
FIG. 23 illustrates an AIR database can communicate the transaction logs.

FIG. 23 illustrates an AIR database can communicate the Transaction Logs. Communication of the created Transaction Logs can either be done immediately after the transaction has been 'committed' (a relational database concept, making changes visible to all users of a database) or after a specific period of time. For performance reasons (such as battery and network resource utilization) it often makes sense to batch all Transaction Logs (committed for all repositories in a given database) into a single sharing/synchronization message. This batching can be done on the appropriate level. For example, all repository Transaction Logs going to the same central sharing server can be batched into a single transmission.

Depending on the underlying network protocol implemented for sharing (for example for HTTP connections, implemented by browsers) it may also make sense to use the reply to the sharing/synchronization message as a way to transmit back to the sending AIR database the Transaction Logs for changes made to other repositories that the sending AIR database is interested in (because it either stores them or it is acting as a message gateway for other AIR databases and forwards these Transaction Logs). The same strategy may apply in communicating with a central sharing server, with the server using the reply to send recent repository Transaction Log entries that the communicating AIR database is interested in.

Transaction Logs can also be stored in the AIR Database. The layout of the tables can be related to the way the AIR database communicates these records. The layout presented in Table 29 covers the theoretical needs but may differ for specific AIR Database implementations.

TABLE 29

SHARING_NODES

| Column | Description |
|---|---|
| ID | Unique Id of the receiver of the Transaction Log entries |
| SHARING_MECHANISM | Can include any number of values, such as 'File System' (0), 'Central Sharing Server' (1) and various types of peer-to-peer sharing mechanisms |
| ADDRESS | Address of the Sharing Node, can vary depending on the sharing mechanism. May use additional columns in the actual table implementations |
| IS_ACTIVE | Records if the receiver is currently active for sharing. |

This table records the receiver of the Transaction Log entries. Records in this table are long living and are implemented repeatedly, as shown for example in Table 30.

TABLE 30

SHARING_NODE_REPOSITORIES

| Column | Description |
|---|---|
| SHARING_NODE_ID | Unique Id of the Sharing Node (receiver of the Transaction Log entries) |
| REPOSITORY_ID | Id of the Repository tied to the Sharing Node |

This table records the Many-to-Many mapping between a given SHARING_NODES record and a given REPOSITORIES record. Alternate mapping techniques can be implemented, where appropriate, as shown for example in Table 31.

TABLE 31

TRANSACTION_LOGS

| Column | Description |
|---|---|
| ID | Uniquely identifies a Transaction Log record |
| REPOSITORY_ID | Id of the Repository for which this Transaction Log was created |
| SYNC_STATUS | Can include any number of statuses related to the sharing mechanisms. For example: 'Synchronization Pending' (0), 'Synchronizing' (1) and 'Synchronized" (2). |
| TRANSACTION_LOG_CONTENTS | These are the actual cached contents of the Transaction Log. |

TRANSACTION_LOGS can store the actual Transaction Log cache. The records are stored here as long as they haven't been confirmed to be synchronized via the appropriate sharing mechanism. Additional columns may be provided for actual implementations, as shown for example in Table 32.

TABLE 32

SHARING_MESSAGES

| Column | Description |
|---|---|
| ID | Uniquely identifies a Sharing message |

A row in the SHARING_MESSAGES table represents a Sharing message that was (is being/will be) transmitted. A given message can be transmitted to multiple Sharing Nodes, as shown for example in Table 33.

TABLE 33

SHARING_NODE_MESSAGES

| Column | Description |
|---|---|
| SHARING_NODE_ID | Unique Id of the Sharing Node (receiver of the Transaction Log entries) |
| SHARING_MESSAGE_ID | Unique Id of a Sharing Message |
| TRANSMISSION_STATUS | Status of the transmission of a Sharing message to a Sharing Node. For example: 'Message Sent' (0) and 'Message Acknowledged' (1), 'Message Retry Count Exhausted' (2) |
| RETRY_COUNT | Number of times the sending of this message was re-tried |

SHARING_NODE_MESSAGES table records the Many-to-Many mapping between a given SHARING_NODE record and a given SHARING_MESSAGE record. It also stores the TRANSMISSION_STATUS of a given message to a given Sharing Node. A record in this table is created when a Sharing message is sent to a particular Sharing Node, as shown for example in Table 34.

TABLE 34

SHARING_MESSAGE_TRANSACTION_LOGS

| Column | Description |
|---|---|
| SHARING_NODE_ID | Uniquely identifies a Sharing Node record |
| TRANSACTION_LOG_ID | Uniquely identifies a Transaction Log record |

Figure 24:
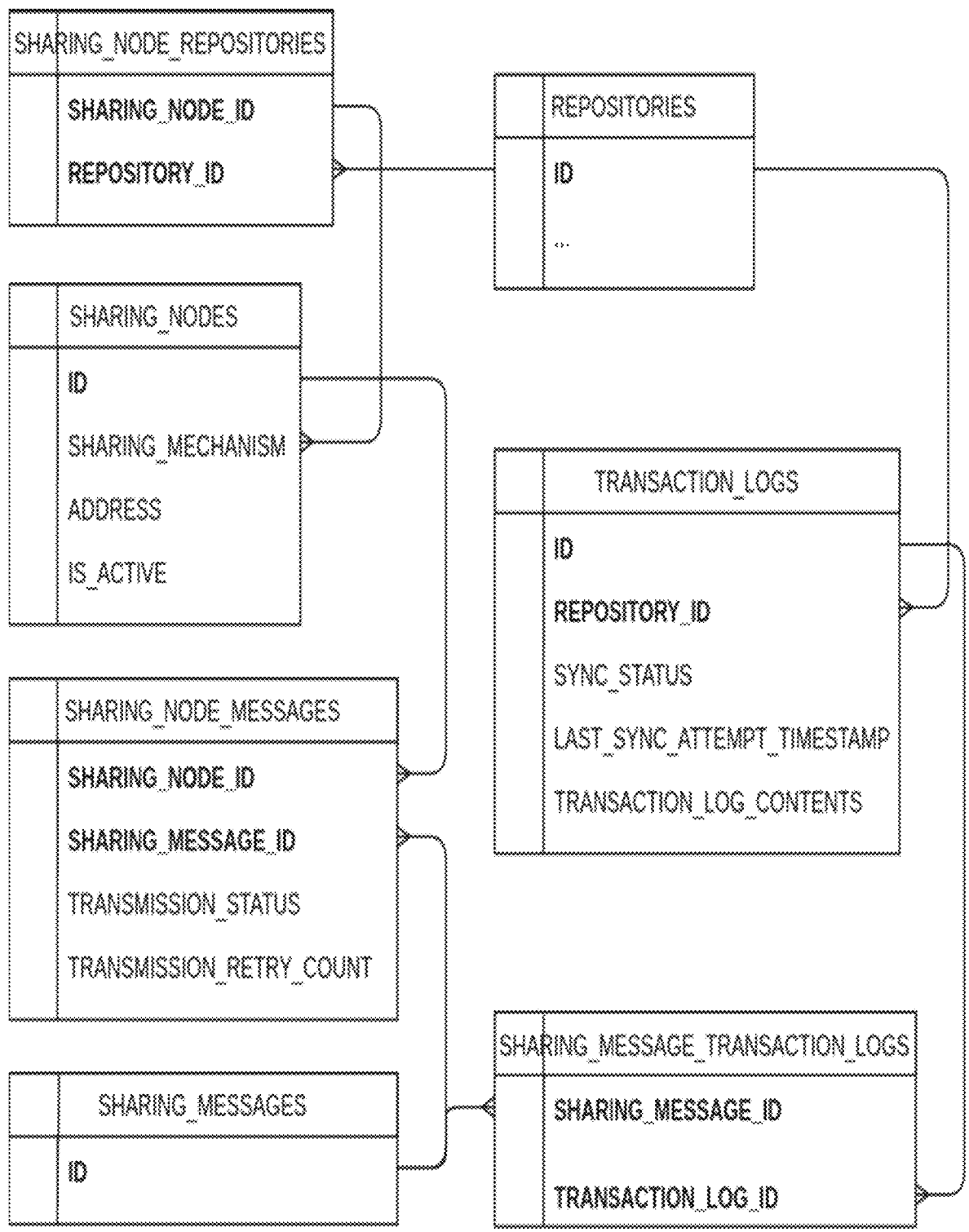
FIG. 24 is a relational representation of example log tables.

FIG. 24 is a relational representation of example log tables. SHARING_MESSAGE_TRANSACTION_LOGS table records the Many-to-Many mapping between a given SHARING_MESSAGES record and a given TRANSACTION_LOGS record. The life-cycle of it's records is tied to that of the record in the SHARING_MESSAGES table. Whenever a SHARING_MESSAGES record is created appropriate SHARING_MESSAGE_TRANSACTION- _LOG records are created along with it. Same goes for deletion from of SHARING_NODE_MESSAGES table (possibly to free up space). A given Transaction Log entry can be mapped to multiple receivers (for example for various Peer-to-Peer sharing mechanism setups).

Figure 25:
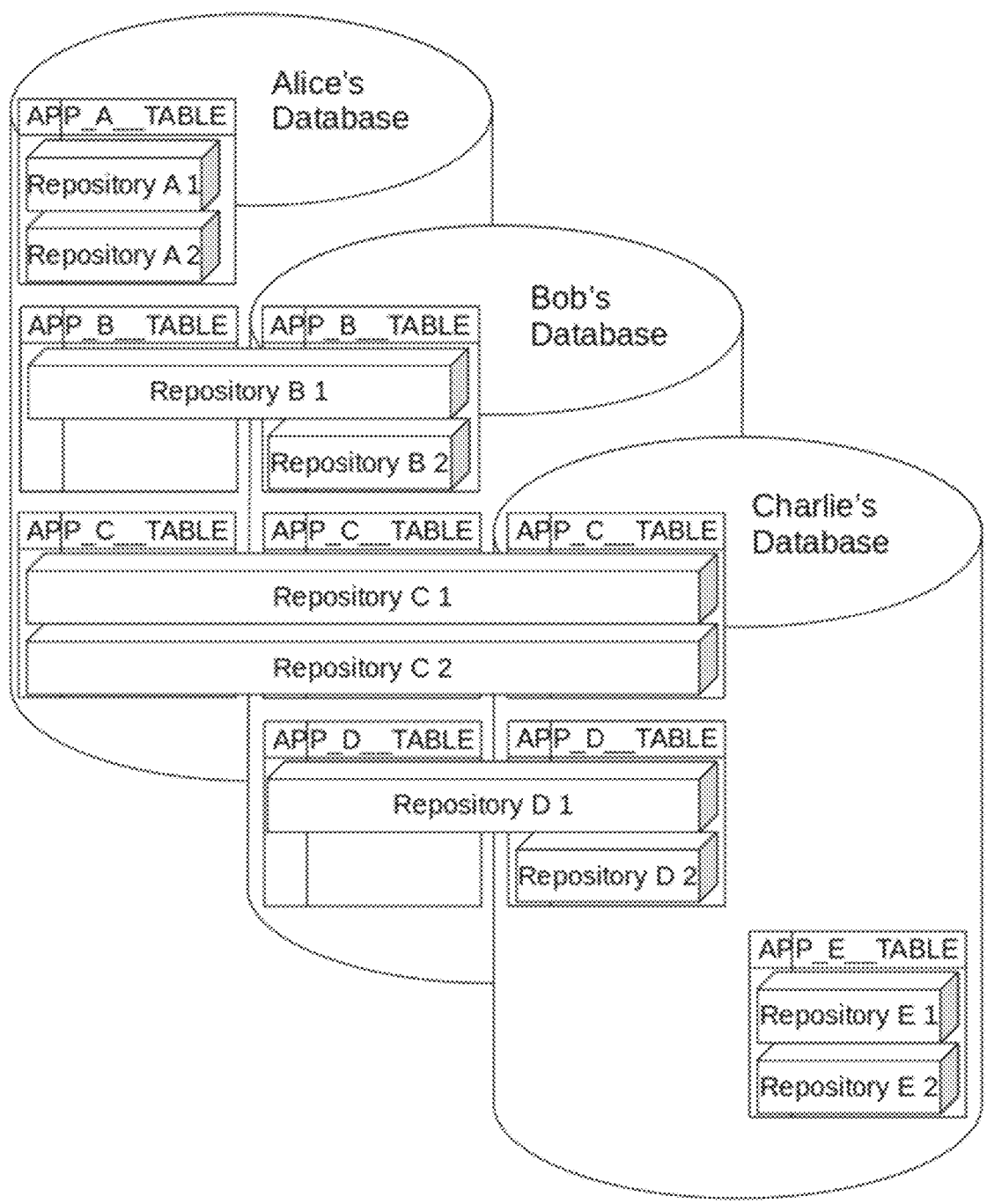
FIG. 25 illustrates an example of sharing repositories.

FIG. 25 illustrates an example of sharing repositories. A core benefit of autonomous repositories is their portability and hence the ability to share them between user's databases and various applications. Repository transaction logs can be exchanged between databases via any number of mechanisms that guarantee eventual consistency of all repositories shared across databases. Multiple applications accessing the same database can have access to the same repositories, based on a number of access rules. And, of course, repositories can reference each other.

Figure 26:
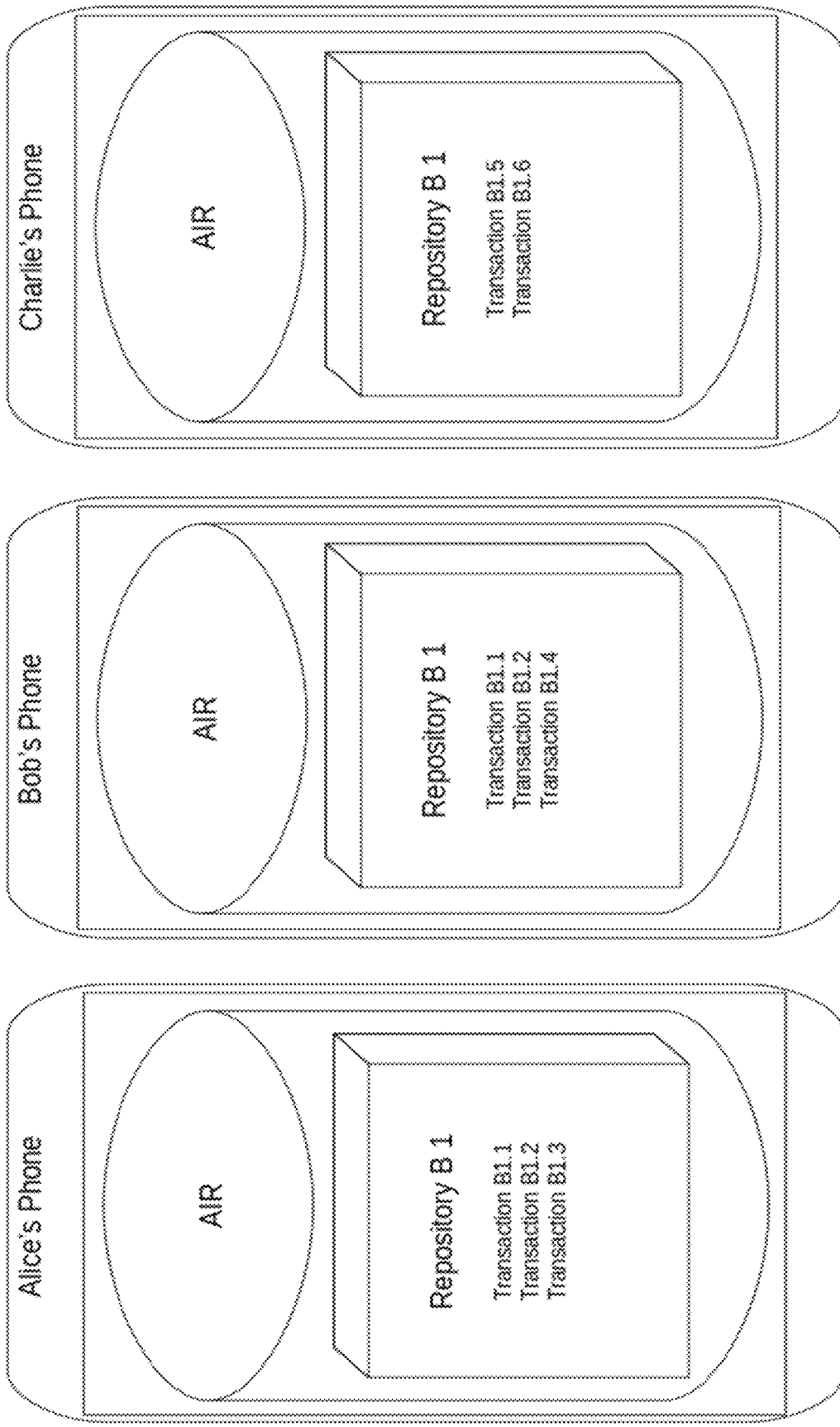
FIGS. 26 and 27 illustrate repositories across databases.
Figure 27:
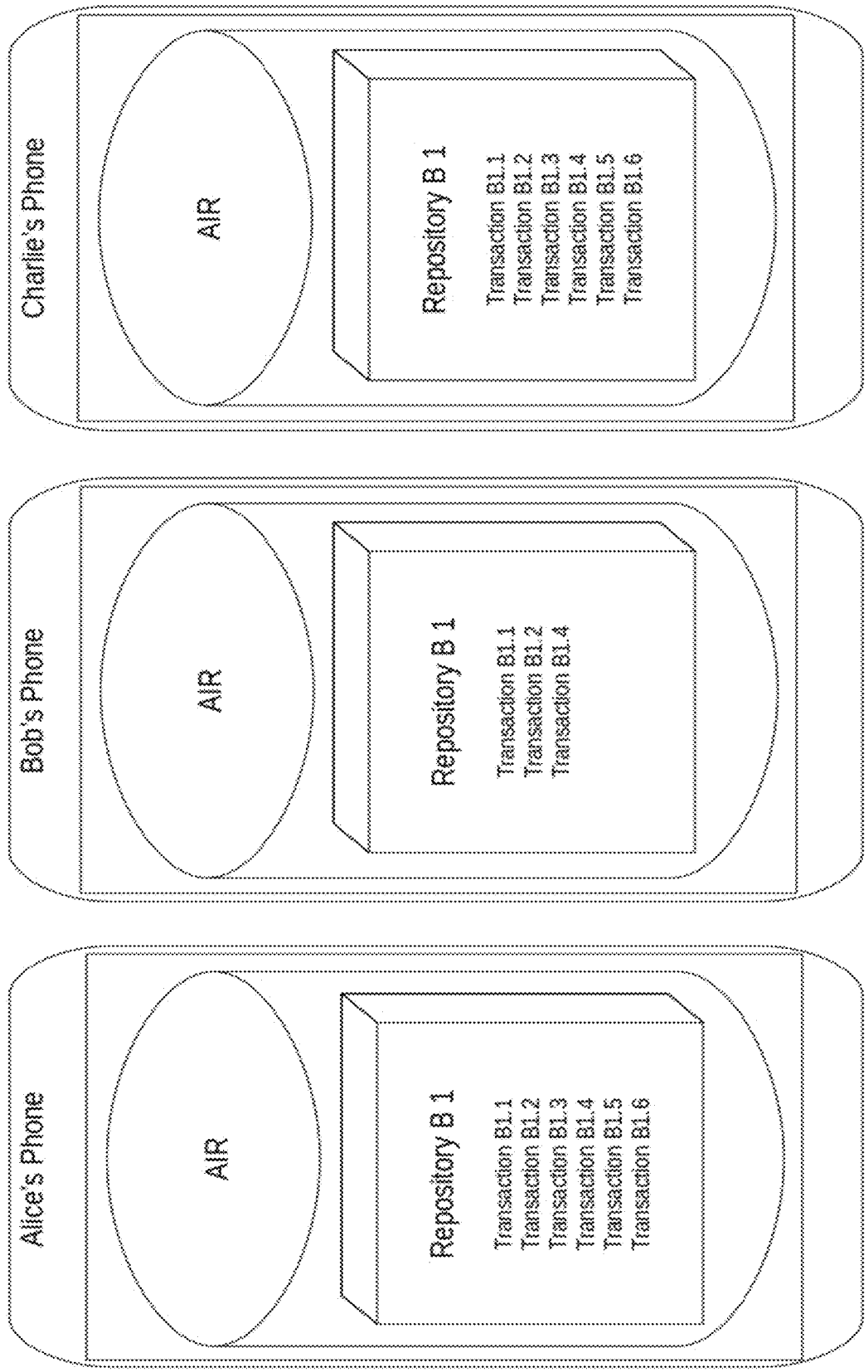

FIGS. 26 and 27 illustrate repositories across databases. Each repository can have any number of users (more specifically Actors) and be stored in any number of databases. Hence a repository can simultaneously live in multiple databases. Any number of databases can be on different devices or on the same device.

Repository Inconsistency Toleration.

AIR is designed as an "off-line first" system. Given a single user database, the user has all the records created by that database (minus the archived ones) plus all of their records created on different databases that have been synced to this database. At any given point in time the device on which a database resides can go off-line for a period of time. During that time the user continues to use the database with the complete desired dataset and may add new records. If a number of users are entering data (via databases which may or may not be synced as well) at the same time then the repository in the off-line user's database goes out of sync. However, the off-line user is still able to use that repository.

When the off-line database goes back on-line it synchronizes with the rest of the databases. The user may be notified of the changes via a client library that can subscribe all of the applications current queries (via the Observable pattern or a like) and automatically updates rendered views. The applications can also receive additional notifications of data changes and act on them appropriately.

AIR utilizes record identification system that guarantees uniqueness in off-line conditions. Modification operations may be performed by record id. Because of that, a number of performance optimizations can be applied to keep synchronization very fast, even with widely varying starting points.

In a given AIR database (that receives a number of "out of order" Transaction Log entries for a given Repository) examples of such optimizations include: Record create operations can be applied without any additional consideration, since their ids are unique. Record update operations take into account any updates performed subsequently on the records in question. If such (later) changes are found then they win (and a notification record is written to let applications know that the newly received update was overwritten by a later update). Record delete operations see if that record is currently still referenced anywhere. If it is then the delete can be disallowed (and a notification record is written to let applications know that a delete was "prevented"). In addition to that a new Transaction Log can be written with a notification to other databases that a delete was "rolled back". Other delete resolution strategies are possible.

Update and Delete Operations may query for data. These queries can be performed in bulk for all of the Update and Delete Operations a given database is about to process (in all of the Transaction Logs it receives in a given batch).

Figure 28:
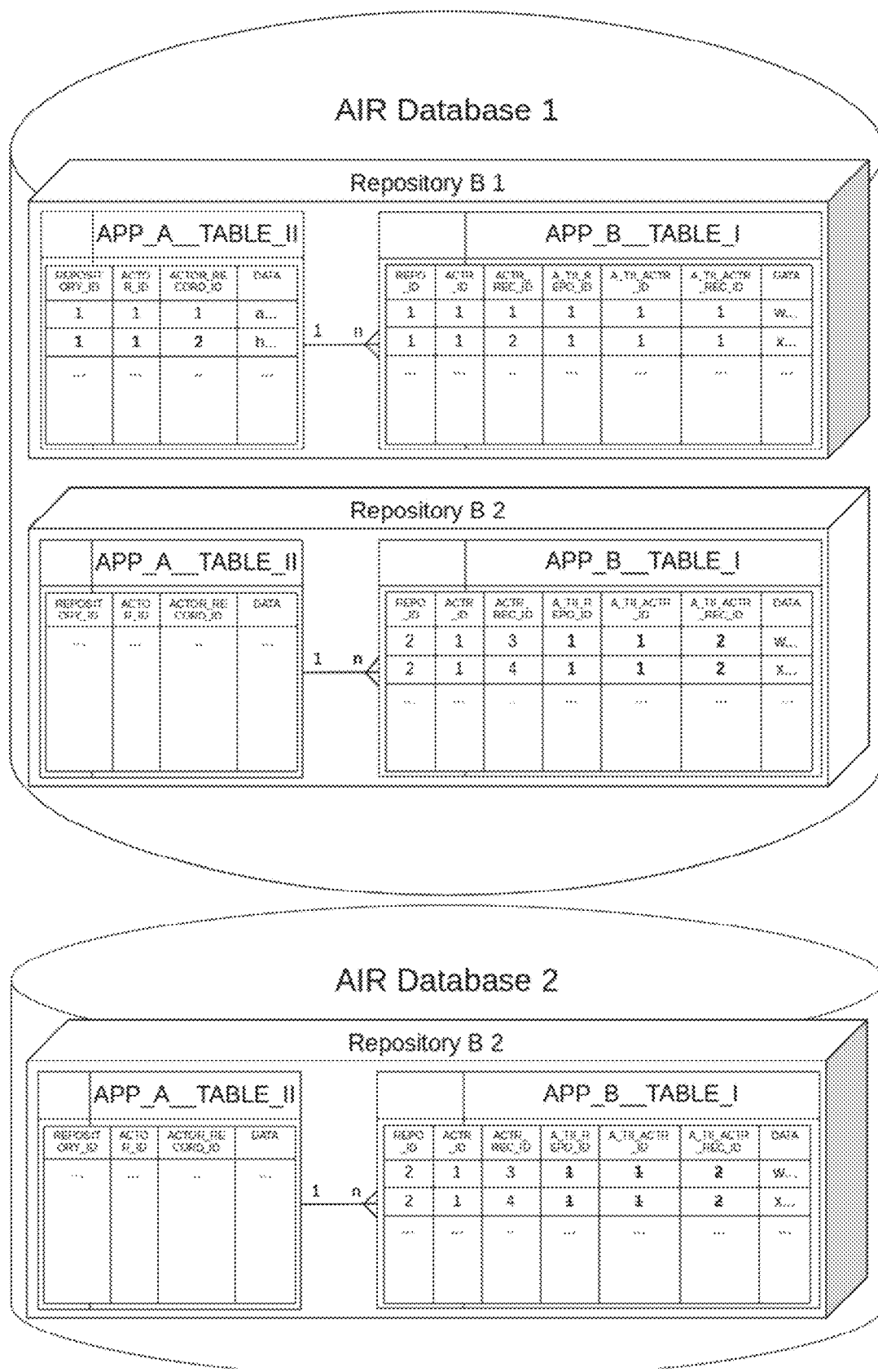
FIG. 28 shows an example of cross-repository inconsistency management.

FIG. 28 shows an example of cross-repository inconsistency management. Repositories can have dependencies on each other. A given Repository can be referenced in records of another Repository. For example, a record (table row) in "Repository B 2" can reference a record in "Repository B 1". Under specific conditions (e.g., in peer-to-peer setups, where Transaction Log changes are communicated in small batches without synchronous acknowledgement, and due to network conditions, only some of these batches are received) it is conceivable to have inconsistencies across repositories.

For example, an AIR database can have a Transaction Log entry for "Repository B 2" which defines the mentioned reference to "Repository B 1". However, at that time that database has not received any information about "Repository B 1" (or has not received just the Transaction Log entry that creates the referenced record). This causes an inconsistency where a record in "Repository B 2" references records that do not exist in this database.

A solution for this issue is not to enforce relational database "foreign key" constraints across tables. This way in "AIR Database 2" the data can still be in "APP_B_TABLE_I", even though it references data that does not exist in "APP_A_TABLE_II". Once "Repository B 1" arrives in "AIR Database 2" that reference starts pointing to real data.

Note that "AIR Database 2" creates a record in the REPOSITORY_ID_MAPPINGS Table for "Repository B 1" as soon as it processes the Transaction Log entry for "Repository B 2" that includes the rows for "APP_B_TABLE_I" which reference "Repository B 1". When "Repository B 1" arrives in "AIR Database 2" it is then referenced by the REPOSITORY_ID previously created in the REPOSITORY_ID_MAPPINGS Table.

Application developers that use AIR are aware of the fact that these scenarios can occur. It is still up to the application developers to pick a data retrieval strategy that works best for their application. An example is to use inner joins and simply not retrieve data that has not been synced fully synced.

Of course, foreign key constrains key can greatly aid application development. For that reason, AIR Development Tools can be configured to generate foreign key constraints in a development environment. AIR then does not generate the foreign key declarations in production.

Repository Conflict Resolution.

In a distributed environment data modification conflicts often arise. One database can overwrite a change by another database before that other database is aware of the overwrite. Because data for each repository is stored as a Transaction Log and local historical records are kept, changes for each database record can be available for inspection by applications and users. AIR defines conflict resolution strategies, configurable on per table or per record basis. Based on a Transaction History mechanism AIR implements automatic conflict detection between updates by different databases. Using applicable resolution strategy, it automatically resolves conflicts. Users can then be presented with resolution results and can manually overwrite the resolution outcome (thus causing a new transaction).

There is a particular type of conflicts that can't be easily resolved in automated fashion. These conflicts do not prevent successful operation of AIR. They may be caused by two Create operations by from different databases that intend to insert the same data. In these examples, both entries end up being recorded. There is no easy way to detect these conflicts because while the two entries are intended to represent the same data the actual information entered may be very different. AIR leaves resolutions of such conflicts to the applications using it. Since all repository entries are grouped into transactions AIR provides the tracking tools that can help an application to identify all of the data related to a duplicate entry.

Figure 29:
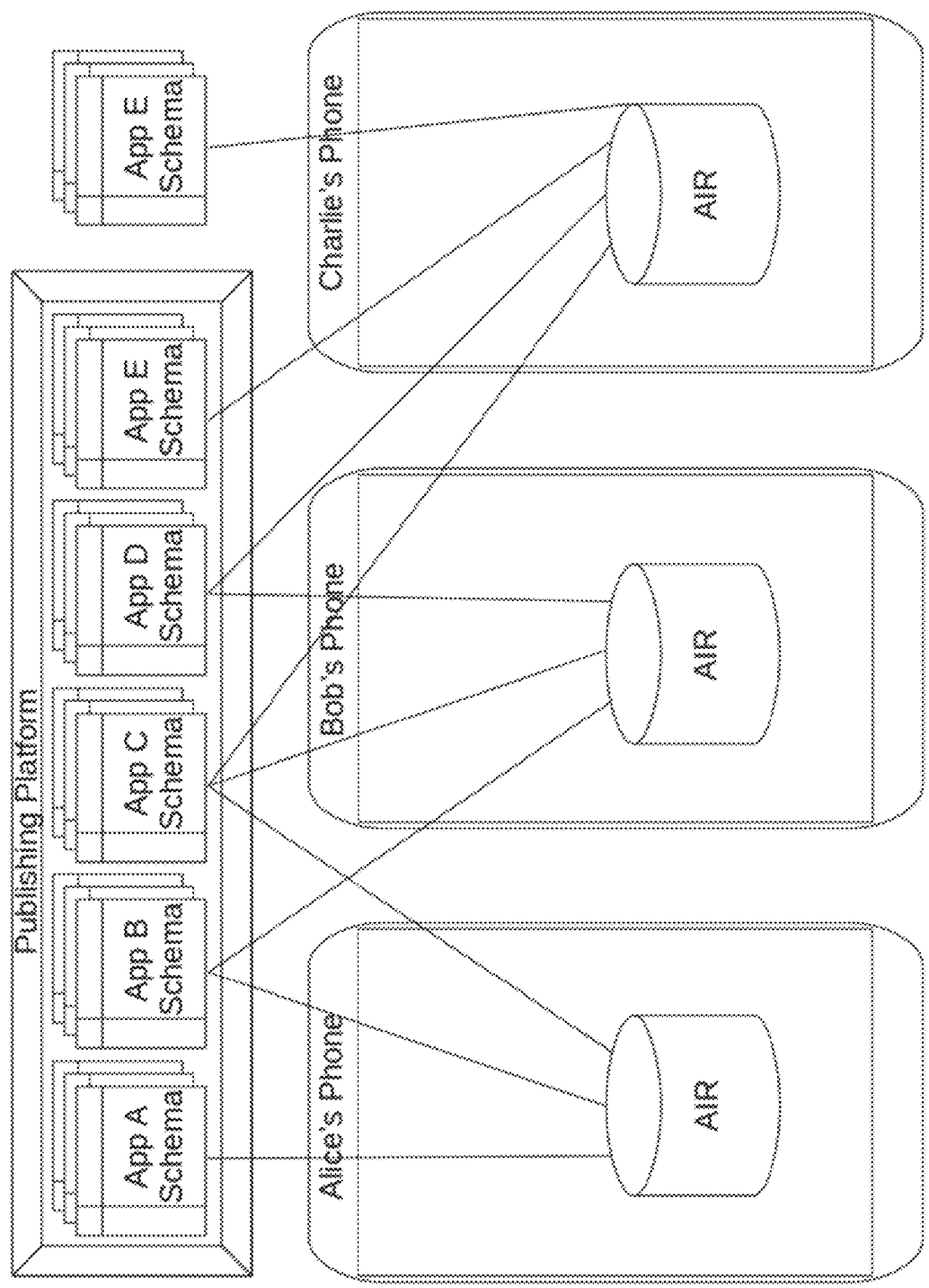
FIG. 29 illustrates example repositories across application publishers.

FIG. 29 illustrates example repositories across application publishers. Application providers can either distribute their schema with their application or publish their schema to a common publishing platform. A schema definition can either instruct the database not to share that schema with any other application, or to share any part of the schema with any or all other applications. An application may have multiple schemas, some shared and some not. Any combination of sharing of data between applications is possible—application can also lock down the repositories (which can exist across tables and schemas) that were entered from it in a configurable manner.

Any number of publishing platforms can be implemented by any given application. Schema definitions are designed in a way that ensures data security and schema integrity in the presence of possible attacks by malicious application providers. A schema definition application by AIR is guaranteed to apply only the changes that a given application can perform to the underlying database engine. This applies to both Data Definition Language (DDL) changes and data changes. This is accomplished by having data definitions (and all operations to perform DDL or data changes) in a serialized format. Schema definitions include no executable code. Schema definitions are checked for permissions before any schema or data change is made.

Repository Schemas.

The structural shape of a Repository is defined by one or more Schemas. Schemas may come from a single publisher or multiple publishers. AIR Schemas are functionality related to regular relational database schemas but are defined as a document (instead of a set of DDL commands). They also may have more functionality for cross application and cross publisher domain operations.

AIR is designed to run on relational databases. Any full featured relational database (with transactional semantics) may be implemented, scaling from Web SQL and SqLite to PostgreSql and CockroachDb (or equivalents). Other, non-relational platforms can also be implemented if they have a translation layer that supports standard SQL or a dialect of it. For example, AlaSQL, which can be backed by IndexedDb, can also be implemented (provided that it supports transactions). Non-SQL relational storage engines can also be supported (e.g., Lovefield).

Relational database platform was picked because of its rich feature set and good support for well-structured data. Static schema definition imposed by SQL works really well in an environment where schemas are published. It facilitates knowledge transfer and enables more efficient application development as a result of that.

AIR can may also work with document databases and other persistent stores. The two platforms that currently dominate the mobile space (Android and Apple) both come with browsers that support Web SQL and will likely continue to support it into the foreseeable future. For Cordova based apps, SqLite can be implemented.

Repository Schema Definition.

AIR Schemas can be defined in any number of ways. DDL commands are serialized in a way that can be checked by AIR at runtime for correctness and security permissions.

For example, Java Persistence API (JPA) entity definitions and annotations can be implemented (with minor amendments) to define underlying tables, columns (with data types), indexes and relations between tables. Here is an example of a part of an AIR record definition (in TypeScript):

```
@Entity ( )
@Table ( {
    name: "REPOSITORY"
} )
export class Repository {
    @Column( {name: "ID" } )
    @GeneratedValue ( )
    @Id ( )
    id: number;
    ...
}
```

Once a Schema is ready to be published it can be converted into any number of serialized versions that can be parsed by AIR at runtime. For example, here is how the above fragment may look like as a JSON object:

```
{
    "domain": "public",
    "entities": [
        {
            "index": 0,
            "name": "Repository",
            "tableConfig": {
                "name": "REPOSITORY",
                ...
            },
            "columns": [
                {
                    "index": 0,
                    "isGenerated": true,
                    "name": "ID",
                    "propertyRefs": [
                        {
                            "index": 0
                        }
                    ],
                    "type": 4,
                    ...
                },
                ...
            ],
            "properties": [
                {
                    "columnRef": {
                        "index": 0
                    },
                    "index": 0,
                    "isId": true,
                    "name": "id"
                },
                ...
            ],
            "relations": [
                ...
            ],
            ...
        },
        ...
    ]
}
```

Figure 30:
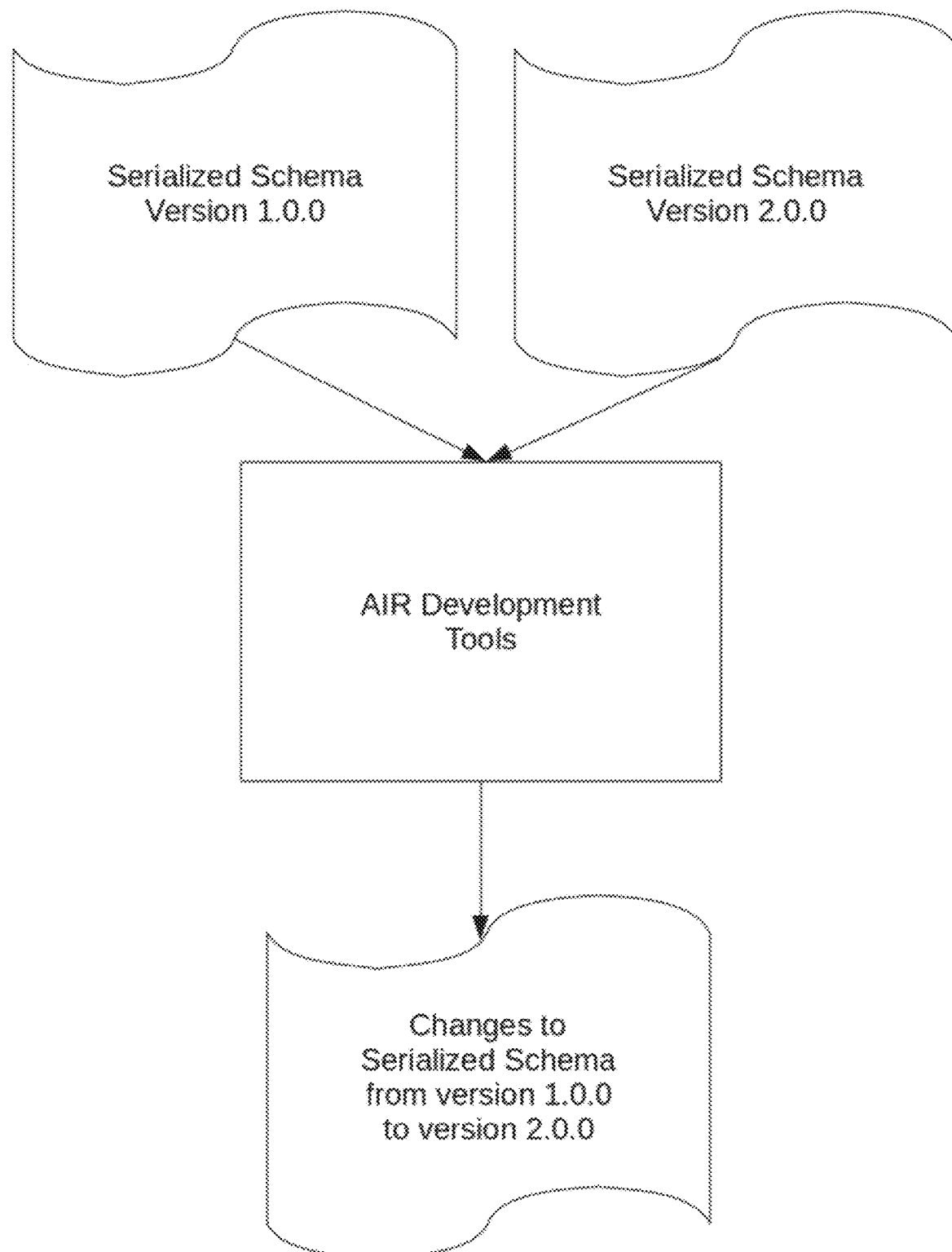
FIG. 30 is an example of serialization of the AIR database.

FIG. 30 is an example of serialization of the AIR database. Serialization may be implemented for security reasons. AIR is able to fully validate Schema definitions for any possible attempts to compromise anther Schema or another Schema's data. In general AIR does not run any code from any publisher and only executes its own code.

It is possible that overtime Schema definitions change. In that example, a schema upgrade may be implemented. Then only the changes to the schema are published in a serialized version. This is accomplished AIR Development Tools. At Schema-publishing time these tools generate a serialized version of Schema changes by comparing previous serialized schema definition with the new one.

Then at runtime AIR validates the schema changes, generates DDL commands and data upgrade commands and executes it in the database. DDL command generation can be done in a standard relational database way, with specific customizations for a given relation database.

Figure 31:
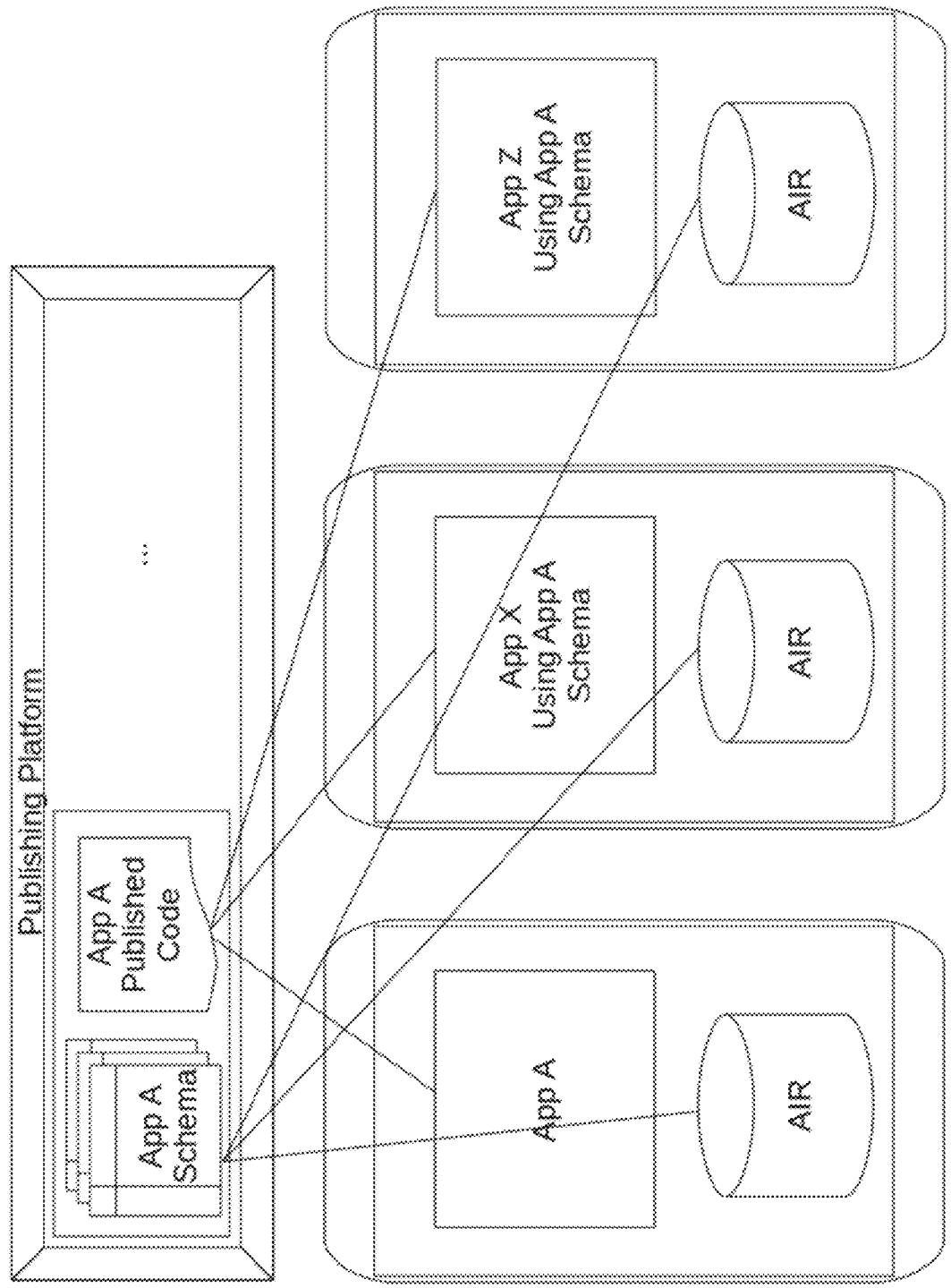
FIG. 31 shows an example of schema and logic separation.

FIG. 31 shows an example of schema and logic separation. A separate distribution of data access code (and any other logic a publisher wishes to distribute) that is not executed by AIR (or is received by the AIR installation) can be provided to other application publishers. This code provides other publishers higher level access to the underlying data and saves them development time. It also ensures proper usage of the schema and safeguards the data of the schema publisher from inconsistent updates.

If the schema publisher wants to enforce usage of their code for accessing their schema they can specify a list modification statements and or a list of queries that are allowed into their schema. Enforcement of those queries can be performed by hashing (e.g., SHA-256 or SHA-512) the prepared query definition (that does not include parameter values or any other potentially varying information) and verifying that the hash matches.

Published code is expected to be included into code of the Apps that use the Schema, since it may be tested prior to deployment. It is possible for apps to dynamically load published code from a publishing platform, if desired.

Schema Versioning.

AIR Development Tools enforce "semantic versioning" rules (or functional equivalents). Any changes that make a Schema incompatible with a previous version are detected and necessary cause a major version bump. This acts as an efficient communication mechanism to other App publishers that use the versioned Schema.

A given Schema may be marked as being in the "public" domain (vs private domain, limited to publisher's applications). If it is and there are Schema changes that are incompatible with a previous version of that Schema, AIR Development Tools implement the new version of the Schema to include database "views" (a relational database concept) that maintain the same representation of the data as in the previous version. An AIR schema cannot be published in the public domain unless it allows for the data to be read by other applications as it existed before a schema upgrade, due to likely lag between development of the publishing application and development of other applications that depend on the Schema of that application.

As a communication mechanism between application publishers, AIR may allow for publishing of Schema versions and related code to include "warnings" about future expected schema migrations. These warnings mark the Schema as "deprecated" and hence as being scheduled to be changed in the next release of the Schema.

Figure 32:
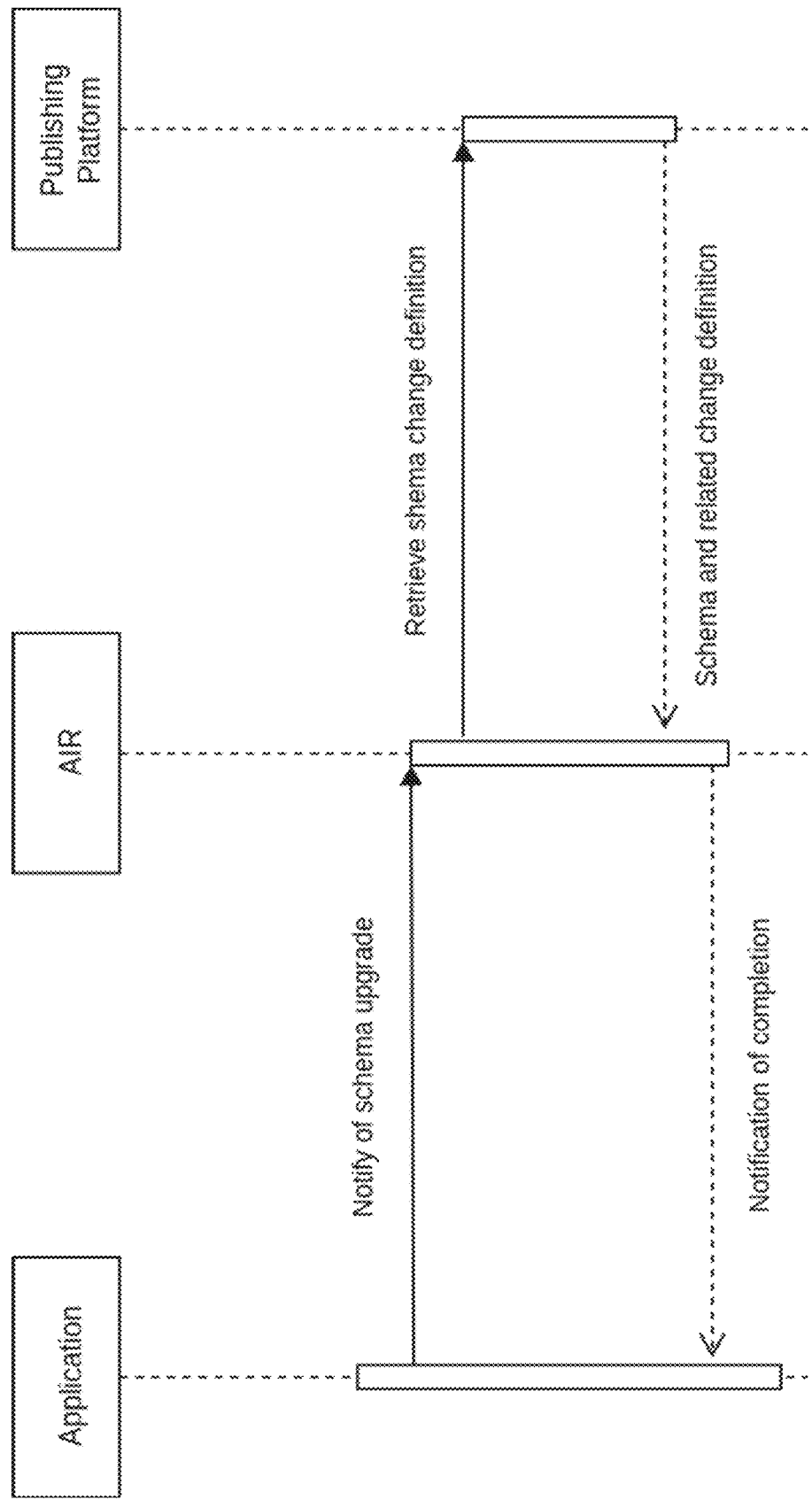
FIG. 32 shows an example of schema upgrades.

FIG. 32 shows an example of Schema upgrades. AIR is designed with application schema and data migrations in mind. Application Schemas are not allowed to break Schema and data consistency. If a breaking change is needed by an application Schema, a corresponding database view is provided to keep any and all references to existing data valid. Data migration and schema deprecation paths and cycles are also provided. Application publishers (that use a given Schema) may optionally be given grace periods (during which a part the Schema is "deprecated") to ensure that their corresponding applications can continue to create new repositories. Existing repositories are expected to always be accessible—no breaking changes are allowed to impact repository readability (which is ensured by creation of database "views" that mimic older versions of the Schema).

Schema upgrades of AIR databases can be initialized in any number of ways. By default, AIR does not pro-actively go out to publishing platforms to update Schemas. Instead, by default, Schema upgrades are initialized via notifications from Apps. If a Schema is not published and is distributed with the application, then it is sent directly from the application. If a schema is published then AIR subsequently retrieves the Schema definition from the publishing platform.

Along with Schema changes, it is possible for application schema to specify data modifications as part of Schema upgrade definition (or as stand-alone data upgrade definition). These have to adhere to the same serialization rules and go through the same validation process by AIR at runtime and only then be executed in the database.

Data Migrations with Schema Upgrades.

Data migrations are a first level concept in AIR. Because shape of data may change as repository Schema evolves, as Schemas are upgraded, they provide enough information and instructions to successfully migrate and all data stored in them. AIR is aware of all versions of all Schemas that are loaded into it and can reconstruct any historical repository transaction logs while keeping existing data in the current Schema versions. This may be accomplished by standing up additional Schemas in the same database instance or different database instances, rebuilding the data and re-upgrading those Schemas along the way and then merging the data in the current Schema. More advanced techniques can be applied to improve performance.

For upgrading Transaction Log entries, Schema publishers provide upgrade functions that upgrade all possible operations (Insert, Update, Delete) for all changed tables based on the contents of any given Transaction Log entry. The upgrade code is provided for every table version change. So that any version of a Transaction Log entry can be upgraded to any other version.

The upgrade code can be run in "sandboxes" with each Publisher getting their own sandbox. Each sandbox only sees part of the Transaction Log it is allowed to see by the schema sharing rules as they were at the time of generating the transaction. Each sandbox sees the data the application publisher is allowed to see by user. If a part of the data isn't currently allowed by the user, the user gives either explicit or implicit permission for the upgrade to happen. For example, in the reference AIR implementation, upgrade code runs in "IFrame"s from an origin different than the AIR database.

Security.

AIR is a "security-first" system. Every operation in AIR is designed to be secure by default. Communication between applications and AIR is performed over secure channels and command integrity and access rules are enforced by AIR. All Transaction Log entries guarantee data authenticity and confidentiality by default, even without a secure channel (though secure communication channels between AIR databases are expected).

Repository User Permissions.

Repositories may be "as small as needed". A given repository can include information unique to a specific group of users for a specific period of time on a given topic.

Hence, given the limited and focused amount of data per Repository, the AIR reference implementation (AirPort) currently allows only two types of permissions per Repository—Read and Read-Write. Users with Read permissions can only read from a given Repository. Users with Read-Write permissions can read from and make any modifications to a given repository.

Given that a repository is fully autonomous AIR allows for any security schemes. An AIR implementation can spit up permissions by operation (Create, Read, Update, Delete) per table, per column, per row or per cell in a row. It can also allow to setup permissions on combinations of these operations, in any given order or order template. These permissions may be dynamically revoked and granted by any set of authorized users on any level. Additional Repository metadata may be used to accomplish these advanced permission levels.

Figure 33:
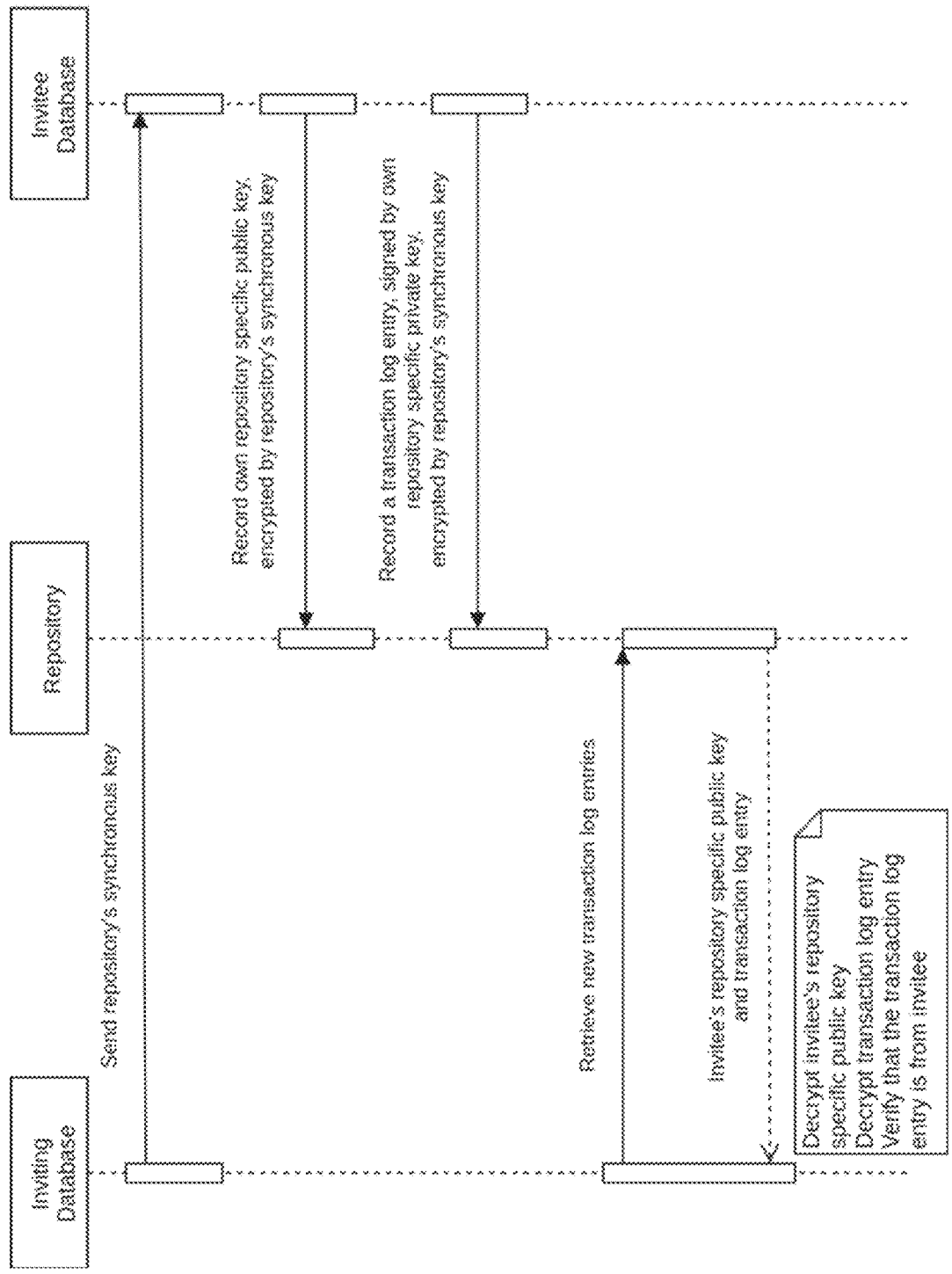
FIG. 33 shows an example of repository security.

FIG. 33 shows an example of repository security. AIR enforces repository confidentiality and authenticity (though this may optionally be turned off, in controlled environments). Each repository is independently encrypted using a repository specific key. Upon transmission, Transaction Log entries are encrypted by databases the with that Repository specific symmetric-key. Each transaction is singed to ensure authenticity. Each database has an asymmetric key pair per Repository and signs own transactions with its Repository private key.

In an environment where multiple users share the same database the signing private key is unique to a user per repository.

Repository keys can be encrypted with user master key and archived in a separate repository. User master key can be secured using standard surrogate+locking key mechanisms.

When a user is invited into a Repository they can reply to the invitation to with some secret information that was communicated to them via a separate channel (optionally this step can be skipped if authenticity of the invitee is already verified). Once the authenticity of the invitee is verified, invitee generates a public/private key pair for the Repository and sends the public key to the inviter. The inviter (or another authorized repository member) can then send the symmetric repository key to the invitee, encrypted by the invitee's public key.

Figure 34:
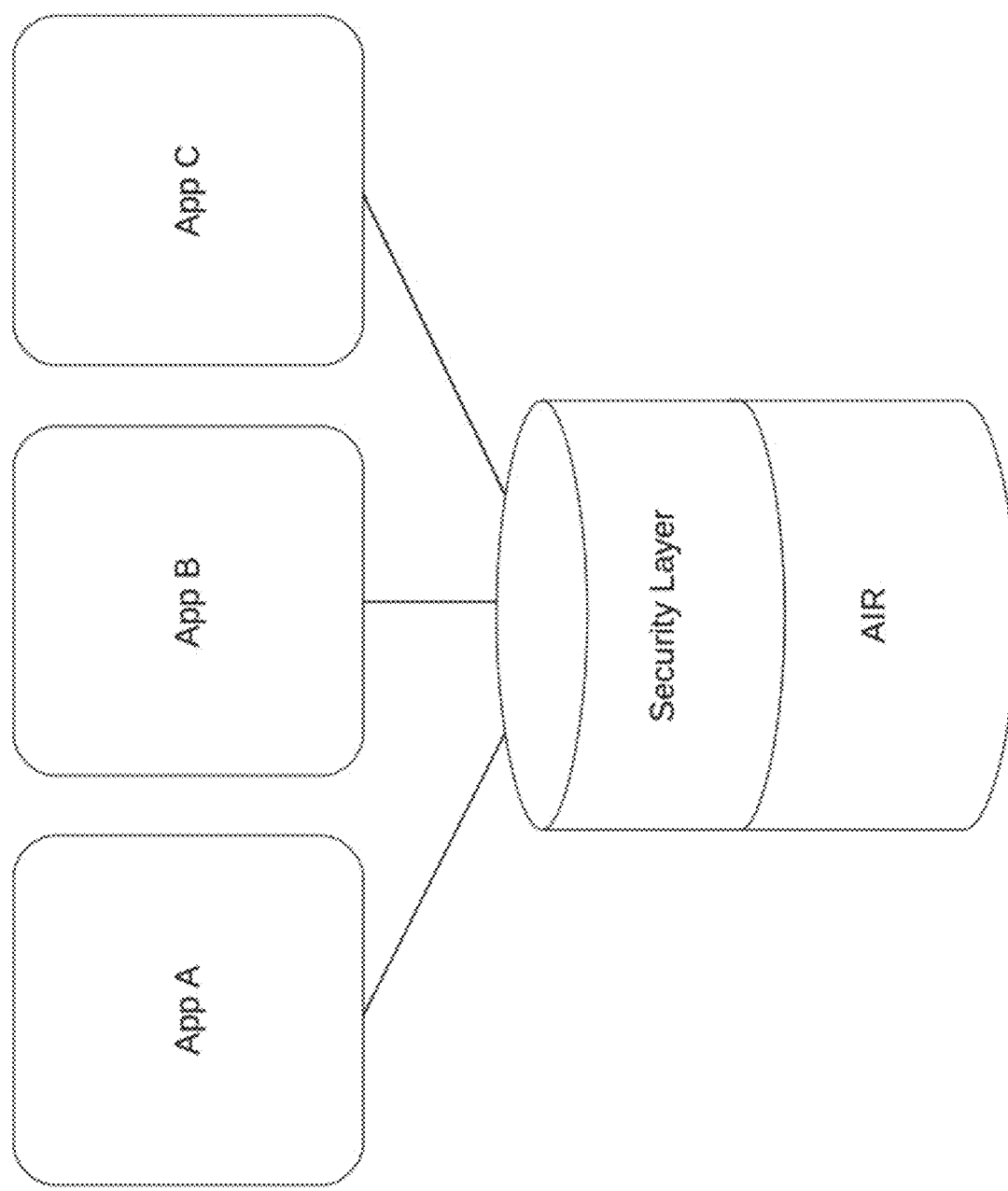
FIG. 34 shows an example of application security.

FIG. 34 shows an example of Application security. AIR enforces security and access permission rules between applications. In a given database user has access to all of their data. An Application has access only to the data user allowed them to access in its Schemas and in tables of Schemas other Applications allowed them to access. User data belongs to the user who either explicitly or implicitly allows Applications to use a part or all of it. Users can allow any grouping of other users to share their Repositories with a specified set of Applications or any grouping of Applications.

AIR commands coming from applications are checked against security constraints imposed by Schemas installed in AIR. By default, AIR is locked down to allow an Application to only see data from its own Schema and only the Repositories that were created by it. Any Schema sharing may be allowed by the Schema definitions. All Schema creation definitions and Schema change definitions coming from published Schemas can include any combination of Schema sharing setup.

Requesting Data.

AIR provides a mechanism for Applications to query for what Schemas they have access to in a given AIR database. This allows Application publishers to pro-actively ask user for additional data sets. AIR can also come with a default list of hierarchies and labels and Applications can use these hierarchies and labels (a.k.a. groupings) to ask user for a particular sub-set of data. User may also expose all or some of the groupings they are using and Applications may expose their general groupings to other Applications as well.

Data Access Control.

Data sharing between Applications is controlled by the user. Applications may not share data between each other without users implicit or explicit consent. Of course, Applications are free to communicate with each other directly (for example, to determine for what data to ask user's permission). Direct sharing of data between applications cannot be prevented but is discouraged by the echo system since it leads to data duplication and may compromise user data security. Though this is no different than the status quo, where any website in a browser is free to share any information it wishes with any other Application, without a user centric storage mechanism.

Application access can be locked down per Repository or per any part of it (on Schema, table, column, row, or row cell level or any combination of them, in any order or order template). User can either implicitly or explicitly specify which Repositories (or their parts) can be accessed by which Applications. User can use permission templates provided by Application publishers to accomplish that in an efficient way. An Application can also manage the level of access other Applications have to its Schema(s). It can do that automatically or as a result of a Schema change or a Metadata Repository data change.

Monitoring Schema Usage.

Application providers are also given ability to monitor the usage of their Schemas by other Applications. Every AIR database can notify the using Applications of what schema objects are accessed and by which Application. Same can be done on query level, where AIR can send to an Application record of usage of a particular the (dynamically generated or prepackaged) query. Query usage communications subsequent to the first one (per query) can send just the hash of the query being used. It is the responsibility of the Application to communicate that data to the Application publisher.

Application providers can optionally specify white lists of Applications allowed to use their Schema (or certain queries) and blacklists of disallowed Applications. This may be useful if an application provider is concerned with other Applications unfairly duplicating functionality. The maintenance of white and black lists can be accomplished by Schema changes or Metadata Repository changes.

Figure 35:
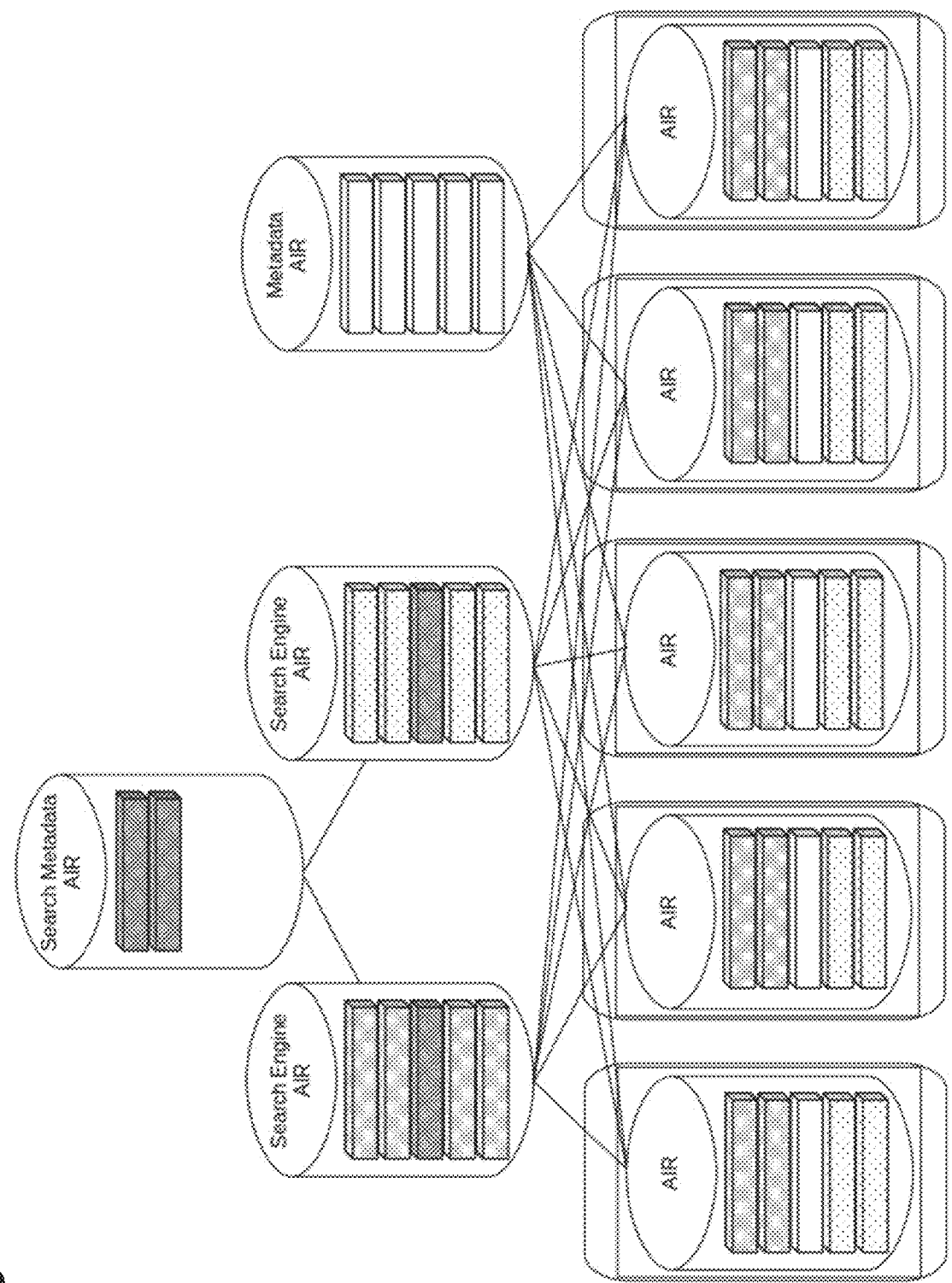
FIG. 35 shows an example of sharing AIR databases.

FIG. 35 shows an example of sharing AIR databases. AIR is built on the idea of sharing Repositories. Repository aggregation may vary widely between different types of databases. Any database may include tables that are local only and are not part of Repositories. These tables may be shared via other means. For example, Repositories can be split into groups and aggregated in larger databases used by Repository Search Engines (which index normal data Repositories contained in their AIR databases). The Search Engine databases can be hybrid AIR+local table databases to accomplish their business needs. They themselves can use the searchable data Repositories to create derived Metadata Repositories, which can be aggregated in other types of Search Metadata databases specialized in processing such metadata. Any database can create aggregate Repositories on any level and share them with any type of database specialized on processing those aggregates. A database may specialize in processing any number of types of Repositories.

Archiving.

All repositories are archived for the users that created them. Any user with access to a given repository may also archive that repository. AIR can allow or disallow archiving of repositories by users that don't own them.

Figure 36:
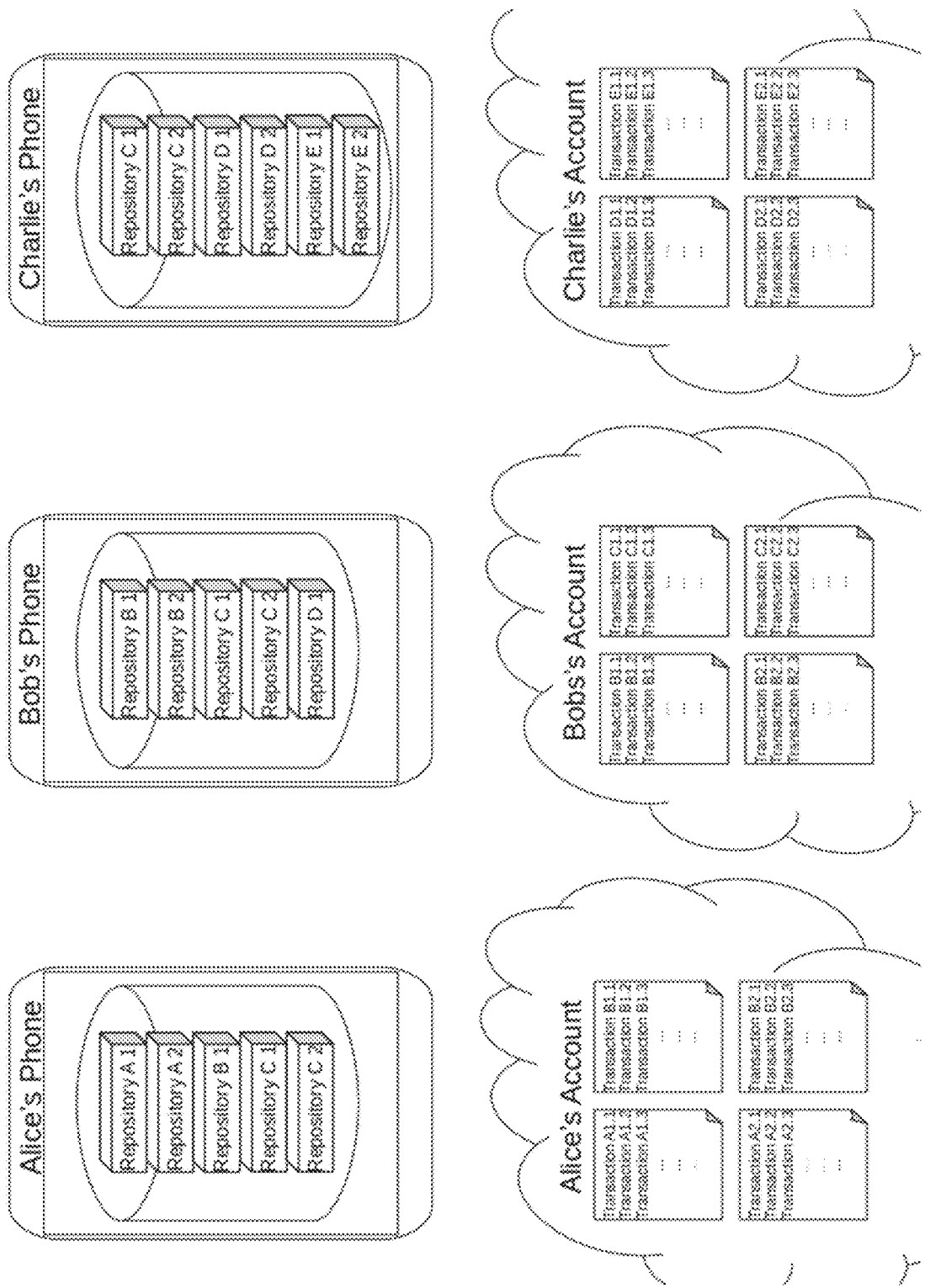
FIGS. 36 and 37 show an example of sharing AIR databases.
Figure 37:
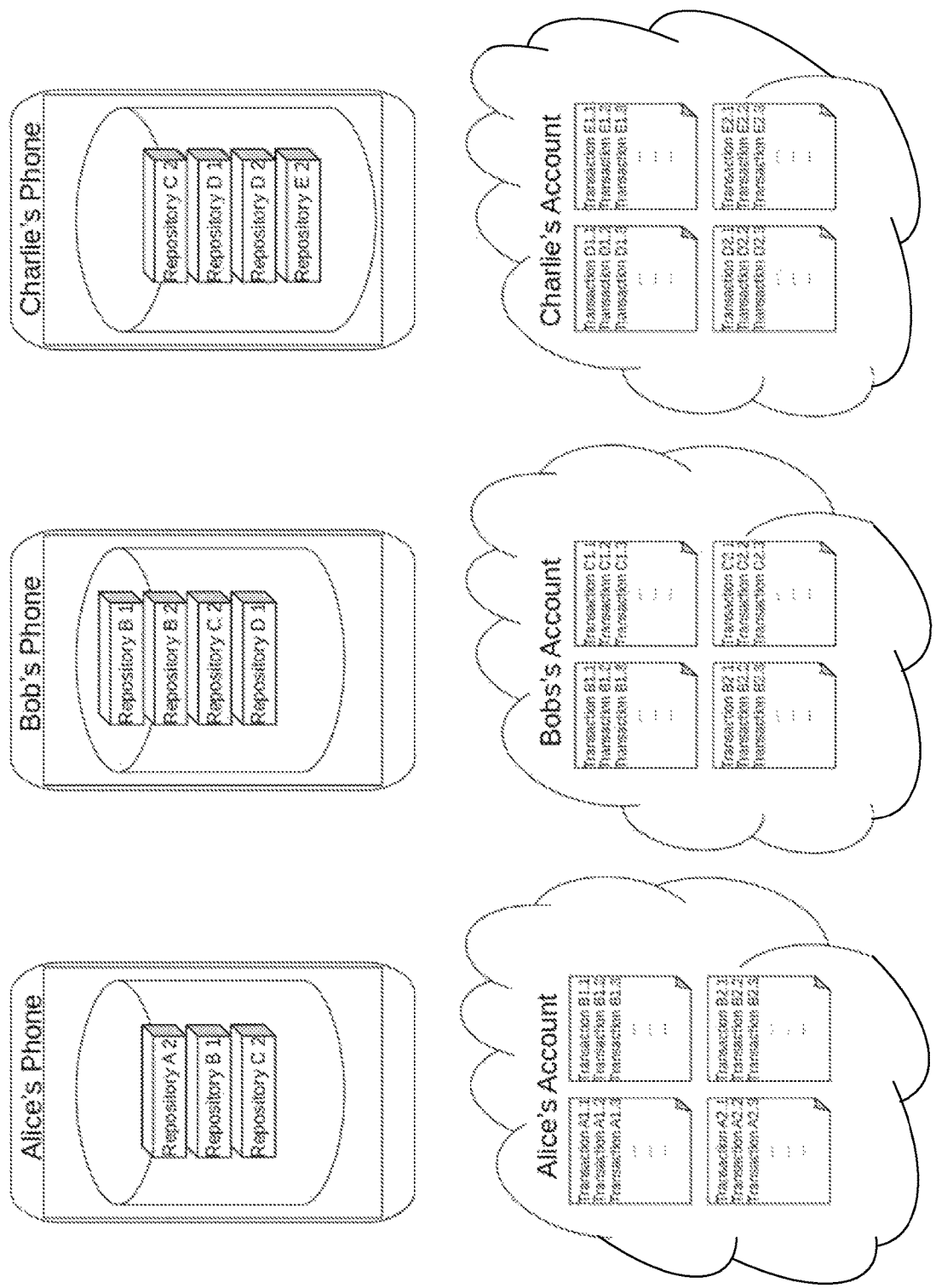

FIGS. 36 and 37 show an example of archiving AIR databases. AIR databases may contain any number of Repositories. Repositories are usually archived by the users that created them, but may be archived by other users as well (in improve resilience to data loss of or legal or security reasons).

A user may remove any Repositories from a given user database and add them back from their archives in in any order. A user may have any number of individual databases with any combination of Repositories which that user has access to.

Figure 38:
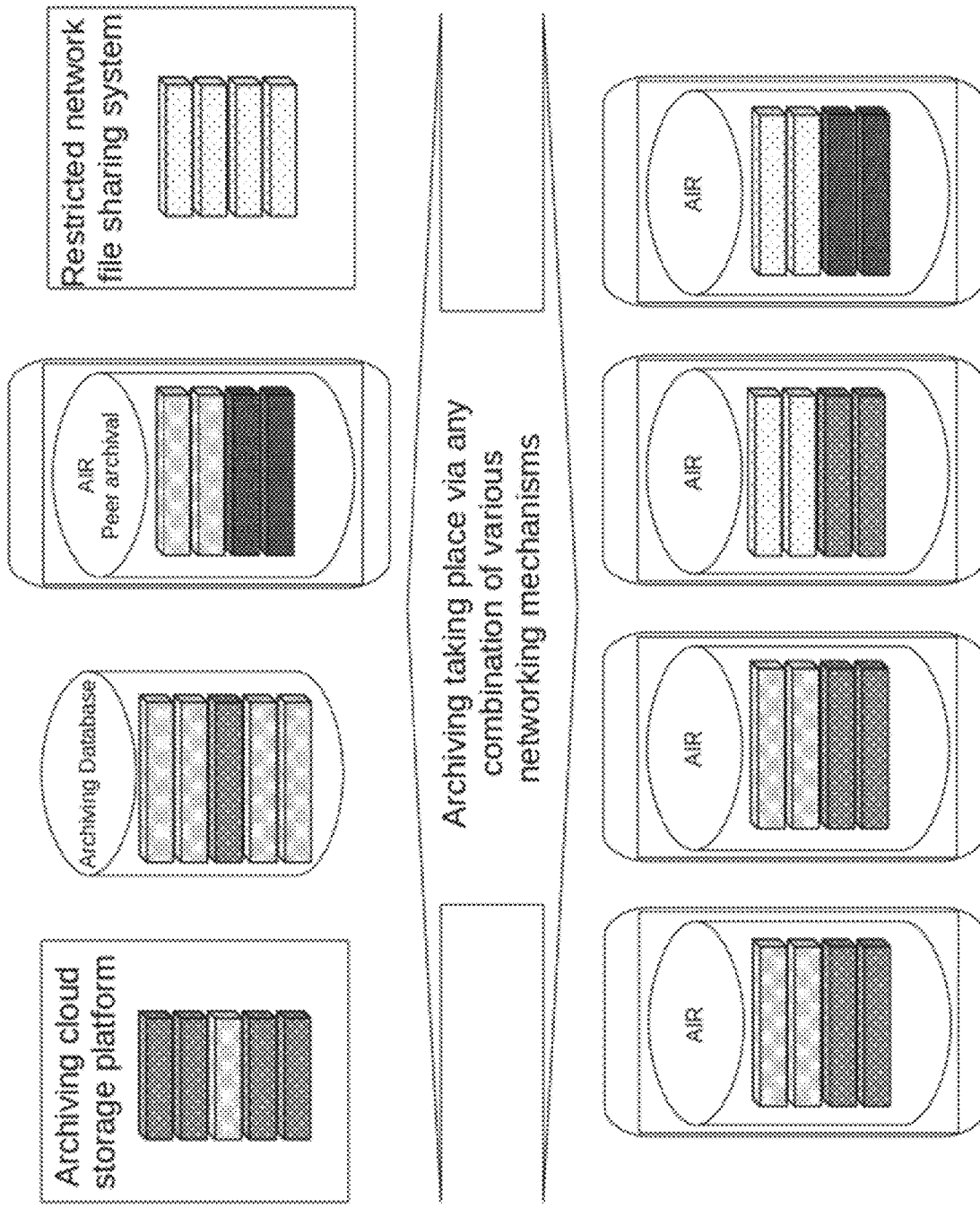
FIG. 38 shows an example of archival platforms.

FIG. 38 shows an example of archival platforms. AIR databases can hold any amount of data allowed by capacity of their storage. However, given the expected fine-grained nature of repositories, older ones are expected to be archived into long term storage (with an option to retrieve them at any time and in any composition). AIR does not limit types of archival platforms. An archival platform can be of any type, as long as it has the ability to retrieve all Transaction Logs for a given Repository or a group of Repositories.

Archival platforms can either be globally or regionally accessible with any region partition strategies (geographical or otherwise). Archival platforms may be accessible for only specific (even brief) amounts of time, given AIR redundant and off-line capabilities.

For data synchronization efficiency, it is preferred for an archival platform to have the ability to retrieve a targeted set of Transaction Logs for a given Repository. For example, any archival system that is a form of a file system works well with AIR. Also, any database based archival system may be implemented. In an example, archival can be performed purely on peer-to-peer basis, were a peer with excess storage capacity can provide archiving guarantees to peers that need to off-load unneeded data.

Two expected likely archival platforms are individual user cloud storage accounts and organizational servers. In an example, an individual user owns their own data in private and publicly shared Repositories. Hence it makes sense to archive those Repositories in personal cloud storage accounts. Some publicly available and (optionally publicly modifiable) Repositories may be owned by organizations of various types. For these it makes sense to store records on platforms owned by the respective organizations. In controlled environments archival can be performed to platforms closed to the public.

A given AIR database can archive different Repositories to any number of different archival platforms of different types. It is also possible to archive the same Repositories to different platforms and platform types.

Archive Structures.

Repository archives can be structured in various ways. A given Repository may be archived on per transaction basis on in batches of transactions. Given that Repository Transactions are ordered by synchronization time, chronological groupings make the most sense. Transactions can be grouped into daily, monthly, yearly or other time period batches. Transaction archives can also be grouped into progressively larger time periods. Currently, given the focused and time bound nature of Repositories per-day Repository Transaction groupings make the most sense in terms of archiving efficiency.

Figure 39:
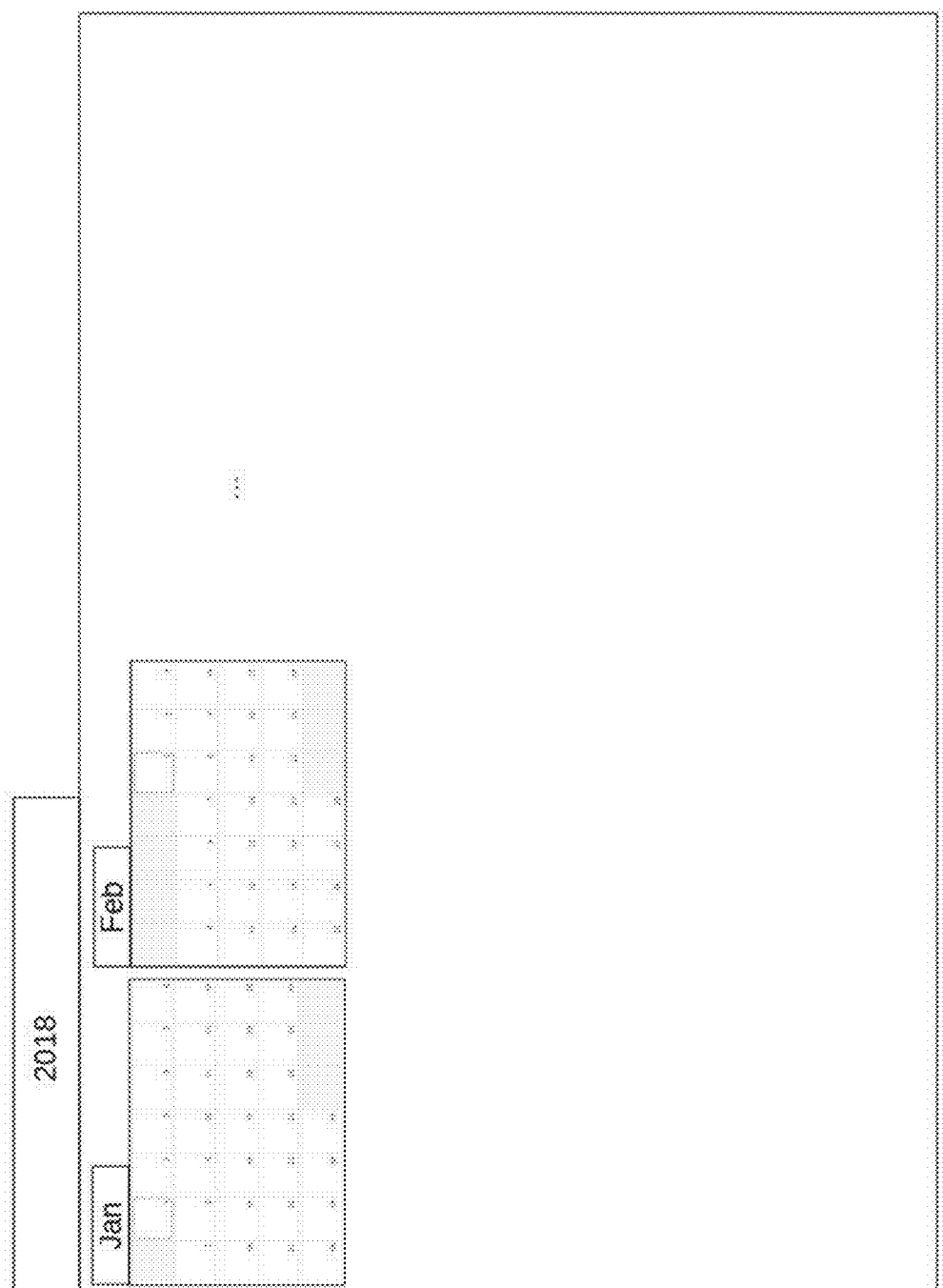
FIGS. 39 and 40 show examples of file system archive grouping.
Figure 40:
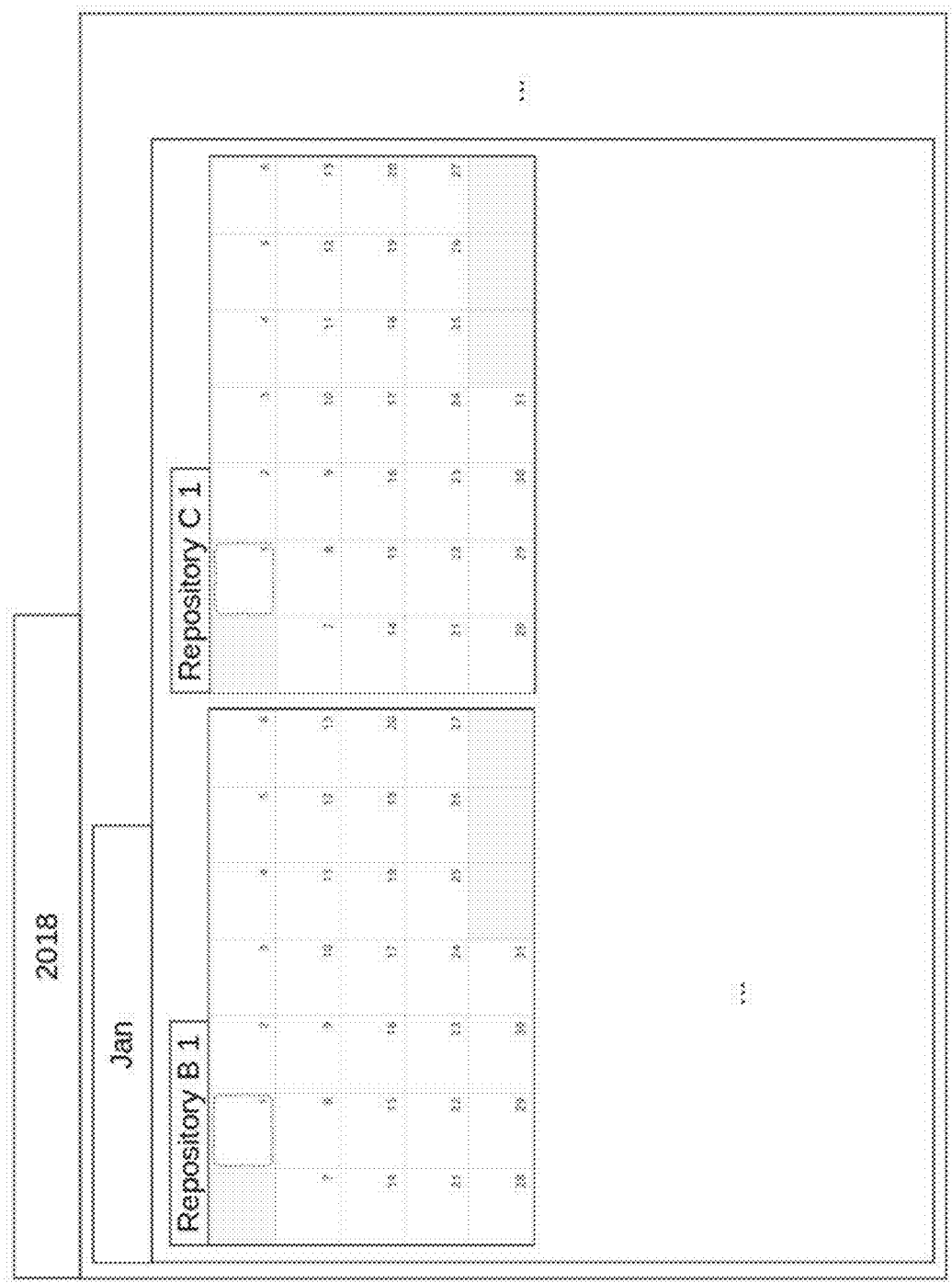

FIGS. 39 and 40 show examples of file system archive grouping. Transaction batches for a given repository can further be divided into access groups. On a file-system based cloud this may mean storing all day batches in a month directory and storing all month directories in year directories.

Multiple repositories can be stored in a given archiving space. Any number of arrangements can be implemented. Storing month worth of daily archive records in a directory with the name of the Repository may be useful for manual archive inspection. Those may then be stored in a common "month" directory, which may be placed in a "year" directory.

Sharing Mechanisms.

Data setup, search, coordination and Repository synchronization can be accomplished via a peer-to-peer communication mechanism, shared file systems or central sharing servers. Any other mechanism that allows data sharing over a network is also possible.

It is possible to implement features outside of the scope of AIR communication mechanisms and integrate them with AIR. For example, repository search may be better implemented using more traditional search engine technologies. AIR databases can then utilize the search engines accessible to them to locate needed Repositories and then use appropriate AIR communication mechanisms to retrieve and share them.

Figure 41:
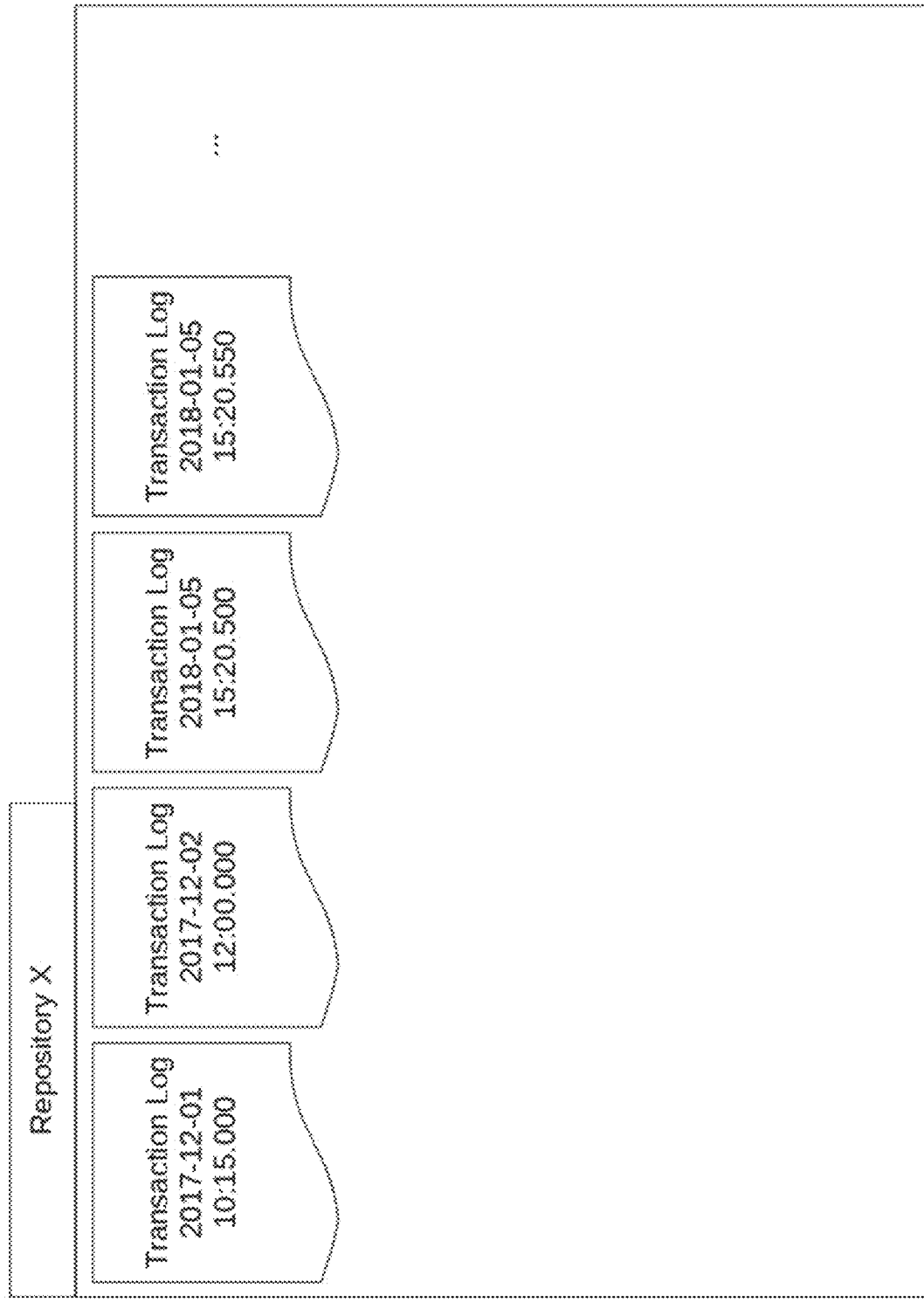
FIG. 41 shows an example of file system-based sharing.

FIG. 41 shows an example of file system-based sharing. In some environments communication over shared file systems may be preferred over other communication mechanisms. In such environments a shared file system may be available via any number of mechanisms (such as a network-attached storage server or any other type of file server, shared over the Internet or any other applicable network). File systems are a very well-known commodity and provide a multitude of tools that may make managing of the AIR archives easy and productive. Also, entirely new archive management tool chains may be provided on top of file systems that build additional functionality (such as reporting, backup, etc.). Also, a file system provides a way to hierarchically group repositories into directories and works well where such hierarchical structures are needed.

All shared AIR data is stored in Repositories. In their archived form repositories include a number of Transaction Log entries, ordered by synchronization time. Hence, on a file system, a (basic) natural representation of a repository may be a directory including all of its Transaction Log entries.

Figure 42:
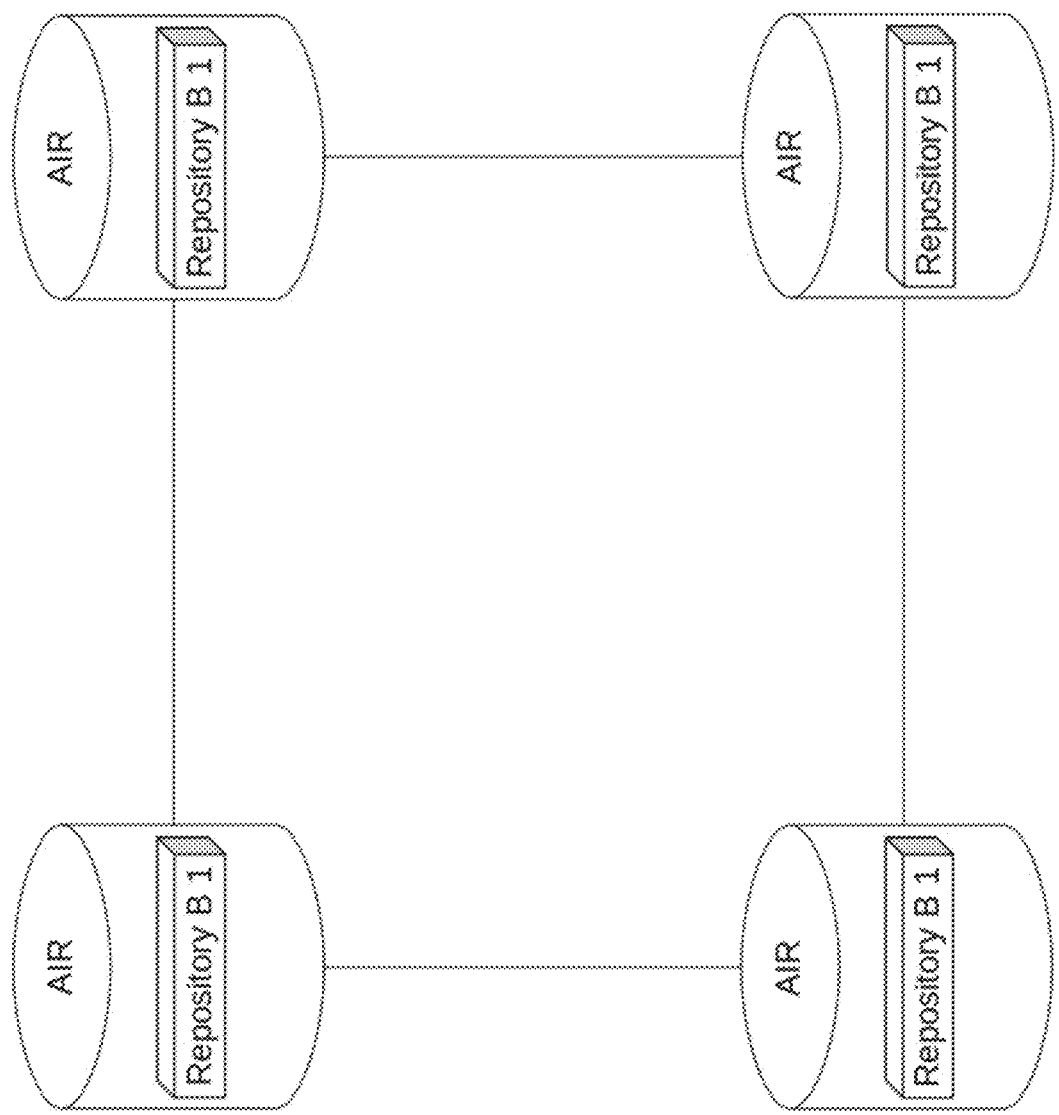
FIG. 42 shows an example of peer-to-peer sharing.

FIG. 42 shows an example of peer-to-peer sharing. In some environments, such as embedded devices in a local network, or network of autonomous AI bots, peer-to-peer communication may be preferred over other communication mechanisms. For example, peer-to-peer sharing may be a good choice when no central storage mechanism is possible in the environment. Also, peer-to-peer synchronization may be implemented in environments that can easily support other types of synchronization but choose to use peer-to-peer for specific types of Repositories or specific Repositories (while using other mechanisms for everything else).

AIR does not offer any new peer-to-peer setups or methodologies. Any known peer-to-peer routing and discovery setups can be implemented and new ones can be adopted. Repository Transaction Log entries can be thought of as equivalents to files in a peer-to-peer file sharing system.

In AIR multiple peer-to-peer setups can co-exist with each other and with non-peer-to-peer setups. This is because all shared data in an AIR system is split up into Repositories.

Different Repositories (or groups of Repositories) can be shared in different ways simultaneously from the same databases.

Below are a few examples of possible Repository routing configurations (for illustrative purposes only). Any number of configurations are possible to route repository sharing.

Connect to all Routing.

Perhaps the simplest way to setup a peer-to-peer network for a particular Repository is to have all databases that store this Repository share it with each other. Here every database with a given Repository shares it directly with every other database that has that Repository.

With this configuration, all transactions for a Repository generated on a given database are communicated only from that database to all other databases with that Repository. This configuration works well if there are only a few databases with the shared Repository and there are no communication barriers (like firewalls or different physical communication mediums) between these databases.

Figure 43:
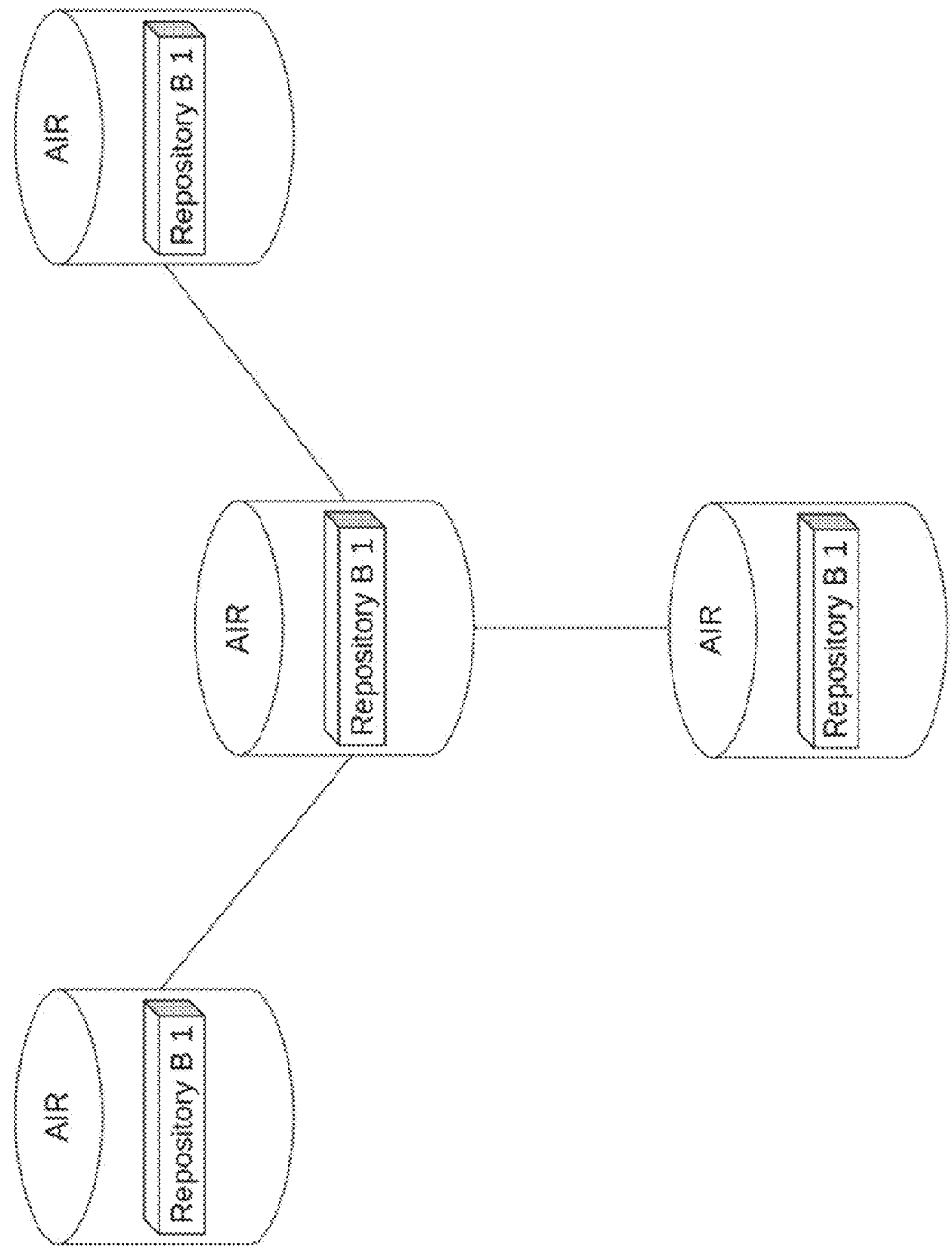
FIG. 43 shows an example of gateway routing.

FIG. 43 shows an example of gateway routing. A more advanced setup for an AIR peer-to-peer network is to elect gateway databases that act as semi-centralized communication channels between a group of peers.

With this configuration, AIR databases act as gateways. They are responsible for forwarding transactions for a given Repository to other databases. These gateways can be chosen in any number of ways, which may be fully or partially based on a predefined set or rules, or chosen at random. These setups work well if there are communication barriers between different AIR databases. For example, some of the databases might be behind a firewall or might only be accessible via communication mediums.

As the number of databases that share a given Repository grows gateway routing setups can be implemented to build either structured on unstructured mesh routing networks.

Per Repository Vs Per Database Networks.

In AIR it is possible to have either per Repository or per database peer-to-peer networks or both. A given AIR database can participate in multiple networks, each setup for any groupings of related Repositories or single Repositories. The AIR database itself can at the same time be part of a database peer-to-peer network.

Peer-to-Peer Discovery.

Peer-to-peer AIR networks may be structured or unstructured and discovery of Repositories can be performed in both examples. As is usual with peer-to-peer networks structured setups are better for Repository discovery purposes. However, in AIR it is possible to use structured peer-to-peer networks for Repository discovery and unstructured peer-to-peer networks for routing. It is also possible to use other non-peer-to-peer setups for discovery and peer-to-peer to actual sharing of those Repositories.

Central Server.

There are many advantages to using central sharing mechanisms, most of which are related to improved synchronization performance. In AIR any number of central servers can be implemented between any number of databases, with some being limited to specific sets of databases and some being available globally.

Advantages of using central sharing servers include, but are not limited to reduced messaging between devices with AIR databases (and reduced network bandwidth), reduced power usage to power up battery powered device's radio communication, easier grouping of individual Repository transactions into periodic batches (daily, monthly, etc.) for more efficient storage and retrieval, centralized account and device management, without users having accounts on multiple archival platforms needed for different Repositories, and provide better security/integrity guarantees to the cloud accounts implemented to archive the Repositories.

Figure 44:
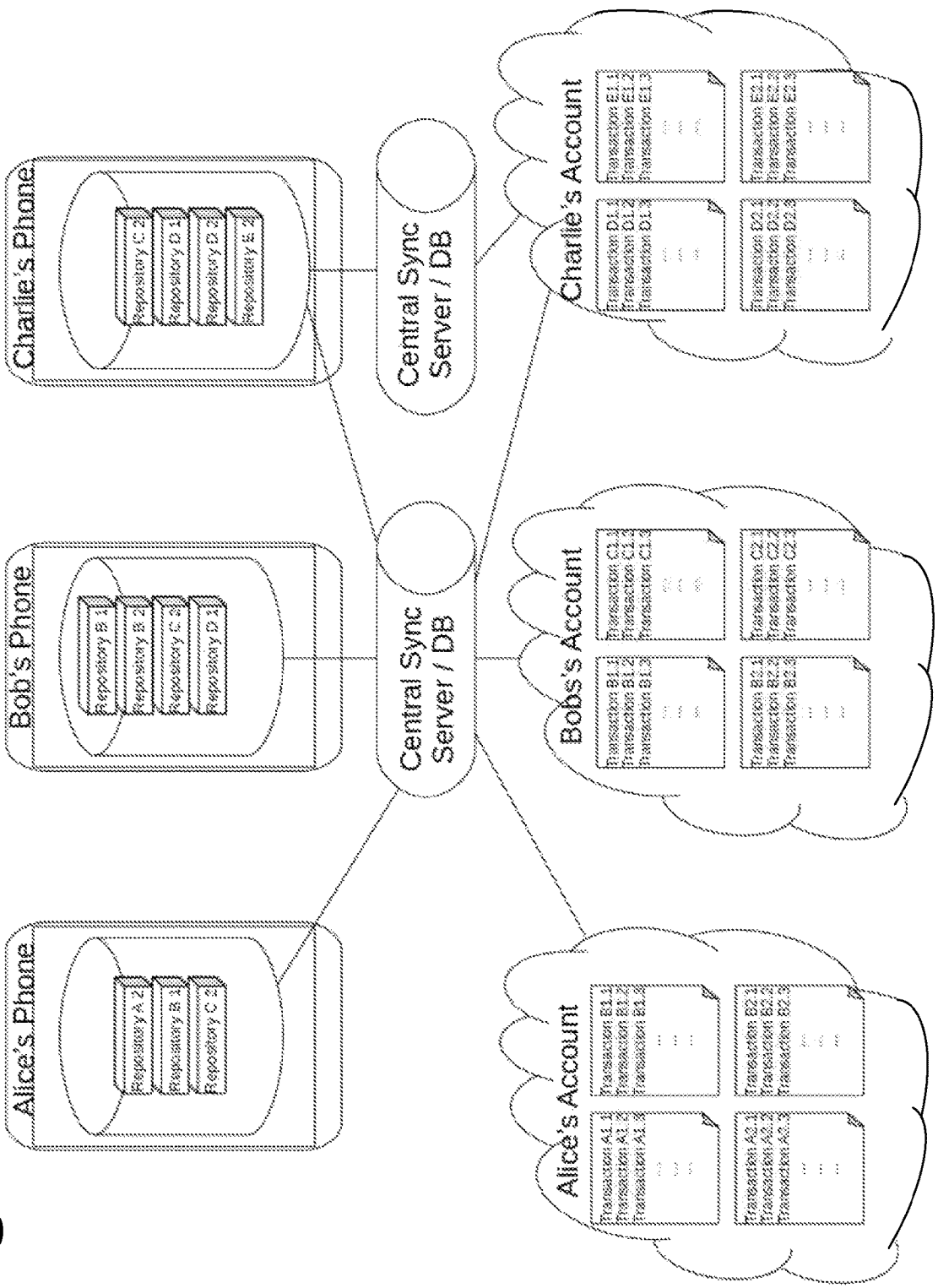
FIG. 44 shows an example of central sharing servers acting as caches of recent transaction logs and as intermediaries between AIR databases and cloud archival accounts.

FIG. 44 shows an example of central sharing servers acting as caches of recent Transaction Log entries and as intermediaries between AIR databases and cloud archival accounts.

A central server can timestamp Repository Transactions by their arrival time, hence guaranteeing transaction order for any given Repository. It is not necessarily aware of the contents of any transaction, and may be disallowed the knowledge of those contents. The central server only has to know information needed to route Repository Transactions to right databases. It can (optionally) manage archiving of Repositories and their retrieval from archives.

Figure 45:
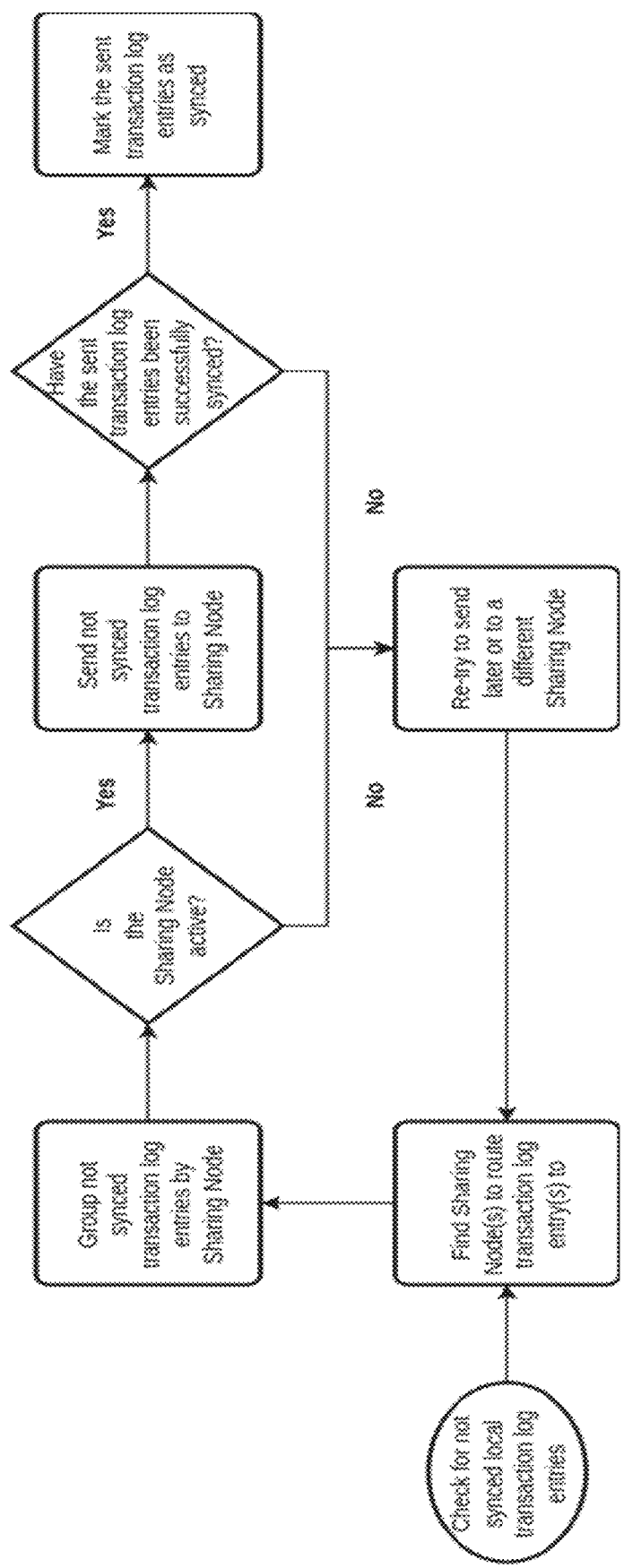
FIG. 45 shows an example of sharing operations.

FIG. 45 shows an example of sharing operations. A core feature of AIR Databases is the built-in support for synchronizing across multiple channels of communication, via various sharing mechanisms. While the underlying mechanisms differ in their implementation, all synchronization operations can be split into two categories. Sync Out—synchronizing Transaction Logs accumulated on an AIR Database to other databases via Sharing Nodes. Sync In—receiving Transaction Logs for appropriate Repositories from other AIR Databases (via Sharing Nodes)

Sharing nodes can be passive (e.g., as with Shared File Systems) or active. Active Sharing Nodes can either be sharing intermediaries (such as synchronization servers/databases) or other AIR databases. Any AIR Database can act as a sharing intermediary.

Synchronizing Messages Out.

The first step in AIR sharing is identifying the Sharing Nodes to be connected to by a given AIR Database. Periodically an AIR Database checks the TRANSACTION_LOGS table for any Transaction Log entries that haven't been synced and determines which Sharing Nodes should receive which Repository Transactions.

Then it checks if there are active Sharing Nodes associated with these Transaction Log entries. If there are then AIR attempts to share them. Upon receiving a successful response back (as a result of a successful connection and data transfer) from the receiving Sharing Node (or another node that is configured to send such responses) it marks the associated Transaction Log entries as Synchronized. If the status of given synchronization attempt was not be determined to be completed (within a specific period of time), it can be re-tried.

Checking for not Synced Transaction Log Entries.

An AIR Database can be configured to communicate the changes it makes to its Repositories either immediately after committing them, or on a period basis or as a result of an event (such as a user request to sync). Periodic syncing is expected to be the norm. In periodic synchronization AIR first retrieves the Transaction Log rows that are to be synced, for active Sharing Nodes, grouped by the Sharing Node to send to.

```
Select
    tl.ID as transaction_log_id,
    tl.REPOSITORY_ID,
    sn.ID
    sn.ADDRESS,
    sn.IS_ACTIVE as sharing_node_id
from
    TRANSACTION_LOGS tl
    inner join REPOSITORIES r
        on tl.REPOSITORY_ID = r.ID
```

```
        inner join SHARING_NODE_REPOSITORIES snr
            on r.ID = snr.REPOSITORY_ID
        inner join SHARING_NODES sn
            on snr.SHARING_NODE_ID = sn.ID
    where
        tl.SYNC_STATUS = 0 -- 'Synchronization Pending'
        and sn.IS_ACTIVE = true
    order by
        sn.ID;
```

Maintaining Synchronization State.

Then AIR groups all Transaction Log entries to be sent for to a particular Sharing Node, creates a single row in SHARING_MESSAGES table for each group of Transaction Log entries and a record in SHARING_MESSAGE_TRANSACTION_LOGS table for each Transaction Log entry in each group. It also marks all Transaction Log entries that are being synchronized (with the corresponding status and time stamp of last retry) in the TRANSACTION_LOGS table. Then as it sends it to corresponding Sharing Nodes it creates a row in a SHARING_NODE_MESSAGES table for each Sharing Node a particular message is sent too. The status of each transmission is maintained in the SHARING_NODE_MESSAGES table, using which AIR can re-try sending a sharing message up until the configured re-try count is exhausted.

The Sharing Node that received the message (or any number of any Sharing Nodes) eventually responds with a status for the sent message. It is possible for some Transaction Log entries in a given message to be determined to be synced while others to be determined to not be synced. All Transaction Log entries that have been determined to be synced have the SYNC_STATUS updated to 'Synchronized' in the TRANSACTION_LOGS table.

Retrying Failed Synchronization.

For all Transaction Logs that are left in 'Synchronizing' state AIR attempts to re-send them based on the process specified above. The attempts can be capped by a configurable amount of time after which they may be abandoned for a period of time or permanently. With each re-try the composition of Sharing messages may change. In peer-to-peer networks AIR may dynamically re-route messages based on statistics gathered from the message related tables. It may also change the amount of time between synchronization retries based on the same statistics.

Figure 46:
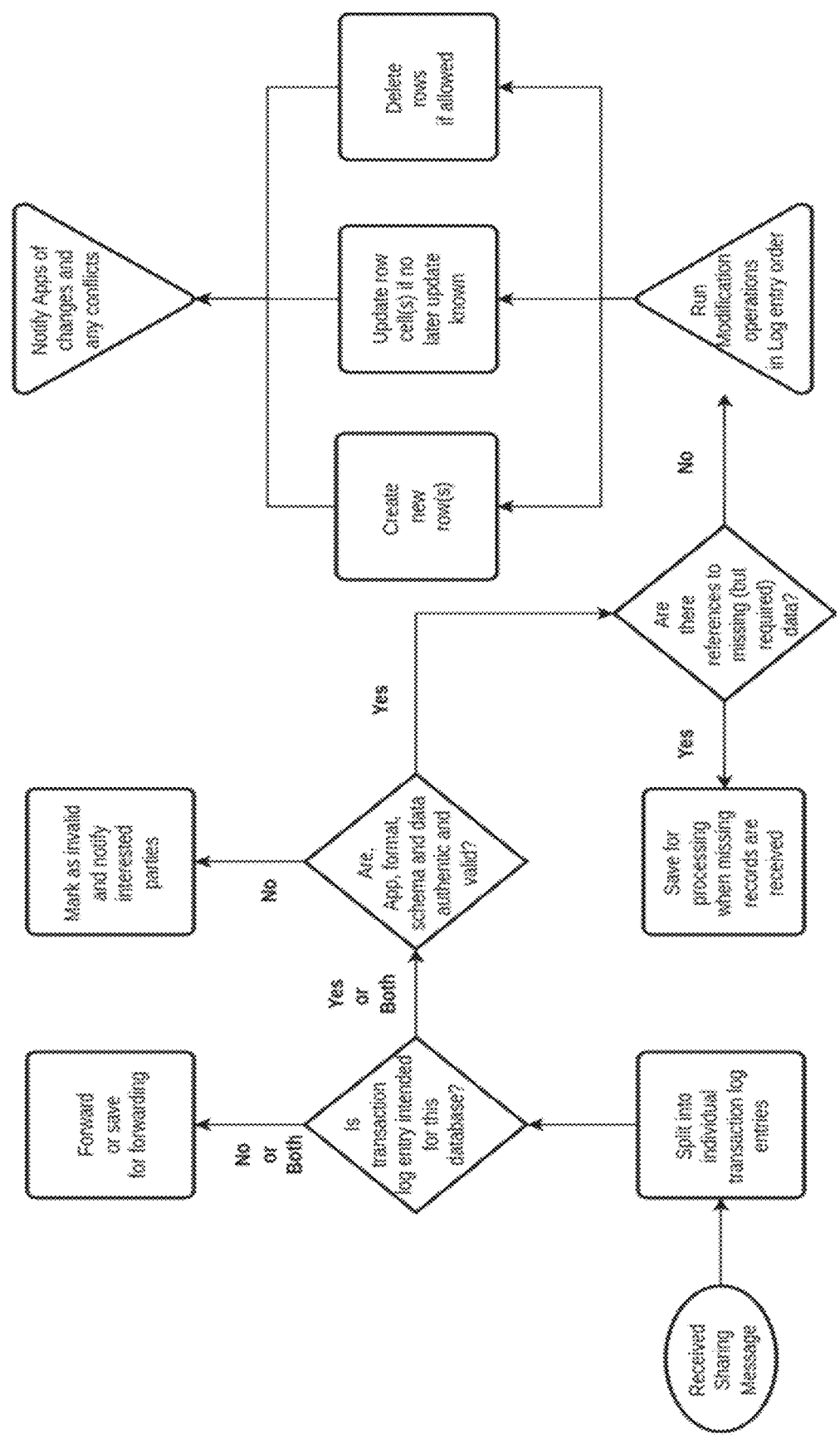
FIG. 46 shows example operations for synchronizing messages.

FIG. 46 shows example operations for synchronizing messages. AIR Databases can receive messages from Sharing Nodes in various ways. An AIR Database can either poll for changes, or receive push notifications, or have a long running connection established. In an example, the message reception process follows the same fundamental flow.

First AIR receives a message with a number of Transaction Log entries in it. The Transaction Log entries may or may not be related. In an example where an AIR database acts as a sharing intermediary, the message may partially or fully include Transaction Logs intended for other AIR Databases.

AIR then processes the message, and splits it into individual Transaction Log entries.

Then AIR determines if a given Transaction Log entry is intended for it or other AIR Databases. If a Transaction Log entry is intended for other databases then it is forwarded according to routing rules defined in that AIR Database.

Processing Incoming Messages.

Transaction Log entries that are intended for the receiving AIR database itself are then processed by the database. First AIR checks if the message is valid and authentic. The process closely resembles that of checking Modification requests from applications, since incoming transaction log entries are grouped in the same way. First, the log is checked for any missing dependencies.

Usually, the first step is to decrypt a given Transaction Log entry (encrypted the synchronous repository key). Then the Actor specific signature of the message can be checked (signed by the private key of a given Actor). Once the repository and Actor authenticity are verified they are checked against the declared values (repository id has to be specified in the message envelope wrapper the encrypted message and the Actor Id can be specified inside the encrypted message).

The encrypted Transaction Log entry can also be signed by Application (the Modification request of which caused the entry to be generated). This ensures authenticity of the Application that caused the request. Alternatively, an App can delegate that trust to the AIR database.

Once the authenticity of the Application, Actor and the Repository have been verified then a series of checks can be performed in a way close to the local Modification request from Applications. An Application that generated a Transaction Log entry can be checked for registration. Then the Schemas/tables/columns in the entry can be checked for the Application and the Actor running a given operation. Then the referenced repository is checked for Application and Actor access rights. Additional checks may also be performed.

If some of the data to validate the message is missing from the AIR Database, then the processing of the Transaction Log entry is postponed until that data is received by the AIR Database. Depending on the type of data, AIR may proactively seek that data or might wait for it to arrive.

If some of the validation checks do not pass, AIR may notify any number of interested parties about the failure. AIR may lock Repositories that are receiving invalid requests, if configured to do so.

Once all the validation checks pass AIR checks if there are missing dependencies for processing the Transaction Log entry. For example, the entry may contain Update or Delete statements for records that don't yet exist on this database and haven't already been deleted. If there is missing data the Transaction Log entry is saved for future processing.

If there are no missing dependencies the Modification Operations in a Transaction Log are processed in the order specified. For example, Create operations are run as is. Update operations are run if no later updates are known to have modified the updated row cells. Delete operations are run as is.

Finally, any Applications that are listening for changes are notified of the changes made and of any conflicts that may have been detected. Apps are notified only of the changes on the schemas and data they are allowed to see (and usually only for the changes that match the queries they are subscribed to).

Device Setup.

AIR is designed for the future application ecosystems, while allowing for the present ones. AIR can be implemented in any comprehensive application development framework and in a wide variety of languages. An AIR database can run on hardware of any scale, from embedded devices to massively distributed systems (e.g., systems running NewSQL databases). It can serve software Applications build for any purpose and using any technology.

However main expected target platform for AIR is mobile devices and main expected Application base is Progressive Web Applications (PWAs), mobile Apps and web-native hybrid mobile Apps. The assumption AIR makes is that future mobile and web applications will mostly be PWAs. A PWA can act as off-line capable Application, and be accessible directly from the device without a network connection and without explicitly launching the browser. The same PWA acts as a traditional website. The expectation is that the concept of a browser and that of an operating system will merge in the future with vast majority of Applications being (re)written to be PWAs (and a small fraction of native Applications servicing specific niche needs). In such an ecosystem AIR can rely on the browser as its platform.

Figure 47:
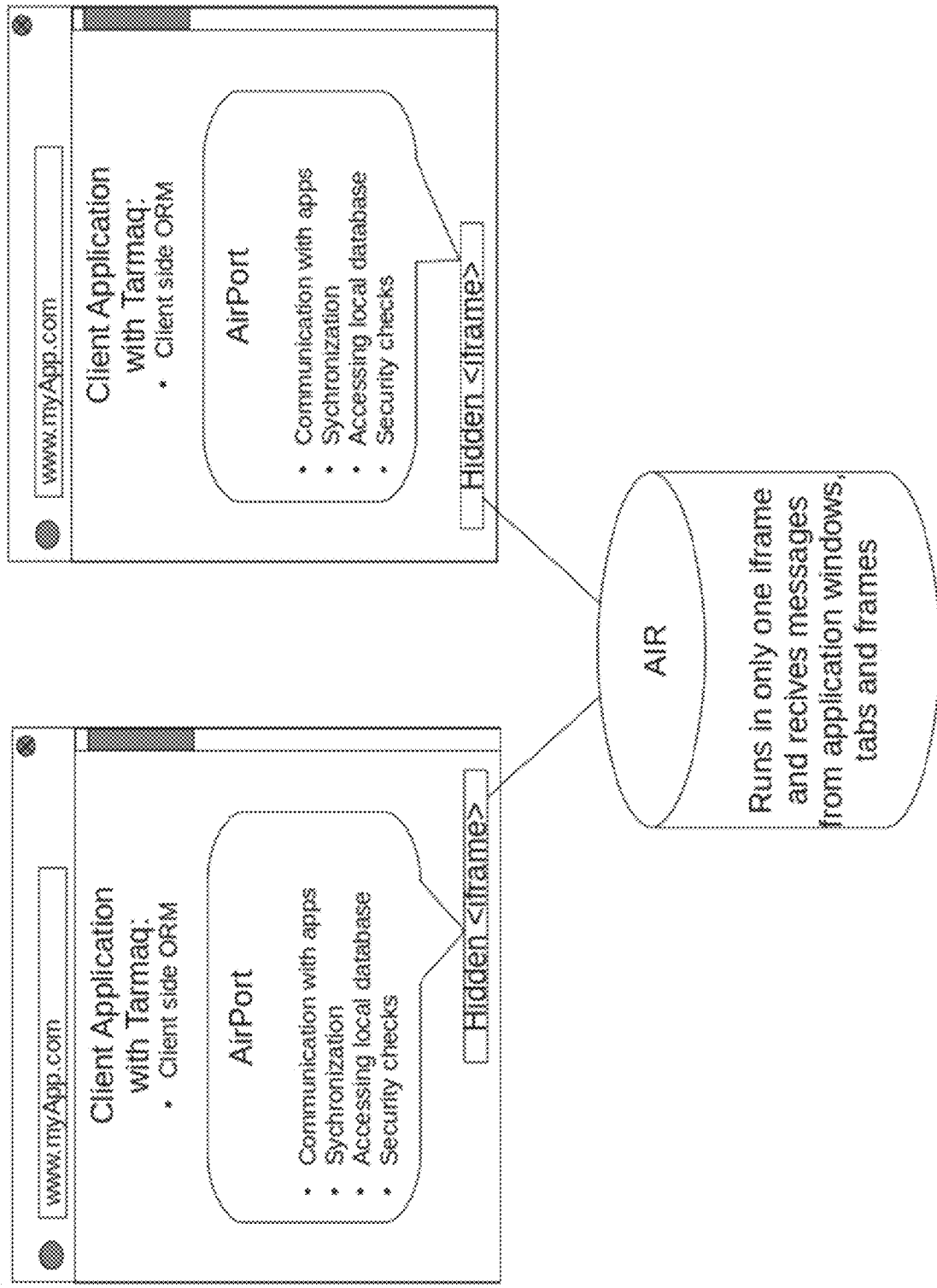
FIG. 47 illustrates an example PWA ecosystem.

FIG. 47 illustrates an example PWA ecosystem. In-browser cross origin communication mechanism (e.g., Window.postMessage( ) across IFrames, with an AIR IFrame in each application and one negotiated IFrame being active at any time) can inherently guarantee data and framework security and application authentication. AIR imposes a number of additional checks and constraints on the data and operations coming from Applications to ensure data authenticity, security, confidentiality and consistency.

Native and Web Hybrid Ecosystem.

AIR can also be run in present echo systems. AIR runs via a custom application that combines a background process that manages a local relational database (e.g., SqLite) and an Apache Cordova based front end that accesses this application via a built in (or referenced from OS) browser. All PWA apps and traditional web apps access AIR via Cordova, using the same front-end mechanisms as in standard PWA ecosystem.

All hybrid Applications (web Applications installed natively to access device features) can run off remote servers and be setup as PWAs (and be fully off-line capable). They can then be deployable via the custom AIR application. Alternatively, hybrid Applications can include Cordoba plugins to access AIR as native Applications.

Figure 48:
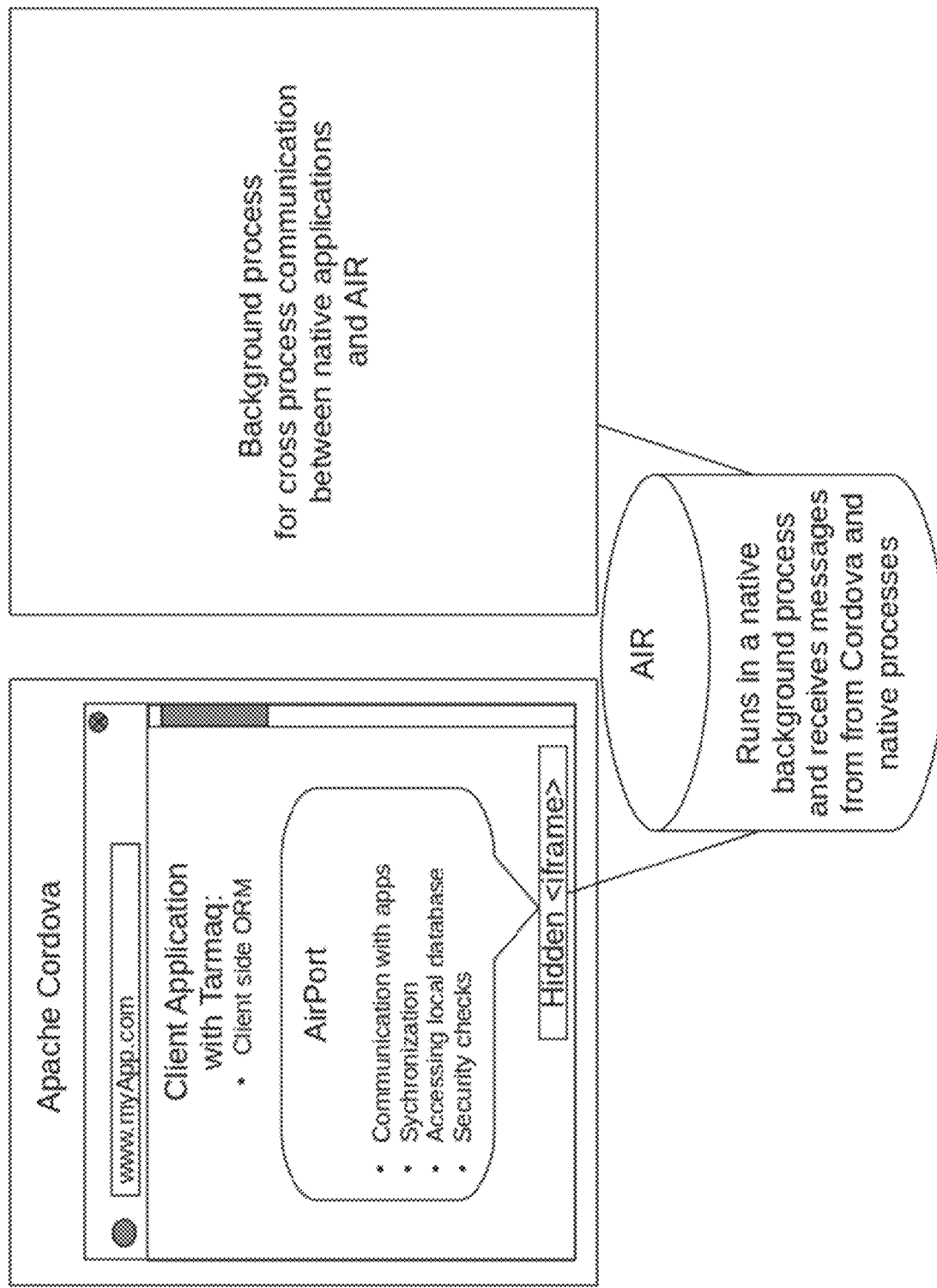
FIG. 48 shows an example of native applications accessing an AIR database via a device specific cross-process communication mechanism.

FIG. 48 shows an example of Native Applications accessing an AIR database via a device specific cross-process communication mechanism. Applications run in the background if not explicitly opened by the user and serve all native Application requests.

Separate measures (such as cryptographic data signing and encryption) will be taken to ensure data authenticity, security, confidentiality and consistency. Any number of techniques and technologies can be implemented to accomplish that.

The native hybrid ecosystem setups apply to both mobile and desktop environments.

Figure 49:
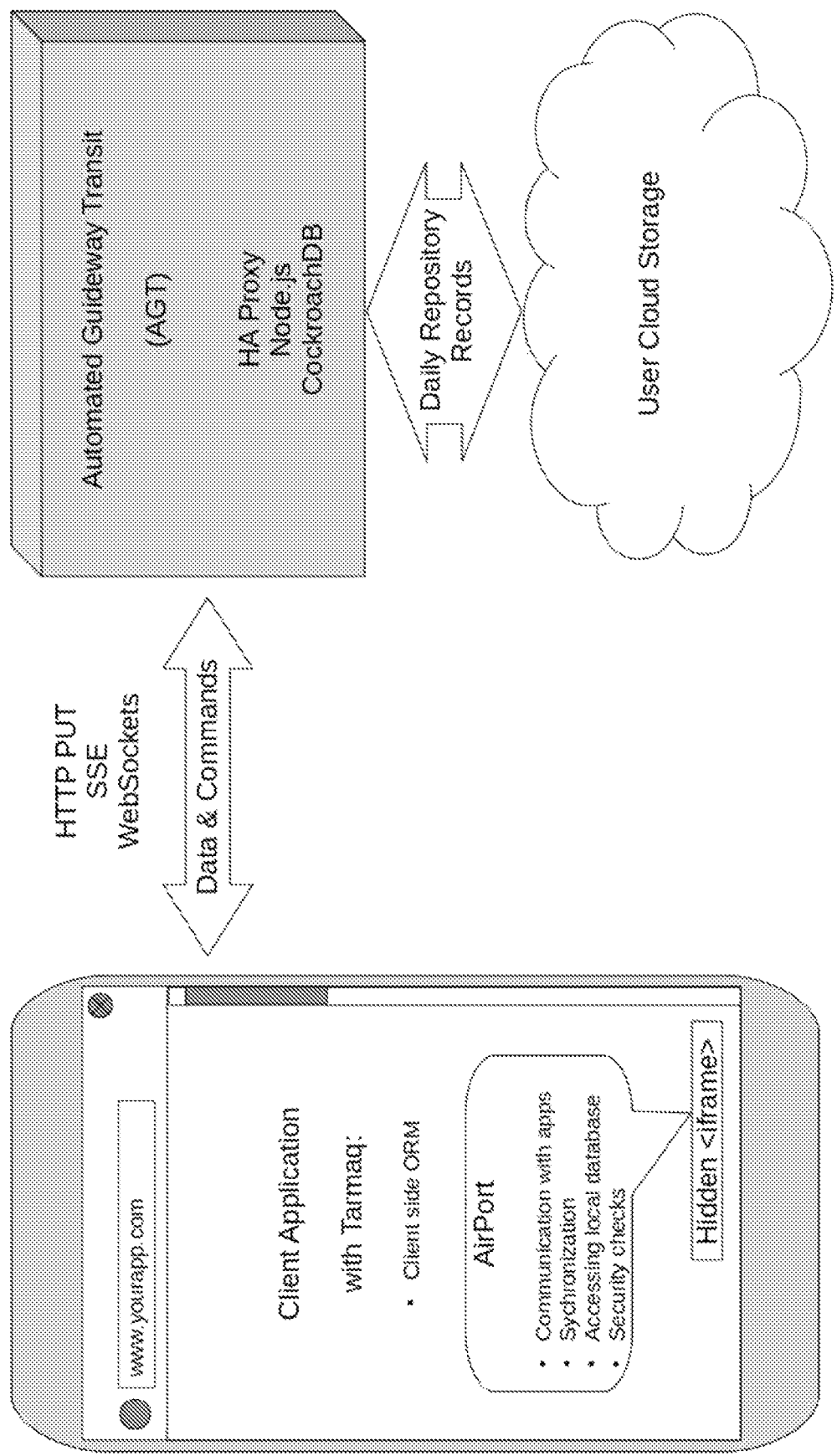
FIG. 49 shows an example of a reference implementation of an AIR database.

FIG. 49 shows an example of a reference implementation of an AIR database. It may be implemented using other technologies but the stack described below best fits current and expected future state of technology. There is a big push in the industry for Progressive Web Applications (PWA) that can act as mobile Apps and traditional browser Apps using the same source code base. PWAs can also be written using responsive layouts and work on both mobile devices with smaller screens and desktop devices with very large screens. Hence web is reference implementation the platform for AIR.

AIR reference implementation is AirPort (Autonomous Interdependent Repository Port, or AP for short) on the device side and Automated Guideway Transit (AGT) as the central synchronization server.

It is written in TypeScript targeting the browser platform for either web or hybrid mobile Applications. AP runs in a hidden <iframe> tag that is embedded into client Applications. It communicates with client-side Applications across origins via Window.postMessage( ) mechanism. If multiple Application windows/tabs/frames are open only one AP instance is active and all messages are processed by it.

For ensuring reliable communication AP uses service workers and for switching load off the rendering thread it uses web workers.

AP validates all communications with client Apps to ensure that they perform only allowed operations. Because AP runs from a separate origin then the applications it is insulated from any direct access by Applications.

AP runs off of a local Relational Database—SQLite for hybrid applications, or AlaSQL.js for in browser apps (or any other equivalent with transactional semantics), or WebSQL.

It communicates with AGT via HTTP PUT requests (to avoid security holes with GET and POST). The bulk of the traffic between AP and AGT is Repository Transaction Log entries.

AGT is also written in TypeScript and runs on Node.js. Writing client and server-side code in one language reduces maintenance costs and enables end-to-end tests to be run quickly as part of continuous integration test suits—hence contributing to code quality and reducing bugs. It also allows for targeted code reuse for in-browser managed peer-to-peer and file system sharing.

AGT is load balanced by HA Proxy (F5 or other equivalents are acceptable as well). Application servers run on Node.js, are stateless and scale horizontally without any known limits.

Synchronization persistence data storage behind AGT uses the relational data model and the SQL language. Horizontal scalability is accomplished via CockroachDB—a shardless NewSQL database (TiDB or other equivalents are acceptable as well). Using a relational model and SQL simplifies development and keeps query logic in a separate layer, which reduces development costs and improves code quality. Also, it allows for integration tests in continuous integration test suites (as described above) that do not rely on any existing database states (and setup data in sql.js separately for every test).

AGT keeps clients synced up and has between ½ and 2 days' worth of data in individual Transaction Log entries. It archives previous day's (in UTC) records into daily per-Repository archive records and sends them to user cloud accounts for permanent storage. It is also responsible for retrieving those records and sending them to AIR Databases for users that are joining a Repository or have been offline for a long period of time.

It is noted that the examples shown and described are provided for purposes of illustration and are not intended to be limiting. Still other examples are also contemplated.

The invention claimed is:

1. A system of autonomous interdependent repositories (AIR) to enable any number of users to share data across any number of web site, mobile, and/or desktop applications (Apps), comprising:
   an AIR database stored in computer readable media, the AIR database providing a fully functional relational database including data that a user places therein;
   a database engine implemented in computer readable program code stored in computer memory for execution by a computer processor to manage the AIR database, the database engine executing logic for communicating with client applications, other AIR databases, and maintaining internal state of the AIR database;

a plurality of Repositories stored in the computer readable media as a collection of records across any number of tables, the Repositories configured for grouping data in the AIR database, the plurality of Repositories shared with the user and other users for access via user computing devices; and a plurality of Repository records stored in the computer readable media for the plurality of Repositories, the Repository records identified by a Repository Identification (ID), an Actor Identification (ID), and an Actor Record Identification (ID) which cannot be updated to provide fast modification operations by Identification (ID);

wherein the Repository ID uniquely identifies an individual repository;

wherein the Actor ID uniquely identifies an individual user of the individual repository;

wherein the Actor Record ID uniquely identifies an individual row in an individual table created by the individual user of the individual repository;

wherein any number of Applications from any number of different publishers are provided access to the AIR database by providing Schemas to the AIR databases.

2. The system of claim 1, wherein a Repository is a collection of records across any number of tables.

3. The system of claim 1, wherein Repository records are identified by Repository ID, Actor ID and Actor Record ID, wherein Actor ID is a specific user on a specific AIR database, and a combination of Repository ID, Actor and Actor Record ID are unique within an AIR database.

4. The system of claim 1, wherein Repositories are fine grained, time bound, and limited to a particular shareable unit of knowledge.

5. The system of claim 1, wherein Repositories are grouped by hierarchies and labels, definitions of hierarchies and labels are stored in Repositories for sharing, and common hierarchies and labels are published for all Applications and users.

6. The system of claim 5, wherein Applications publish their own hierarchies and labels and can request the user to give access to all or part of the Repositories matching user's hierarchies and labels.

7. A method for any number of users to share data across any number of web site, mobile, and/or desktop applications (Apps), via an autonomous interdependent repositories (AIR) database, the method comprising:

grouping data in a plurality of Repositories of the AIR database, the AIR database providing a fully functional relational database including data that a user places therein, the plurality of Repositories shared with the user and other users, the Repositories stored as a collection of records across any number of tables;

maintaining a plurality of Repository records for the plurality of Repositories, the Repository records identified by a Repository Identification (ID), an Actor Identification (ID), and an Actor Record Identification (ID) which cannot be updated to provide fast modification operations by Identification (ID);

wherein the Repository ID uniquely identifies an individual repository, wherein the Actor ID uniquely identifies an individual user of the individual repository;

wherein the Actor Record ID uniquely identifies an individual row in an individual table created by the individual user of the individual repository;

wherein any number of Applications from any number of different publishers use the AIR database by providing Schemas to the AIR databases.

8. The method of claim 7, further comprising directly distributing Schemas from an Application or via a publishing platform.

9. The method of claim 7, further comprising Applications storing records in the AIR database in their own Schemas or in Schemas of other applications.

10. The method of claim 7, further comprising a user accessing the AIR database via a calling Application by:

checking all Read and Modification requests coming from the calling Application to ensure the calling Application is registered and allowed to access the AIR database for a specified operation verifying validity of the Read and Modification requests;

checking if the calling Application is allowed to use tables and columns specified in the Read and Modification requests based on access rules provided by a publisher of the Schemas with the specified tables/views and columns; and checking if the calling Application and user are allowed to reference specified repositories.

11. The method of claim 7, further comprising different AIR databases communicating with each other.

12. The method of claim 7, further comprising modifying Repositories in transactions, wherein client Applications generate database-wide transactions which are then split up into per-Repository transactions.

13. The method of claim 7, further comprising sharing Repositories between users, wherein users join a Repository and add modifications as Actors, Repository privileges are maintained in the metadata of those repositories, and the metadata of the repositories is shared using the same transaction mechanism as other Repository data.

14. The method of claim 7, further comprising recording changes made to the Repository in a Transaction Log with entries ordered by time of synchronization, wherein AIR databases communicate changes to a given Repository by exchanging entries of its Transaction Log that are applied locally by the receiving AIR databases to ensure a state of a given Repository to be consistent across all databases.

15. The method of claim 7, further comprising altering a Read query and joining the Read query with Repository reference tables via IDs of an accessing Application and Actor, and then running the altered query, and then return the results to a calling Application.

16. The method of claim 7, further comprising generating a Read query to return all records to be modified (Created, Updated or Deleted).

17. The method of claim 16, further comprising performing a corresponding modification in the AIR database for each record returned by the Read query or explicitly specified, wherein one modification is run for each record.

18. The method of claim 17, further comprising recording all record modifications in a local Record Modification History that is grouped by database transaction, Repository Transaction, operation, and modified entity.

19. The method of claim 18, further comprising adding entries describing the modification to the Transaction Logs of the Repositories modified by the operation.

20. The method of claim 19, further comprising creating one Transaction Log entry per database transaction, per Repository, wherein each Transaction Log entry is signed by the Actor for authenticity and encrypted for privacy.

* * * * *